US00RE49980E

(19) United States
(12) Reissued Patent
Sharma et al.

(10) Patent Number: US RE49,980 E
(45) Date of Reissued Patent: May 21, 2024

(54) POSITIVE ELECTRODE ACTIVE MATERIALS WITH COMPOSITE COATINGS FOR HIGH ENERGY DENSITY SECONDARY BATTERIES AND CORRESPONDING PROCESSES

(71) Applicant: Zenlabs Energy, Inc., Fremont, CA (US)

(72) Inventors: Sanjeev Sharma, Fremont, CA (US); Deepak Kumaar K. Karthikeyan, Newark, CA (US); Charles A. Bowling, Palo Alto, CA (US); Bing Li, Union City, CA (US); Pedro A. Hernández Gallegos, Pleasanton, CA (US); Subramanian Venkatachalam, Pleasanton, CA (US); Herman A. Lopez, Sunnyvale, CA (US); Sujeet Kumar, Newark, CA (US)

(73) Assignee: Ionblox, Inc., Fremont, CA (US)

(21) Appl. No.: 17/155,967

(22) Filed: Jan. 22, 2021

Related U.S. Patent Documents

Reissue of:
(64) Patent No.: 10,193,135
Issued: Jan. 29, 2019
Appl. No.: 14/995,928
Filed: Jan. 14, 2016

U.S. Applications:
(60) Provisional application No. 62/103,641, filed on Jan. 15, 2015.

(51) Int. Cl.
*H01M 4/131* (2010.01)
*H01M 4/02* (2006.01)
(Continued)

(52) U.S. Cl.
CPC ..... *H01M 4/131* (2013.01); *H01M 4/0402* (2013.01); *H01M 4/0471* (2013.01);
(Continued)

(58) Field of Classification Search
CPC .. H01M 4/131; H01M 4/0402; H01M 4/0471; H01M 4/133; H01M 4/1391;
(Continued)

(56) References Cited

U.S. PATENT DOCUMENTS 6,017,654 A * 1/2000 Kumta ..... C01G 53/50 429/231.95
7,192,539 B2 3/2007 Maeda et al.
(Continued)

FOREIGN PATENT DOCUMENTS

JP 3157413 B2 4/2001
JP 2001-143703 5/2001
(Continued)

OTHER PUBLICATIONS

Rod McMillan "Fluoroethylene Carbonate Electrolyte and Its Use in Lithium Ion Batteries With Graphite Anodes", Elsevier, Journal of Power Sources 8-82 (1999) 20-26 (Year: 1999).*
(Continued)

*Primary Examiner* — Leonardo Andujar
(74) *Attorney, Agent, or Firm* — Christensen, Fonder, Dardi PLLC; Elizabeth A. Gallo; Peter S. Dardi

(57) ABSTRACT

A composite coated form of lithium cobalt oxide is described that can achieve improved cycling at higher voltages. Liquid phase and combined liquid and solid phase coating processes are described to effectively form the composite coated powders. The improved cycling positive electrode materials can be effectively combined with either graphitic carbon negative electrode active materials or silicon based high capacity negative electrode active materials. Improved battery designs can achieve very high volumetric energy densities in practical battery formats and with reasonable cycling properties.

41 Claims, 33 Drawing Sheets

(51) Int. Cl.

| | |
|---|---|
| ***H01M 4/04*** | (2006.01) |
| ***H01M 4/133*** | (2010.01) |
| ***H01M 4/1391*** | (2010.01) |
| ***H01M 4/36*** | (2006.01) |
| ***H01M 4/48*** | (2010.01) |
| ***H01M 4/485*** | (2010.01) |
| ***H01M 4/505*** | (2010.01) |
| ***H01M 4/525*** | (2010.01) |
| ***H01M 4/587*** | (2010.01) |
| ***H01M 4/62*** | (2006.01) |
| ***H01M 10/052*** | (2010.01) |
| ***H01M 10/0525*** | (2010.01) |

(52) U.S. Cl.

CPC ..... *H01M 4/133* (2013.01); *H01M 4/1391* (2013.01); *H01M 4/366* (2013.01); *H01M 4/483* (2013.01); *H01M 4/485* (2013.01); *H01M 4/505* (2013.01); *H01M 4/525* (2013.01); *H01M 4/587* (2013.01); *H01M 4/62* (2013.01); *H01M 10/052* (2013.01); *H01M 10/0525* (2013.01); *H01M 2004/021* (2013.01); *H01M 2004/027* (2013.01); *H01M 2004/028* (2013.01); *H01M 2220/20* (2013.01)

(58) Field of Classification Search

CPC ..... H01M 4/366; H01M 4/483; H01M 4/485; H01M 4/505; H01M 4/525; H01M 4/587; H01M 4/62; H01M 10/052; H01M 10/0525; H01M 2004/021; H01M 2004/027; H01M 2004/028; H01M 2220/20; Y02E 60/10

See application file for complete search history.

(56) References Cited

U.S. PATENT DOCUMENTS

| | | | | |
|---|---|---|---|---|
| 7,883,644 | B2 | 2/2011 | Paulsen et al. | |
| 8,187,752 | B2 | 5/2012 | Buckley et al. | |
| 8,277,974 | B2 | 10/2012 | Kumar et al. | |
| 8,337,727 | B2 | 12/2012 | Chen et al. | |
| 8,389,160 | B2 | 3/2013 | Venkatachalam et al. | |
| 8,465,873 | B2 | 6/2013 | Lopez et al. | |
| 8,475,959 | B2 | 7/2013 | Venkatachalam et al. | |
| 8,535,832 | B2 | 9/2013 | Karthikeyan et al. | |
| 8,663,849 | B2 | 3/2014 | Venkatachalam et al. | |
| 8,703,337 | B2 | 4/2014 | Ellenwood et al. | |
| 8,741,484 | B2 | 6/2014 | Karthikeyan et al. | H01M 4/505 429/231.95 |
| 8,741,485 | B2 | 6/2014 | Lopez et al. | |
| 8,765,306 | B2 | 7/2014 | Amiruddin et al. | |
| 8,785,042 | B2 | 7/2014 | Paulsen et al. | |
| 8,916,294 | B2 | 12/2014 | Kumar et al. | |
| 8,928,286 | B2 | 1/2015 | Amiruddin et al. | |
| 8,993,177 | B2 | 3/2015 | Amiruddin et al. | |
| 9,070,489 | B2 | 6/2015 | Sharma et al. | |
| 9,166,222 | B2 | 10/2015 | Amiruddin et al. | |
| 9,177,689 | B2 | 11/2015 | Paulsen et al. | |
| 9,190,694 | B2 | 11/2015 | Lopez et al. | |
| 10,115,962 | B2 * | 10/2018 | Bowling | H01M 4/131 |
| 2002/0110736 | A1 | 8/2002 | Kweon et al. | |
| 2004/0200998 | A1 | 10/2004 | Park et al. | |
| 2006/0051673 | A1 | 3/2006 | Johnson et al. | |
| 2007/0148544 | A1 | 6/2007 | Le | |
| 2007/0281212 | A1 | 12/2007 | Thackeray et al. | |
| 2009/0104532 | A1 | 4/2009 | Hosoya | |
| 2009/0253042 | A1 | 10/2009 | Sun et al. | |
| 2009/0309063 | A1 * | 12/2009 | Paulsen | H01M 4/525 252/182.33 |
| 2010/0086853 | A1 * | 4/2010 | Venkatachalam | H01M 4/1391 429/231.95 |
| 2011/0037439 | A1 | 2/2011 | Bhardwaj et al. | |
| 2011/0111298 | A1 | 5/2011 | Lopez et al. | |
| 2011/0311873 | A1 * | 12/2011 | Schulz | H01M 4/387 252/502 |
| 2012/0028105 | A1 * | 2/2012 | Kumar | H01M 4/131 429/149 |
| 2012/0077082 | A1 | 3/2012 | Se-Hee et al. | |
| 2012/0107680 | A1 * | 5/2012 | Amiruddin | C01G 45/1257 29/623.1 |
| 2012/0156566 | A1 | 6/2012 | Akalay et al. | |
| 2012/0282521 | A1 | 11/2012 | Choi et al. | |
| 2012/0295155 | A1 | 11/2012 | Deng et al. | |
| 2013/0149609 | A1 | 6/2013 | Deng et al. | |
| 2013/0157147 | A1 | 6/2013 | Li et al. | |
| 2013/0189575 | A1 | 7/2013 | Anguchamy et al. | |
| 2013/0202953 | A1 * | 8/2013 | Sharma | H01M 4/525 429/188 |
| 2013/0295439 | A1 | 11/2013 | Masarapu et al. | |
| 2014/0050972 | A1 | 2/2014 | Amiruddin et al. | |
| 2014/0065464 | A1 | 3/2014 | Masarapu et al. | |
| 2014/0178760 | A1 | 6/2014 | Bowling et al. | |
| 2014/0302392 | A1 | 10/2014 | Li et al. | |
| 2014/0308585 | A1 | 10/2014 | Han et al. | |
| 2014/0370387 | A1 | 12/2014 | Anguchamy et al. | |
| 2015/0037690 | A1 | 2/2015 | Dalavi et al. | |
| 2015/0050535 | A1 | 2/2015 | Amiruddin et al. | |
| 2015/0311525 | A1 | 10/2015 | Masarapu et al. | |
| 2016/0006026 | A1 | 1/2016 | Paulsen et al. | |
| 2016/0099469 | A1 | 4/2016 | Paulsen et al. | |

FOREIGN PATENT DOCUMENTS

| | | | |
|---|---|---|---|
| JP | 3172388 | B2 | 6/2001 |
| JP | 2002-158011 | | 5/2002 |
| JP | 2003-221234 | | 8/2003 |
| JP | 2005-310744 | | 11/2005 |
| JP | 2006-261127 | | 9/2006 |
| JP | 2006-261132 | | 9/2006 |
| JP | 2008-251480 | | 10/2008 |
| JP | 2011-129258 | A | 6/2011 |
| JP | 2011129258 | A * | 6/2011 |
| KR | 10-0624970 | B1 | 9/2006 |
| KR | 10-2010-0007236 | | 1/2010 |
| WO | 2005-119820 | A1 | 12/2005 |
| WO | 2006-109930 | | 10/2006 |

OTHER PUBLICATIONS

Sun et al. AIF3 Coating to Improve High Voltage Cycling Performance of Li[Ni1/3 Co1/3Mn 1/3]O2 Cathode Materials for Lithium Secondary Batteries, Journal of the Electrochemical Society, 154 (3) A168-A172. (Year: 2007).*

Sun et al., "Effect of AIF3 coating amount on high voltage cycling performance of LiCoO2," Electrochimica Acta 53:1013-1019 (2007). (English Abstract).

Kang et al. "Enhancing the rate capability of high capacity xLi2MnO3 (1-x)LiMO2 (M=Mn, Ni, Co) electrodes by Li—Ni—PO4 treatment," Electrochemistry Communications 11, 748-751 (2009).

Jung et al., "Enhanced Stability of LiCoO2 Cathodes in Lithium-Ion Batteries Using Surface Modification by Atomic Layer Deposition," The Journal of the Electrochemical Society, 157(1):A75-A81 (2010).

Jung et al., "Ultrathin Direct Atomic Layer Deposition on Composite Electrodes for Highly Durable and Safe Li-Ion Batteries," Advanced Materials,A29 22:2172-2176 (2010).

Paulsen et al., "Core-Shell Cathode Material with Size-Dependent Composition," Electrochemical and Solid-State Letters, 10(4), A101-A105 (2007).

Riley et al., "Improved Mechanical Integrity of ALD-Coated Composite Electrodes for Li-Ion Batteries," Electrochemical and Solid State Letters, 14(3):A39-A31 (2011).

Ruberto, "Metastable Alumina from Theory: Bulk, Surface, and Growth of κ-Al2O3," Thesis for the Degree of Doctor of Philosophy, Department of Applied Physics, Chalmers University of Technology and Goteborg University, 2001.

Timcal Graphite & Carbon, "A Synopsis of Analytical Procedures," 2008, www.timcal.com.

(56) References Cited

OTHER PUBLICATIONS

Wang et al., "High capacity double-layer surface modified Li[Li0.2Mn0.54Ni0.13Co0.13]O2 cathode with improved rate capability," J. Mater. Chem., 19:49-65-4972 (2009).
Wu et al., "High Capacity, Surface-Modified Layered Li[Li(1-x)/3Mn(2-x)/3Nix/3Cox/3]O2 Cathodes with Low Irreversible Capacity Loss," Electrochemical and Solid State Letters, 9 (5) A221-A224 (2006).
International Search Report and Written Opinion from corresponding PCT Application No. PCT/US2016/013489 dated May 4, 2016.

* cited by examiner

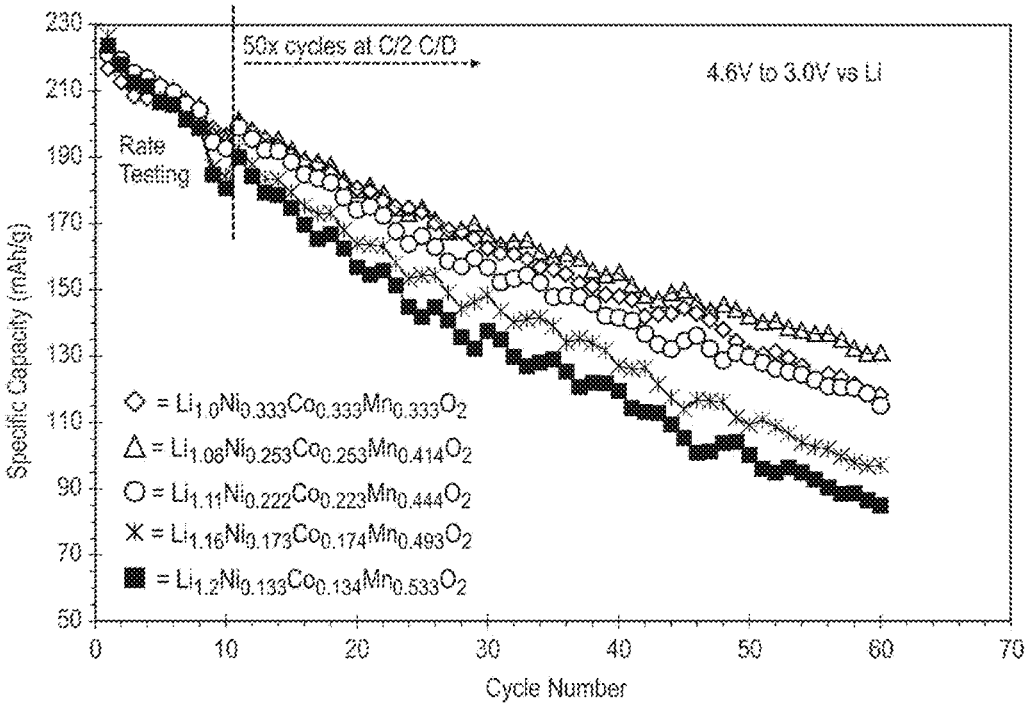
FIG. 11 (uncoated)

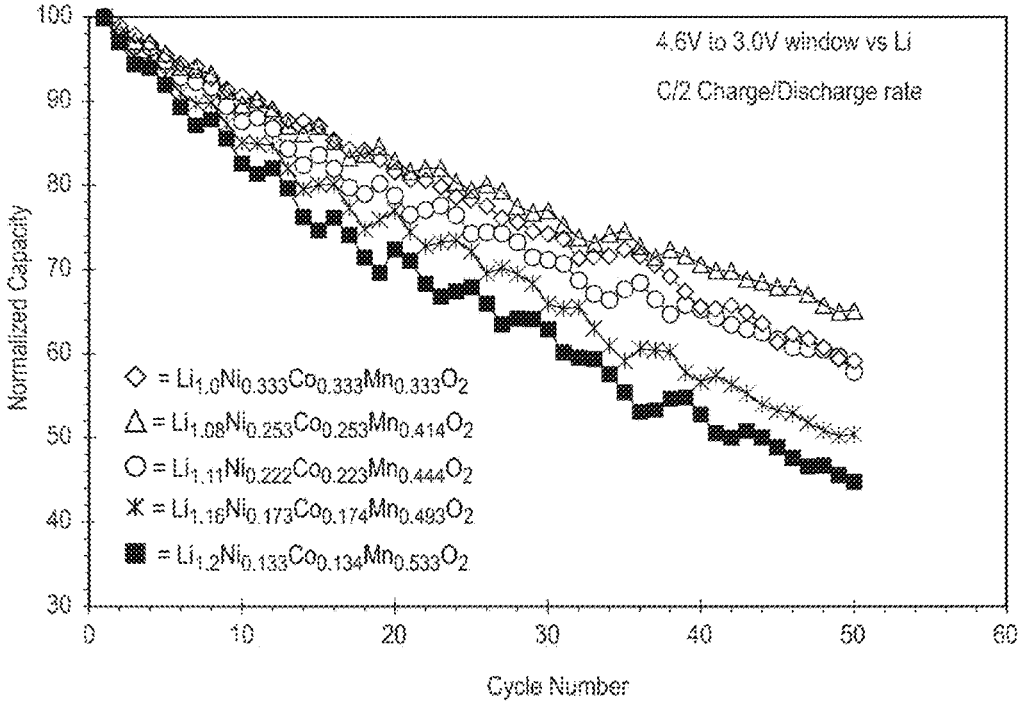
FIG. 12A (uncoated)

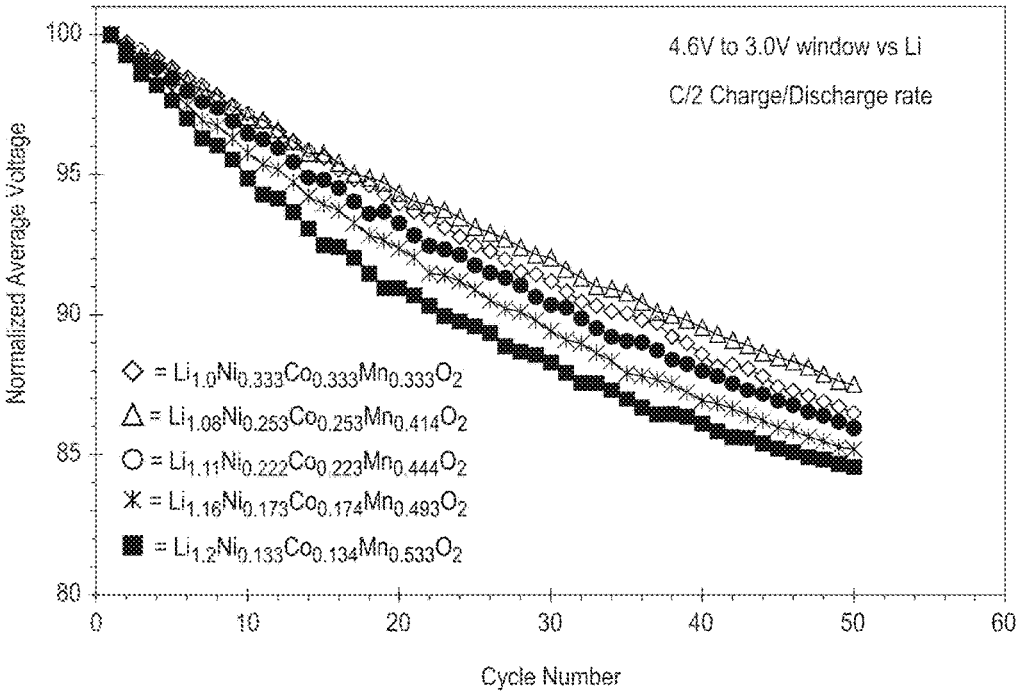
FIG. 12B (uncoated)

POSITIVE ELECTRODE ACTIVE MATERIALS WITH COMPOSITE COATINGS FOR HIGH ENERGY DENSITY SECONDARY BATTERIES AND CORRESPONDING PROCESSES

Matter enclosed in heavy brackets [ ] appears in the original patent but forms no part of this reissue specification; matter printed in italics indicates the additions made by reissue; a claim printed with strikethrough indicates that the claim was canceled, disclaimed, or held invalid by a prior post-patent action or proceeding.

CROSS REFERENCE TO RELATED APPLICATIONS

This application *is a reissue of U.S. application Ser. No. 14/995,928, filed on Jan. 14, 2016, now issued as U.S. Pat. No. 10,193,135 B2, which* claims priority to U.S. provisional patent application 62/103,641 filed on Jan. 15, 2015 to Sharma et al., entitled "Composite Cathode Materials for High Energy Density Secondary Batteries," incorporated herein by reference.

FIELD OF THE INVENTION

The invention relates to positive electrode (cathode) active materials for lithium based batteries that provide for stable cycling at relatively high voltage for good energy capacity. The invention further relates to methods for producing the high voltage stable active materials and to batteries formed with the active materials including batteries having graphitic carbon based negative electrodes or silicon-based negative electrodes.

BACKGROUND

Rechargeable lithium-ion batteries have been one of the most promising sources of energy for various consumer electronics applications ranging from laptop computers to variety of wearable gadgets. The most important challenge for any energy source from a customer perspective is, higher energy density and longer life, while from the device perspective it is the size of the energy source (higher volumetric energy density). Although various cathode chemistries are in existence. Co-rich cathodes, one of the first and foremost cathode for lithium-ion batteries, is found to be an undisputed leader mainly because of its higher crystal density, ease in synthesis, high average voltage and high conductivity. However, the main bottleneck with this class of material is its thermodynamic limitation of extracting the entire capacity of the material, where it requires higher voltages, which results in cell degradation combined with serious safety concerns.

SUMMARY OF THE INVENTION

In a first aspect, the invention pertains to a particulate material comprising a core of lithium cobalt oxide, at least a partial coating of a lithium manganese nickel cobalt oxide, and an inert stabilization nanocoating.

In a further aspect, the invention pertains to a method for forming a particulate composite coated material, the method comprising annealing a combination of a manganese nickel cobalt precursor, a lithium source and lithium cobalt oxide powder to form a lithium manganese nickel cobalt oxide coated lithium cobalt oxide particles, and coating the lithium manganese nickel cobalt oxide coated lithium cobalt oxide particles with an inert inorganic stabilization nanocoating to form composite coated stabilized lithium cobalt oxide particles. In some embodiments, the manganese nickel cobalt precursor composition can be formed as a precursor coating on the lithium cobalt oxide particles by co-precipitation.

In an additional aspect, the invention pertains to a cell comprising a cathode comprising an active material comprising lithium cobalt oxide, an anode comprising a lithium intercalation/alloying compound, and a nonaqueous electrolyte comprising lithium ion. In some embodiments, the cell cycles between about 4.47V and 2.5V with a 5th cycle discharge specific capacity with respect to the cathode of at least about 185 mAh/g at a rate of C/3 and a discharge specific capacity at the 100th cycle at a rate of C/3 that is at least about 85% of the 5th cycle discharge capacity.

In other aspects, the invention pertains to a cell comprising a cathode comprising an active material comprising lithium cobalt oxide, an anode comprising a lithium intercalation/alloying composition, and a nonaqueous electrolyte comprising lithium ion. In some embodiments, the cell has a specific energy of at least about 275 Wh/kg and an energy density of at least about 750 Wh/L.

BRIEF DESCRIPTION OF THE DRAWINGS

FIG. 11 is a plot of specific capacity as a function of cycle number cycled from 4.6V to 3.0V for coin cells formed with five different positive electrode active materials with a lithium cobalt oxide core and an LMNCO coating with varying amounts of lithium and manganese enrichment without a stabilization nanocoating with cycling in which the first two cycles used a C/10 rate for charge and discharge, cycles 3 and 4 use a C/5 rate for charge and discharge, cycles 5 and 6 used a C/3 rate for charge and discharge, cycles 7 and 8 uses a C/2 rate for charge and discharge, cycles 9 and 10 used a C/2 rate of charge and a 1C rate for discharge and cycles 11 to 60 being at a charge and discharge rate of C/2.

FIG. 12A is a plot of normalized capacity as a function of cycle number corresponding to the plots of FIG. 1I.

FIG. 12B is a set of plots of normalized average voltage for the coin cells and cycling described for FIG. 11.

DETAILED DESCRIPTION OF THE INVENTION

Figure 1B:
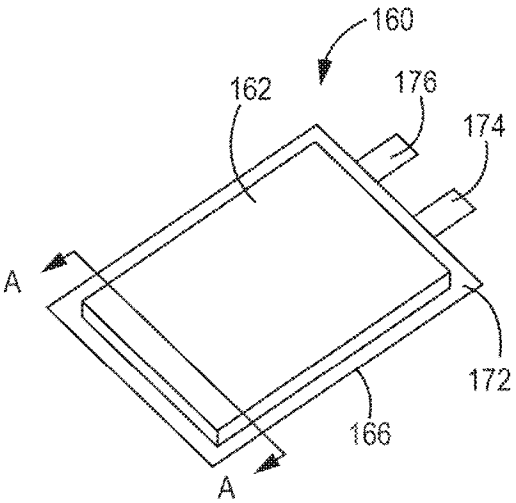
FIG. 1(B) is a perspective lower face view of the assembled pouch cell of FIG. 1(A).

A multilayered stabilization coating applied to lithium cobalt oxide provide the ability to significantly stabilize the longer cycling at higher voltages for lithium based batteries.

Specifically, a lithium manganese nickel cobalt oxide (LMNCO) composition is applied as a coating over lithium cobalt oxide core. Then, an inorganic stabilization nanocoating is applied over the initially coated (LMNCO/$LiCoO_2$) to form the high voltage stabilized active material. The successive stabilization coatings are found to provide a synergistic improvement of the high voltage performance, especially with respect to cycling stability. In particular, the stabilized materials are found to exhibit good cycling with negative electrode with graphitic active material. With silicon based negative electrodes, particularly high volumetric energy density can be achieved while finding reasonable cycling performance. Thus, the stabilized high voltage material is suitable for incorporation into improved battery designs for the production of high performance batteries. The resulting batteries can be desirable for various applications, such as for consumer electronics batteries.

While inert inorganic nanocoatings alone do not seem to significantly improve cycling of lithium cobalt oxide, a composite stabilization coating of a lithium manganese cobalt nickel oxide with an overcoat of inorganic stabilization nanocoating has been found to provide a synergistic effect for cycling stability for high voltage cycling. Specifically, in a lithium ion battery with the stabilized lithium cobalt oxide, it is found that the composite coating can provide a more desired number of stable cycles that cannot be obtained using the individual coatings. In general, commercial lithium cobalt oxide active materials are cycled at relatively lower voltages to obtain appropriate cycle stability. The ability to cycle the active materials to higher voltage provides a considerably increased specific capacity and an increase in energy output for a fixed battery footprint. Thus, the approach of applying the composite coating combines the fundamental advantages of $LiCoO_2$ (high tap density, high bulk density, relatively high capacity and relatively high average voltage) and the high voltage capability and high capacity of LMNCO active material that are further stabilized by the outer nanocoating, which is believed to be electrochemically inert. The high voltage stabilized positive electrode active materials can be effectively incorporated into desirable battery designs having reasonable cycling with either graphitic carbon based or silicon based negative electrodes to yield high volumetric energy densities based in part on the high density of the lithium cobalt oxide materials.

Lithium cobalt oxide ($LiCoO_2$) can have a crystalline structure with lithium atoms between layers with octahedral structures of cobalt and oxygen. The lithium cobalt oxide can optionally be doped with a low amount, generally no more than about 10 mole percent relative to total non-lithium metal, of non-cobalt and non-lithium metals to potentially provide some additional stabilization. Lithium cobalt oxide can have thermal stability problems, and batteries with lithium cobalt oxide can destabilize when heated, with resulting safety concerns. The composite compositions are believed to provide thermal stability relative to the lithium cobalt oxide core particles due to the introduction of manganese. Over charging of lithium cobalt oxide has been observed to result in irreversible changes to the material so that capacity is lost if lithium cobalt oxide is charged to higher voltages. In other words, all of the lithium cannot be extracted stably from the $LiCoO_2$. For commercial applications, charge voltages have generally been selected to extract roughly half of the theoretical capacity of the lithium cobalt oxide.

To form a stabilized high voltage, high capacity positive electrode (cathode) active materials, lithium manganese nickel cobalt oxides (LMNCO) are formed over lithium cobalt oxide particles, which is then coated with an inert inorganic nanocoating. The lithium cobalt oxide with the composite coating can exhibit good cycling properties at high voltage above 4.5V against lithium (or 4.4V against graphite). In some embodiments, the LMNCO coating composition can form an island structure on the surface of the lithium cobalt oxide particles. Appropriate amounts of LMNCO, generally no more than about 25 weight percent coating of multiple metal oxide composition can be effective for providing cycling stability of the composite at high voltages. The particles with the composite coating can have a relatively high density that contributes to a high energy density of the composite. A comparison of the stabilization provided during battery cycling at higher voltages by the individual stabilization coatings on lithium cobalt oxide demonstrated inferior cycling performance relative to the materials with the composite coatings that demonstrates the synergistic stabilization provided by the composite coating. The high energy density in combination with the cycling stability makes the materials desirable for consumer electronic applications, although the materials may also be suitable for vehicle applications and other applications.

Some earlier work available in open literature (papers and patents) describes coatings of lithium metal oxides with manganese and nickel to improve the high voltage stability of $LiCoO_2$. A composite positive electrode active material with a lithium cobalt oxide core and a coating of stoichiometric $LiNi_{1/3}Mn_{1/3}Co_{1/3}O_2$ cathode material is described in U.S. Pat. No. 7,883,644B2 to Paulsen et al., entitled "Stoichiometric Lithium Cobalt Oxide And Method For Preparation of the Same," incorporated herein by reference. In the '644 patent the composite is formed by making a solid state blend of $LiCoO_2$ and $LiMn_{1/3}Ni_{1/3}Co_{1/3}O_2$ and heating a pellet of the blend. Some cycling improvement was observed at moderately high voltages. The co-precipitation of $Ni_{1/2}Mn_{1/2}CO_3$ to form a shell composition over $LiCoO_2$ following firing of the composition with $Li_2CO_3$ is described in Paulsen et al., "Core-Shell Cathode Material with Size-Dependent Composition." Electrochemical and Solid-State Letters, 10(4), A101-A105 (2007), incorporated herein by reference. The formation of a nickel rich lithium metal oxide over lithium cobalt oxide in the form of islands is described in U.S. Pat. No. 8,785,042 (also published as 2009/0309063) to Paulsen et al. entitled "Island-Covered Lithium Cobaltite," incorporated herein by reference.

However, the positive electrode active materials with composite coatings described herein provide significantly improved stability to the composites relative to the stability of $LiCoO_2$ with single coatings at higher voltages. The composition and synthesis process of manganese rich compositions for direct battery use has been described in various patents and patent applications referenced below. In the process to form the improved composites described herein, lithium cobalt oxide cathode powder is dispersed in water and then LMNCO metal oxide precursor is deposited on lithium cobalt oxide cathode powder. It is found that the precipitated metal oxide precursors are found on the surface of the lithium cobalt oxide particles. Then, heat processing is used to form the complex metal oxide coating of LMNCO. In some embodiments, the LMNCO coating can be deposited with a solid state reaction in which a precursor of the LMNCO and a lithium source are physically blended with the lithium cobalt oxide prior to drying and annealing. A stabilizing nanocoating can be applied over the initially coated material to achieve synergistic stabilization of the material, and suitable stabilizing nanocoatings include, for example, metal halides, such as aluminum fluoride, inert metal oxides, or the like. The stabilizing nanocoating is believed to be inert with respect to the electrochemistry, although applicant does not want to be limited by theory, but can make a significant contribution to the cycling stability. Various combinations of LMNCO oxides and $LiCoO_2$ with a stabilizing nanocoating have been found to lead to an entirely new class of cathode materials for high voltage, high energy density and long life battery especially suitable for consumer electronics applications, as further described below in the context of lithium ion batteries.

The optional excess lithium of the active coating composition can be referenced relative to a composition $LiMO_2$, where M is one or more metals with an average oxidation state of +3. The additional lithium in the initial active coating material can provide corresponding greater amounts of cycling lithium that can be transferred to the negative electrode during charging to increase the battery capacity for a given weight of cathode active material. In some embodiments, the additional lithium is accessed at higher voltages such that the initial charge may take place at a higher voltage to access the additional capacity represented by the additional lithium of the positive electrode.

The LMNCO coating compositions can be effectively formed with a process to deposit a precursor composition by co-precipitation in the presence of lithium cobalt oxide and to sinter the resulting materials with the precursor coatings to form the LMNCO coatings. Specifically, the LMNCO precursor coating can be provided by forming a dispersion of the lithium cobalt oxide powder followed by performing a co-precipitation of a precursor compound, such as a hydroxide or carbonate, for the LMNCO onto the particles of lithium cobalt oxide. The particles with the LMNCO precursor composition is then dried and sintered to form the LMNCO coating on the lithium cobalt oxide. The further nanocoating, which does not include lithium, can then be applied over the initial coating. Results are also presented using a solid state reaction in which the lithium cobalt oxide is blended as dry powders with a manganese nickel cobalt carbonate precursor and a lithium source, such as lithium carbonate. The blended composition is then heated in a one or two step heating process to form the coating through a solid state reaction in which the precursors for the LMNCO oxides on the surface of the lithium cobalt oxide.

The co-precipitation of hydroxide precursors that are sintered to form lithium and manganese rich compositions is described in U.S. Pat. No. 8,389,160 to Venkatachalam et al., entitled "Positive Electrode Materials for Lithium Ion Batteries Having a High Specific Discharge Capacity and Processes for the Synthesis of These Materials," incorporated herein by reference. The co-precipitation of carbonate precursors that are sintered to form lithium and manganese rich compositions is described in U.S. Pat. No. 8,465,873 to Lopez et al., entitled "Positive Electrode Materials for High Discharge Capacity Lithium In batteries," incorporated herein by reference. These co-precipitation processes can be adapted for the formation of the LMNCO coating material over the LCO particles whether or not lithium rich. The lithium cobalt oxide coated with LMNCO precursor composition was physically mixed with a chosen lithium source (e.g. $Li_2CO_3$, LiOH, or the like) and subsequently subjected to a heat treatment, such as a one step or a two-step annealing process. For example, in a first annealing step, the precursor coated material can be calcined at roughly 600° C. for 15 hrs in air followed by a second annealing step involving heating at roughly 900° C. for 24 hrs under ambient atmosphere, although ranges of appropriate processing conditions are provided below.

When corresponding batteries with the intercalation-based positive electrode active materials are in use, the intercalation and release of lithium ions from the lattice induces changes in the crystalline lattice of the electroactive material. As long as these changes are essentially reversible, the capacity of the material does not change significantly with cycling. However, the capacity of the active materials is observed to decrease with cycling to varying degrees. Thus, after a number of cycles, the performance of the battery falls below acceptable values, and the battery is replaced. Rough design targets, such as 20% of initial capacity, can be set for acceptable capacity loss before replacement, although acceptable capacity loss can depend on the particular application.

Also, on the first cycle of the battery, generally the battery exhibit an irreversible capacity loss that is significantly greater than per cycle capacity loss at subsequent cycles. The irreversible capacity loss (IRCL) is the difference between the charge capacity of the new battery and the first discharge capacity. The irreversible capacity loss results in a corresponding decrease in the capacity, energy and power for the cell during subsequent cycling. The irreversible capacity lose generally can be attributed to changes of the battery materials during the initial charge-discharge cycle that are substantially maintained during subsequent cycling of the battery although with more gradual degradation. Some of the first cycle irreversible capacity losses (IRCL) may be attributed to the positive electrode active materials, especially for lithium rich compositions. Graphite has only a moderate IRCL, which is generally attributed to a solvent-electrolyte interface layer. Other higher capacity anode, i.e., negative electrode, active materials can have a higher IRCL, as summarized below.

A desirable stabilization nanocoating may decrease irreversible changes to the positive electrode active materials that can also contribute to capacity fade with cycling as well as the first cycle irreversible capacity loss. By incorporating a highly uniform stabilization nanocoating on the surface of the high capacity composite cathode particles to form a composite coating, the cycle life of the high capacity cathode based lithium ion cell battery can be improved. While not wanting to be limited by theory, the coatings may stabilize the crystal lattice of the positive electrode active material (both the lithium cobalt oxide and the LMNCO) during the uptake and release of lithium ions so that irreversible changes in the crystal lattice are reduced significantly. Inorganic coatings without lithium, such as metal halide coatings and metal oxide coatings, have been found to significantly improve the performance of lithium ion batteries with lithium rich positive electrode active materials, although the coatings are believed to be inert with respect to battery cycling. But as shown herein, the nanocoatings are found to not improve significantly the cycling of lithium cobalt oxide unless first coated with a LMNCO coating. The composite coatings with an LMNCO coating followed by an inert nanocoating though have been found to provide a synergistic improvement in the cycling performance.

The positive electrode active materials with composite coatings generally can be used for any reasonable lithium based batteries. The batteries can be secondary or rechargeable batteries with a negative electrode active material that can intercalate and/or alloy with lithium, although elemental lithium based negative electrodes are contemplated also. Specifically, if a more modest number of cycles are needed, it may even be possible to for a secondary battery with a lithium foil anode or other lithium metal or alloy based electrode. Lithium ion batteries generally comprise a positive electrode (cathode), a negative electrode (anode), a separator between the negative electrode and the positive electrode and an electrolyte comprising lithium ions. The electrodes are generally associated with metal current collectors. Lithium ion batteries refer to batteries in which the negative electrode active material is a material that takes up lithium during charging, such as through intercalation or alloying, and releases lithium during discharging. A battery can comprise multiple positive electrodes and multiple negative electrodes, such as in a stack, with appropriately placed separators, or in a roll of with a single set of flat electrodes. Electrolyte in contact with the electrodes provides ionic conductivity through the separator between electrodes of opposite polarity. A battery generally comprises current collectors associated respectively with negative electrode and positive electrode. Suitable batteries can be coin cells, cylindrical cells, prismatic cells, pouch cells, or other reasonable designs.

With respect to negative electrode active materials, graphite and similar graphitic carbon materials are generally used in commercial batteries to achieve stable cycling over many cycles. Other anode materials are of interest to introduce higher specific capacities relative to graphite. Recently, longer cycling of silicon based anodes has been achieved as described in published U.S. patent application 2013/0295439 to Masarapu et al., entitled "Battery Cell Engineering and Design to Reach High Energy," incorporated herein by reference. Silicon suboxides, composites (e.g., silicon and/or carbon composites) and the like can be effectively used as a negative electrode active material, as described in published U.S. 2012/0295155 to Deng et al., entitled "Silicon Oxide Based High Capacity Anode Materials for Lithium Ion Batteries," incorporated herein by reference. Results are presented herein with the composite coating stabilized cobalt rich positive electrode active materials combined with lithium foil, graphitic carbon and silicon-based negative electrode materials. The various battery designs described herein can provide options for selected commercial operations. For example, for stability under a low number of cycles, a lithium foil electrode can be used, for intermediate cycle stability with very high specific anode capacity and high volumetric energy density a silicon based anode material can be used and for longer cycling stability with good weight based energy density a graphitic anode active material can be used.

The batteries described herein can provide desirable performance with either a graphitic carbon-based negative electrode, a silicon-based negative electrode or a blended negative electrode. Based on the higher voltage operation available with the composite coating stabilized positive electrode active material, the graphite based negative electrodes can still provide high capacity, reasonable cycling and reasonable energy density and volumetric energy density. With the silicon-based negative electrodes, with diminished cycling stability, the batteries can provide a high capacity for a selected battery footprint, along with a high energy density and a very high volumetric energy density with the large bulk density of the positive electrode active materials and the very high specific capacities of the negative electrode active materials.

With respect to cycling, batteries formed with the composite positive electrode active materials and an intercalation/alloying based negative electrode can perform at least 225 cycles, in further embodiments at least about 450 cycles when cycled from cycle 11 with a discharge rate of C/3 from 4.5 V to 3 V with no more than a 20% capacity drop from cycle 11 to the end cycle. In particular, the long cycling performance can be obtained with a graphite based negative electrode/anode. With a silicon-based negative electrode, the batteries can exhibit a 150th cycle discharge capacity that is at least about 80% of the 5th cycle discharge capacity when cycled from the 5th cycle to the 150th cycle at a discharge rate of C/3 from 4.4V to 2.5V. With respect to the particularly high values of volumetric energy density, the batteries can have a volumetric energy density of at least about 750 Wh/L. While these batteries can have desirable use in a range of application areas, the batteries can be particularly useful for consumer electronics application where volume concerns can be acute.

Battery Structure

Batteries generally comprise a negative electrode, a positive electrode and a separator between the negative electrode and the positive electrode. A battery can comprise multiple positive electrodes and multiple negative electrodes, such as in a stack, with appropriately placed separators. Electrolyte, such as the desirable electrolytes described herein, in contact with the electrodes provides ionic conductivity through the separator between electrodes of opposite polarity. A battery generally comprises current collectors associated respectively with negative electrode and positive electrode. The stack of electrodes with their associated current collectors and separator are generally placed within a container with the electrolyte. In general, the lithium ion battery described herein comprises a positive electrode comprising a lithium intercalation material and a negative electrode comprising a silicon based lithium alloying material. The nature of the positive electrode active material and the negative electrode active material influences the resulting voltage of the battery since the voltage is the difference between the half cell potentials at the cathode and anode. The balance of the negative electrode capacity and positive electrode capacity can be selected to improve the cycling performance of the battery appropriately accounting for any supplemental lithium as described further below. In general, the negative electrode capacity can be set to be from about 20% to about 100% greater than the positive electrode capacity.

The positive electrode active compositions and negative electrode active compositions generally are powder compositions that are held together in the respective electrode with a polymer binder. The binder provides ionic conductivity to the active particles when in contact with the electrolyte. Suitable polymer binders include, for example, polyvinylidine fluoride (PVDF), polyethylene oxide, polyimide, polyethylene, polypropylene, polytetrafluoroethylene, polyacrylates, rubbers, e.g. ethylene-propylene-diene monomer (EPDM) rubber or styrene butadiene rubber (SBR), copolymers thereof, or mixtures thereof. High molecular weight (e.g., at least about 800,000 AMU) PVDF can be a desirable polymer binder for the positive electrodes.

For silicon-based anodes that exhibit significant morphological changes during cycling, thermally curable polyimide polymers have been found desirable for high capacity negative electrodes, which may be due to their high mechanical strength. The following table provides suppliers of polyimide polymers, and names of corresponding polyimide polymers.

| Supplier | Binder |
|---|---|
| New Japan Chemical Co., Ltd. | Rikacoat PN-20; Rikacoat EN-20; Rikacoat SN-20 |
| HD MicroSystems | PI-2525; PI-2555; PI-2556; PI-2574 |
| AZ Electronic Materials | PBI MRS0810H |
| Ube Industries. Ltd. | U-Varnish S; U-Varnish A |
| Maruzen petrochemical Co., Ltd. | Bani-X (Bis-allyl-nadi-imide) |
| Toyobo Co., Ltd. | Vyromax HR16NN |

With respect to polymer properties, some significant properties for high capacity negative electrode application are summarized in the following table.

| Binder | Elongation | Tensile Strength (MPa) | Elastic Modulus | Viscosity (P) |
|---|---|---|---|---|
| PVDF | 5-20% | 31-43 | 160000 psi | 10-40 |
| Polyimide | 70-100% | 150-300 | | 40-60 |
| CMC | 30-40% | 10-15 | | 30 |

PVDF refers to polyvinylidene fluoride, and CMC refers to sodium carboxy methyl cellulose. The elongation refers to the percent elongation prior to tearing of the polymer. In general, to accommodate the silicon based materials, it is desirable to have an elongation of at least about 50% and in further embodiments at least about 70%. Similarly, it is desirable for the polymer binder to have a tensile strength of at least about 50 MPa and in further embodiments at least about 100 MPa. Tensile strengths can be measured according to procedures in ASTM D638-10 Standard Test Method for Tensile Properties of Plastics, incorporated herein by reference. A person of ordinary skill in the art will recognize that additional ranges of polymer properties within the explicit ranges above are contemplated and are within the present disclosure. To form the electrode, the powders can be blended with the polymer in a suitable liquid, such as a solvent for the polymer. The resulting paste can be pressed into the electrode structure.

Positive Electrode Active Materials

Stabilized lithium cobalt oxide based composition can comprise a composite coating with a lithium manganese nickel cobalt oxide composition coating and a further coating of an inorganic nanocoating, generally believed inert. The composite coating provides for high voltage operation while avoiding rapid degradation of the capacity and average voltage with cycling. As demonstrated in the examples, the stabilization provided by the composite coatings involve a synergy that is not suggested by performance based on the individual stabilization coatings. The coatings can be applied using solution phase depositions with subsequent thermal processing.

The core of the stabilized positive electrode active material is lithium cobalt oxide. Desirable aspects of this material include wide availability due to present commercial use (although in-house synthesized lithium cobalt oxide is contemplated), a high density so that corresponding batteries can be made with a smaller volume for a particular capacity, and good cycling stability at low voltage operation. Attempts have been made to improve properties with doping of the lithium cobalt oxide with low amounts of other metals, such as magnesium and aluminum. The core materials for the composite coated lithium cobalt oxide may or may not be doped, and results obtained to date suggest that doping does not further improve the performance of the composite coated stabilized material. In any case, the reference to lithium cobalt oxide herein including for the claims refers both to a purer form or to a doped form, generally with dopants being no more than about 10 mole percent of the non-lithium metal in the composition unless explicitly indicated otherwise. Suitable dopants include, for example, Mg, Ti, Al, Ce or combinations thereof. See, for example, U.S. Pat. No. 7,192,539B2 to Maeda et al., entitled "Cobalt Oxide Particles and Process for Producing the Same. Cathode Active Materials for Non-Aqueous Electrolyte Secondary Batteries and Process for Producing the Same, and Non-Aqueous Electrolyte Secondary Cell," published U.S. patent application 2012/0156566A1 to Akalay et al., entitled "Particles of Doped Lithium Cobalt Oxide. Method for Preparing the Same, and Their Use in Lithium Ion Batteries." and U.S. Pat. No. 8,703,337B2 to Ellenwood et al., entitled "High Density Cathode Materials for Secondary Batteries." all three of which are incorporated herein by reference. In some embodiments, the lithium cobalt oxide has no more than about 10 mole percent total dopant, in further embodiments, no more than about 8 weight percent total dopant, in additional embodiments no more than about 5 weight percent total dopants, and in some embodiments no more than about 4 weight percent total dopants, wherein the dopants include all non-lithium, non-cobalt metal in the core composition relative to the total non-lithium metal. A person of ordinary skill in the art will recognize that additional ranges of dopant levels within the explicit ranges above are contemplated and are within the present disclosure.

The stabilized positive electrode active materials described herein comprise a lithium cobalt oxide core with a coating of a lithium manganese nickel cobalt oxide and a further coating of an inorganic stabilization coating. The initial coating is formed from a lithium manganese nickel cobalt oxide composition (LMNCO), which may or may not be doped. Optionally, the LMNCO may be lithium rich or lithium deficient relative to a $LiMO_2$ reference composition, where M represents the non-lithium metals. The stabilized compositions generally comprise from about 0.25 weight percent (wt %) to about 45 wt % $LMNCO_2$ in further embodiments, from about 1 wt % to about 25 wt % and in additional embodiments from about 2 wt % to about 19 wt % LMNCO. A person of ordinary skill in the art will recognize that additional ranges of quantities of LMNCO coatings are contemplated and are within the present disclosure. As described in the examples, LMNCO has been observed to form islands on the lithium cobalt oxide particles. However, it may be possible to reduce or eliminate island segregation in the future, such that island segregation is not believed to be an important contribution to the synergy in performance discovered for the materials described herein. To the extent that blending takes place during processing between the core lithium cobalt oxide and the active coating composition, such blending if present is not considered herein in describing the compositions both within the text and the claims so that references to the coated particles refer to the materials whether or not some blending occurs at the interface.

The inorganic stabilization coating is generally a lithium deficient material that is applied over the LMNCO coated lithium cobalt oxide core. The selected materials are generally believed inert with respect to the electrochemistry of lithium insertion and removal, although clearly the coating indirectly influences significantly this process. This coating is referred to as a nanocoating to reflect the thin coating that is generally formed. Suitable inorganic stabilization coatings include, for example, metal halides and metal oxides. It is believed that these stabilization nanocoatings are applied roughly uniformly over the surface in contrast with the present island formation of the LMNCO coatings. The composite coated particles can comprise from about 0.05 wt % to about 10 wt % inorganic stabilization coatings, in further embodiments from about 0.1 wt % to about 8 wt %, in other embodiments from about 0.15 wt % to about 5 wt %, and in additional embodiments from about 0.2 wt % to about 2 wt % inorganic stabilization coatings. In general, the coatings can have an average thickness of no more than 25 nm, in some embodiments from about 0.5 nm to about 20 nm, in other embodiments from about 1 nm to about 12 nm, in further embodiments from 1.25 nm to about 10 nm and in additional embodiments from about 1.5 nm to about 8 nm. The amount of coating materials to achieve desired improvement in battery performance can be related to the particle size and surface area of the uncoated material. A person of ordinary skill in the art will recognize that additional ranges of quantities of inorganic stabilization coatings are contemplated and are within the present disclosure.

The lithium cobalt oxide particles can be selected to provide a desired starting particle morphology for the composite coated particles. The coated particles can have an average particle diameter, with each diameter measured as an average of the principle axes of the particles, that in some embodiments is from about 1 micron to about 30 microns, in further embodiments from about 2 microns to about 25 microns and in some embodiments from about 5 microns to about 15 microns. While in-house synthesis is also contemplated, lithium cobalt oxide particles are commercially available from various sources, such as Umicore (Belgium). Nichia (Japan). Tianjin B & M Science and Technology Co., Ltd. (China). Ningbo Shanshan Co. Ltd. (China) and L & F Materials (Republic of Korea). A person of ordinary skill in the art will recognize that additional ranges of average particle diameter within the explicit ranges above are contemplated and are within the present disclosure.

The lithium manganese nickel cobalt oxide coating composition can be based on known positive electrode active composition and can be expected to contribute themselves to the material capacity, although it may not be measurable directly. Lithium rich version of these composition have been found with desirable high capacities, as described in U.S. Pat. No. 8,741,485B2 to Lopez et al., entitled "Layer-Layer Lithium Rich Complex Metal Oxides With High Specific Capacity and Excellent Cycling." incorporated herein by reference. It has been discovered how to obtain very long cycling with these compositions, as described in U.S. Pat. No. 8,928,286B2 to Amiruddin et al., entitled "Very Long Cycling of Lithium Ion Batteries With Lithium Rich Cathode Materials." incorporated herein by reference. As a coating material that presumably is contributing to the material's discharge capacity, the present results suggest that lithium enrichment does not contribute significantly to the capacity available for stable cycling, although a small lithium enrichment may provide a material with very good cycling properties. The present materials with a lithium cobalt oxide core provides a higher density so that a battery can be formed with a higher volumetric energy density. For consumer electronics and portable applications generally, the volume is generally a significant factor so that the volumetric energy density can be a significant factor.

The lithium manganese nickel cobalt oxide coating composition can be approximately represented with a formula $Li_{1+b}Ni_{\alpha}Mn_{\beta}Co_{\gamma}A_{\delta}O_{2-z}F_{z}$, where b ranges from about −0.15 to about 0.3, α ranges from about 0.1 to about 0.4, β ranges from about 0.2 to about 0.65, γ ranges from about 0 to about 0.46, δ ranges from about 0 to about 0.15, and z ranges from 0 to about 0.2, and where A is Na, K, Mg, Sr, Ba, Cd, Zn, Al, Ga, B, Zr, Ti, Ca, Ce, Y, Nb, Cr, Fe, V, W, Si, Li or combinations thereof. In some embodiments, the compositions have a stoichiometry approximately satisfying the relationship of $\alpha+\beta+\gamma+\delta=1-b$ such that the overall composition has the stoichiometry of $Li_{1+b}M_{1-b}O_2$, where M represents all of the non-lithium metal. In some embodiments, α ranges from about 0.1 to about 0.3, β range from about 0.3 to about 0.65, γ ranges from about 0.05 to about 0.4. With respect to the amount of dopant A present in the composition, in further embodiments δ ranges from about 0.001 to about 0.09 and in additional embodiments from about 0.005 to about 0.075. A person of ordinary skill in the art will recognize that additional ranges of parameter values within the explicit ranges above are contemplated and are within the present disclosure. In some embodiments, δ=0. i.e., the LMNCO composition is not doped. In some embodiments, z=0, although fluorine dopants are described further in U.S. Pat. No. 8,916,294 to Kumar et al., entitled "Fluorine Doped Lithium Rich Metal Oxide Positive Electrode Battery Materials With High Specific Capacity and Corresponding batteries," incorporated herein by reference. Metal dopants with a +2 valance (Mg, Ca, Sr, Ba, Zn, Cd or combinations thereof) are described further in U.S. Pat. No. 8,741,484 to Karthikeyan et al., entitled "Doped Positive Electrode Active Materials and Lithium Ion Secondary Batteries Constructed Therefrom." incorporated herein by reference.

There are some thoughts that the initial composition can be desirably formed with Mn at +4. Ni at +2 and Co at +3. If b=0, δ=0 and z=0 ($LiNi_{\alpha}Mn_{\beta}Co_{\gamma}O_2$), then this valance condition is satisfied if α=β. But if b>0, then this condition is satisfied if one writes the formula in a notation of x $Li_2MnO_3$-(1−x)$LiNi_mMn_nCo_pO_2$, where m=n. This formula is intended just to reflect the desired stoichiometry and is not intended to imply anything regarding the structure of the material. To maintain this relationship, the compositions can be referred to as lithium and manganese rich compositions. Relating the stoichiometries in the two notations, x=2b/(1−b). In some embodiments, parameter b can be approximately 0 so that the composition is not lithium rich or lithium deficient. In further embodiments, b can be from 0 to about 0.175, in further embodiments from about 0.005 to about 0.15 and in additional embodiments from about 0.01 to about 0.125 and in additional embodiments from about 0.025 to about 0.1. If lithium deficient coatings are desired, b can be from about −0.1 to about 0 and in further embodiments from about −0.075 to about −0.005. A person of ordinary skill in the art will recognize that additional ranges of parameter b within the explicit ranges above are contemplated and are within the present disclosure.

It has been observed that the lithium and manganese rich active materials exhibit a complex electrochemical behavior. For example, the lithium and manganese rich metal oxide materials can undergo significant irreversible changes during the first charge of the battery, but these lithium rich compositions can still exhibit surprisingly large specific discharge capacity on cycling. Desirable inert stabilizing coatings can reduce the first cycle irreversible capacity loss. Also, the cycling can be stabilized, such as with the coatings described herein, such that the high specific capacity can be exploited for a significant number of cycles. When forming the core of the active material, specific ranges of lithium and manganese rich metal oxide compositions have been identified that provide an improved balance between particular performance properties, such as a high specific capacity, performance at higher rates, reasonable values of average voltage and cycling properties when incorporated into a lithium based battery. The stabilization coatings described herein can further improve the performance of the composite positive electrode active compositions. The stabilization coatings have been observed to provide little if any cycling stabilization to the lithium cobalt oxide compositions alone.

As noted above, a stabilization nanocoating can be supplied by a metal halide or metal oxide, which are presumably inert with respect to the electrochemistry. With respect to metal oxide and metal halide stabilizing coatings, a coating with a composition with a selected metal and/or metalloid element(s) can be used for the coating compositions. Suitable metals and metalloid elements for the fluoride coatings include, for example, Al, Bi, Ga, Ge, In, Mg, Pb, Si, Sn, Ti, Tl, Zn, Zr and combinations thereof. Aluminum fluoride can be a desirable coating material since it has a reasonable cost and is considered environmentally benign. Metal fluoride coatings are described generally in published PCT application WO 2006/109930A to Sun et al., entitled "Cathode Active Materials Coated with Fluorine Compound for Lithium Secondary Batteries and Method for Preparing the Same." incorporated herein by reference. It has been found that metal/metalloid fluoride coatings can significantly improve the performance of lithium rich layered compositions for lithium ion secondary batteries. See, for example, the '853 application and the '332 application cited above, as well as published U.S. patent application number 2011/0111298 (the '298 application) to Lopez et al., entitled "Coated Positive Electrode Materials For Lithium Ion Batteries," incorporated herein by reference. Desirable performance results for non-fluoride metal halide coatings have been described in U.S. Pat. No. 8,663,849 to Venkatachalam et al., entitled "Metal Halide Coatings on Lithium Ion Battery Positive Electrode Materials and Corresponding Batteries." incorporated herein by reference. This patent also discusses methods for formation of desired metal halide coatings.

An increase in capacity and a reduction in irreversible capacity loss were noted with $Al_2O_3$ coatings by Wu et al., "High Capacity. Surface-Modified Layered $Li[Li_{(1-x)/3}Mn_{(2-x)/3}Ni_{x/3}Co_{x/3}]O_2$ Cathodes with Low Irreversible Capacity Loss," Electrochemical and Solid State Letters, 9 (5) A221-A224 (2006), incorporated herein by reference. The use of a LiNiPOi coating to obtain improved cycling performance is described in an article to Kang et al. "Enhancing the rate capability of high capacity $xLi_2MnO_3$ (1-x)$LiMO_2$ (M=Mn, Ni, Co) electrodes by Li—Ni—$PO_4$ treatment," Electrochemistry Communications 11, 748-751 (2009), incorporated herein by reference, and this article can be referenced generally with respect to the formation of metal phosphate coatings. Desirable properties of metal oxide coatings on lithium rich positive electrode active materials are described further in U.S. Pat. No. 8,535,832 to Karthikeyan et al., entitled "Metal Oxide Coated Positive electrode Materials for Lithium-Based Batteries." incorporated herein by reference. Aluminum zinc oxide coatings are described in published U.S. patent application 2014/0178760 to Bowling et al., entitled "High Capacity Cathode Materials with Stabilizing Nanocoatings." incorporated herein by reference. Atomic layer deposited metal oxide coatings for cathode active materials are described in published U.S. patent application 2014/0302392A1 to Li et al. (the '392 application), entitled "Uniform Stabilization Nanocoatings for Lithium Rich Complex Metal Oxides and Atomic Layer Deposition for Forming the Coating," incorporated herein by reference.

Metal halide coatings can be formed using a precipitation step followed by an anneal step using heating. Metal oxide coatings or metal phosphate coatings can be performed using the precipitation of a precursor composition followed by a sintering step. Alternatively, metal oxide coatings can be formed using atomic layer deposition as described in the '392 application cited above, and the coating for some of these embodiments can comprise from 1 to 6 atomic deposited layers.

As noted above, the synthesis of the composite coated compositions can be performed using a dispersion of the lithium cobalt oxide in water. The lithium manganese nickel cobalt oxide coating can then be applied through co-precipitation of a precursor composition that forms the LMNCO composition upon sintering. In the co-precipitation process, metal salts are dissolved into an aqueous solvent, such as purified water, with a desired molar ratio. Suitable metal salts include, for example, metal acetates, metal sulfates, metal nitrates, and combination thereof. The concentration of the solution is generally selected between 0.1M and 3M. The relative molar quantities of metal salts can be selected based on the desired formula for the product materials. Similarly, the dopant elements can be introduced along with the other metal salts at the appropriate molar quantity such that the dopant is incorporated into the precipitated material. The pH of the solution can then be adjusted, such as with the addition of $Na_2CO_3$ and/or ammonium hydroxide, to precipitate a metal hydroxide or carbonate with the desired amounts of metal elements. Generally, the pH can be adjusted to a value between about 6.0 to about 12.0. The solution can be heated and stirred to facilitate the precipitation of the hydroxide or carbonate. The precipitated metal hydroxide or carbonate can then be separated from the solution, washed and dried to form a powder prior to further processing. For example, drying can be performed in an oven at about 110° C. for about 4 to about 12 hours. A person of ordinary skill in the art will recognize that additional ranges of process parameters within the explicit ranges above are contemplated and are within the present disclosure.

The collected metal hydroxide or carbonate powder can then be subjected to a heat treatment to convert the hydroxide or carbonate composition to the corresponding oxide composition with the elimination of water or carbon dioxide. Generally, the heat treatment can be performed in an oven, furnace or the like. The heat treatment can be performed in an inert atmosphere or an atmosphere with oxygen present. In some embodiments, the material can be heated to a temperature of at least about 350° C., and in some embodiments from about 400° C. to about 800° C. to convert the hydroxide or carbonate to an oxide. The heat treatment generally can be performed for at least about 15 minutes, in further embodiments from about 30 minutes to 24 hours or longer, and in additional embodiments from about 45 minutes to about 15 hours. A further heat treatment can be performed at a second higher temperature to improve the crystallinity of the product material. This calcination step for forming the crystalline product generally is performed at temperatures of at least about 650° C., and in some embodiments from about 700° C. to about 1200° C., and in further embodiments from about 750° C. to about 110° C. The calcination step to improve the structural properties of the powder generally can be performed for at least about 15 minutes, in further embodiments from about 20 minutes to about 30 hours or longer, and in other embodiments from about 1 hour to about 36 hours. The heating steps can be combined, if desired, with appropriate ramping of the temperature to yield desired materials. In some embodiments, a one step anneal process can comprise heating from 550° C. to about 1200° C., and in further embodiments from about 700° C. to about 1100° C., for a time from about 1 hour to about 48 hours and in other embodiments from about 2 hours to about 36 hours. A person of ordinary skill in the art will recognize that additional ranges of temperatures and times within the explicit ranges above are contemplated and are within the present disclosure.

In alternative embodiments, the precursor materials can be formed by a physical blend in which the lithium cobalt oxide is blended as a dry powder with a precursor of the LMNCO composition, such as a manganese nickel cobalt hydroxide and/or a manganese nickel cobalt carbonate, as well as a lithium source, such as $Li_2CO_3$, LiOH, mixtures thereof or the like. The LMNCO precursors can be made using co-precipitation process without the presence of lithium cobalt oxide and dried to form the dry precursor powder. The dry powders can be well mixed using a mill or other good mixing apparatus. The blended powders can be anneal using a one step or two step heating process equivalent to or overlapping with the heating process for the co-precipitated compositions as described in the previous paragraph. As presented in the examples, there are some performance differences between the coatings formed by co-precipitation in the presence of lithium cobalt oxide versus the performance of materials formed through the solid state coating formation using a physical blend of the precursors compositions.

The lithium element can be incorporated into the material at one or more selected steps in the process. For example, a lithium salt can be incorporated into the solution prior to or upon performing the precipitation step through the addition of a hydrated lithium salt. In this approach, the lithium species is incorporated into the hydroxide or carbonate material in the same way as the other metals. Also, due to the properties of lithium, the lithium element can be incorporated into the material in a solid state reaction without adversely affecting the resulting properties of the product composition. Thus, for example, an appropriate amount of lithium source generally as a powder, such as $LiOH.H_2O$, LiOH, $Li_2CO_3$, or a combination thereof, can be mixed with the precipitated metal carbonate or metal hydroxide. The powder mixture is then advanced through the heating step(s) to form the oxide and then the crystalline final product material.

Further details of the hydroxide co-precipitation process are described in published U.S. patent application 2010/0086853A (the '853 application) to Venkatachalam et al. entitled "Positive Electrode Material for Lithium Ion Batteries Having a High Specific Discharge Capacity and Processes for the Synthesis of these Materials", incorporated herein by reference. Further details of the carbonate co-precipitation process are described in published U.S. patent application 2010/0151332A (the '332 application) to Lopez et al. entitled "Positive Electrode Materials for High Discharge Capacity Lithium Ion Batteries", both incorporated herein by reference.

A metal fluoride coating can be deposited using a solution based precipitation approach. A powder of the positive electrode material can be mixed in a suitable solvent, such as an aqueous solvent. A soluble composition of the desired metal/metalloid can be dissolved in the solvent. Then, $NH_4F$ can be gradually added to the dispersion/solution to precipitate the metal fluoride, and other metal halides can be similarly formed. The total amount of coating reactants can be selected to form the desired thickness of coating, and the ratio of coating reactants can be based on the stoichiometry of the coating material. The coating mixture can be heated during the coating process to reasonable temperatures, such as in the range from about 60° C. to about 100° C. for aqueous solutions from about 20 minutes to about 48 hours, to facilitate the coating process. After removing the coated electroactive material from the solution, the material can be dried and heated to temperatures generally from about 250° C. to about 600° C. for about 20 minutes to about 48 hours to complete the formation of the coated material. The heating can be performed under a nitrogen atmosphere or other substantially oxygen free atmosphere.

An oxide coating is generally formed through the deposition of a precursor coating onto the powder of active material. The precursor coating is then heated to form the metal oxide coating. Suitable precursor coating can comprise corresponding metal hydroxides, metal carbonates or metal nitrates. The metal hydroxides and metal carbonate precursor coating can be deposited through a precipitation process since the addition of ammonium hydroxide and/or ammonium carbonate can be used to precipitate the corresponding precursor coatings. A metal nitrate precursor coating can be deposited through the mixing of the active cathode powder with a metal nitrate solution and then evaporating the solution to dryness to form the metal nitrate precursor coating. The powder with a precursor coating can be heated to decompose the coating for the formation of the corresponding metal oxide coating. For example, a metal hydroxide or metal carbonate precursor coating can be heated to a temperature from about 300° C. to about 800° C. for generally from about 1 hr to about 20 hrs. Also, a metal nitrate precursor coating generally can be heated to decompose the coating at a temperature from about 250° C. to about 550° C. for at least about 30 minutes. A person of ordinary skill in the art can adjust these processing conditions based on the disclosure herein for a specific precursor coating composition.

Anode Materials

In general, the battery designs herein can be based on graphitic carbon and/or a silicon based high capacity anode active material. Other high capacity negative electrode active materials are also contemplated for use with the composite coated positive electrode active materials and are briefly summarized below. Graphitic carbon can provide long cycling stability supported by years of commercial use, which high capacity silicon-based materials offer a promise of higher capacity for a particular foot print. Results are presented herein with both types of negative electrode active materials.

Graphite, synthetic graphite and other graphitic carbons can be collectively referred to as graphitic carbons. Graphitic carbon is available commercially and generally has average particle sizes of a micron or greater and moderate values of surface area. In some embodiments, the graphitic carbon can have a D50 (mass median diameter) from about 5 microns to about 50 microns, in further embodiments from about 7 microns to about 45 microns and in additional embodiments from about 10 microns to about 8 microns to about 40 microns. Also, in some embodiments the BET surface area of graphitic carbon active material can be from about 0.25 $m^2/g$ to about 12 $m^2/g$, in further embodiments from about 0.5 $m^2/g$ to about 10 $m^2/g$ and in additional embodiments from about 0.75 $m^2/g$ to about 8 $m^2/g$. A person of ordinary skill in the art will recognize that additional ranges of particle size and surface area for graphitic carbon active materials are contemplated and are within the present disclosure. In contrast, electrically conductive carbon blacks or the like generally have surface areas of roughly 25 $m^2/g$ or greater.

With respect to high capacity silicon-based materials, the anode active materials generally have a specific capacity of at least about 700 mAh/g, in further embodiments at least about 800 mAh/g, in additional embodiments at least about 900 mAh/g, in some embodiments at least about 1350 mAh/g and in other embodiments at least about 1500 mAh/g when cycled at a rate of C/10 against lithium metal from 0.005V to 1.5V. As this implies, the specific capacity of negative electrode active material can be evaluated in a cell with a lithium metal counter electrode. However, in the batteries described herein, the negative electrodes can exhibit comparable specific capacities when cycled against high capacity lithium metal oxide positive electrode active materials. In the battery with non-lithium metal electrodes, the specific capacity of the respective electrodes can be evaluated by dividing the battery capacity by the respective weights of the active materials. As described herein, desirable cycling results can be obtained with a combination of a silicon based active material and a graphitic carbon active material with good capacities observed.

Formulations of silicon based negative electrode active materials have been developed with high capacity and reasonable cycling properties. These compositions provide potential and promising alternatives, for example, to commercially available SiO compositions. Elemental silicon has attracted significant amount of attention as a potential negative electrode material due to its very high specific capacity with respect to intake and release of lithium. Silicon forms an alloy with lithium, which can theoretically have a lithium content corresponding with more than 4 lithium atoms per silicon atom (e.g., $Li_{4.4}Si$). Thus, the theoretical specific capacity of silicon is on the order of 4000-4400 mAh/g, which is significantly larger than the theoretical capacity of about 370 mAh/g for graphite. Graphite is believed to intercalate lithium to a level of roughly 1 lithium atom for 6 carbon atoms ($LiC_6$). Also, elemental silicon, silicon alloys, silicon composites and the like can have a low potential relative to lithium metal similar to graphite. However, silicon undergoes a very large volume change upon alloying with lithium. A large volume expansion on the order of two to four times of the original volume or greater has been observed, and the large volume changes have been correlated with a significant decrease in the cycling stability of batteries having silicon-based negative electrodes.

Germanium has a similar chemistry to silicon, and germanium and germanium oxide can be used to alloy/intercalate lithium similarly to silicon and silicon oxide as described below. Thus, germanium based active anode materials can be substituted for silicon based materials described herein, and generally similar composites, alloys and mixtures thereof can be formed with germanium as are described for silicon. Germanium has a theoretical specific capacity of 1623 mAh/g compared to the silicon theoretical specific capacity of 4200 mAh/g. Similarly, tin (Sn), tin alloys and tin compounds can intercalate/alloy with lithium with a fairly high capacity and a desirable voltage range. Tin metal has a theoretical specific capacity of 993 mAh/g with respect to lithium alloying. Therefore, tin based active materials, such as tin, tin alloys (e.g., with Zn, Cd or In), tin oxides (SnO, $Sn_2O_3$ or $Sn_3O_4$), tin compounds (e.g., $ZnSnO_4$) or mixtures thereof, can be used as a high specific capacity anode active material. In general, to achieve the desired energy densities for the batteries, any high capacity anode material can be used having a specific capacity of at least approximately 700 mAh/g. The anode material can have a specific capacity from about 800 mAh/g to about 2500 mAh/g, in other embodiments from about 900 mAh/g to about 2450 mAh/g and in further embodiments from about 950 mAh/g to about 2400 mAh/g at a rate of C/3 discharged from 1.5V to 0.005V against lithium. A person of ordinary skill in the art will recognize that additional ranges of specific capacity within the explicit ranges above are contemplated and are within the present disclosure.

Also, elemental silicon as well as other high capacity materials in a negative electrode of a lithium-based battery can exhibit in some formulations a large irreversible capacity loss (IRCL) in the first charge/discharge cycle of the battery. The high IRCL of a silicon-based anode can consume a significant portion of the capacity available for the battery's energy output. Since the cathode, i.e., positive electrode, supplies all of the lithium in a traditional lithium ion battery, a high IRCL in the anode. i.e., negative electrode, can result in a low energy battery. In order to compensate for the large anode IRCL, supplemental lithium can be added to the negative electrode material to offset the IRCL. The use of supplemental lithium to improve the performance of silicon based electrodes is described also in the '294 application cited above, and published U.S. patent application 2012/0295155 to Deng et al. (the '155 application) entitled: "Silicon Oxide Based High Capacity Anode Materials for Lithium Ion Batteries", both incorporated herein by reference. The use of supplemental lithium in the improved battery designs is described further below.

High capacity silicon based anode undergoes volume expansion during the charge/discharge process. To adapt to the volume expansion, the anode of the batteries described herein can use nanostructured active silicon based materials to accommodate better for volume expansion and thus maintain the mechanical electrode stability and cycle life of the battery. Nanostructured silicon based negative electrode compositions are disclosed in the '294 application, the '155 application, as well as published U.S. Patent Application 2013/0189575 to Anguchamy et al. (the '575 application), entitled: "Porous Silicon Based Anode Material Formed Using Metal Reduction." all incorporated herein by reference.

Suitable nanostructured silicon can include, for example, nanoporous silicon and nanoparticulate silicon. Also, nanostructured silicon can be formed into composites with carbon and/or alloys with other metal elements. The objective for the design of improved silicon-based materials is to further stabilize the negative electrode materials over cycling while maintaining a high specific capacity and in some embodiments reducing the irreversible capacity loss in the first charge and discharge cycle. Furthermore, pyrolytic carbon coatings are also observed to stabilize silicon-based materials with respect to battery performance.

Silicon nanoparticles can provide a high surface area material that can desirably adapt to volume changes in the material during silicon-lithium alloying. In general, nanoparticle silicon can comprise amorphous and/or crystalline silicon nanoparticles. Crystalline silicon nanoparticles can be desirable in some embodiments because of their larger electrical conductivity, relative to amorphous silicon nanoparticles. As used herein, nanoparticle silicon can comprise submicron particles with an average primary particle diameter of no more than about 500 nm, in further embodiments no more than about 250 nm, and in additional embodiments no more than about 200 nm. A particle diameter refers to the average diameters along principle axes of a particle. Primary particle dimensions refer to the dimensions of the particulates visible in a transmission electron micrograph, and the primary particles may or may not exhibit some degree of agglomeration and/or fusing. The primary particle size generally reflects the surface area of the particle collection, which is a significant parameter for performance as a battery active material. In some embodiments, the BET surface area can range from about 1 $m^2/g$ to about 100 $m^2/g$, and in further embodiments form about 5 $m^2/g$ to about 80 $m^2/g$. BET surface areas can be evaluated, for example, using commercially available instruments. A person of ordinary skill in the art will recognize that additional ranges of particle size and surface areas within the explicit ranges above are contemplated and are within the present disclosure.

Another suitable form of nanostructured silicon comprises porous silicon particles with nanostructured pores, and negative electrode active material can desirably comprise porous silicon and/or composites thereof. Porous silicon can have improved cycling behavior due to its high surface area and/or void volume, which can facilitate accommodation of volume changes with lithium alloying and de-alloying. In some embodiments, doped and non-doped porous silicon can be formed on bulk silicon by electrochemical etching of silicon wafers. Recent work has developed porous silicon with significantly improved battery performance through the metal reduction of silicon oxide. In particular, the material can exhibit particularly good cycling properties while maintaining a high specific capacity. The formation of composites of pSi based material with carbon based material or metal can additionally mechanically stabilize the negative electrode for improved cycling. The nanostructured pSi can have surface area from about 10 $m^2/g$ to about 200 $m^2/g$ and in additional embodiments from about 10 $m^2/g$ to about 150 $m^2/g$. A person of ordinary skill in the art will recognize that additional ranges of values within the explicit BET surface area ranges above are contemplated and are within the present disclosure. For a given particle size, the surface area of a porous material can also relate to the pore sizes and void volumes. Additional description of the pSi based material from the reduction of silicon oxide can be found in the '575 application referenced above.

In some embodiments, the negative electrode active composition can comprise a silicon-metal alloy and/or intermetallic material. Suitable silicon-metal intermetallic alloys are described in U.S. Pat. No. 8,277,974 to Kumar et al., entitled "High Energy Lithium ion Batteries with Particular Negative Electrode Compositions," incorporated herein by reference. The alloy/intermetallic materials can be represented by the formula $Si_xSn_qM_yC_z$ where $(q+x)>2y+Z$, $q\geq 0$, $z\geq 0$, and M is metal selected from manganese, molybdenum, niobium, tungsten, tantalum, iron, copper, titanium, vanadium, chromium, nickel, cobalt, zirconium, yttrium, and combinations thereof. See also, published U.S. patent application 2007/0148544A to Le, entitled "Silicon-Containing Alloys Useful as Electrodes for Lithium-Ion Batteries." incorporated herein by reference. In the materials described herein, generally the carbon materials and processing conditions are selected such that the carbon does not form a SiC compound with the silicon. Results have been presented with alloys or composites having z=0 and q=0, so that the formula simplifies to $Si_xM_y$, where x>2y and M=Fe or Cu. See the '294 application cited above. The alloys were formed by appropriate milling.

With respect to the composite materials, nanostructured silicon components can be combined with, for example, carbon nanoparticles and/or carbon nanofibers. The components can be, for example, milled to form the composite, in which the materials are intimately associated. Generally, it is believed that the association has a mechanical characteristic, such as the softer silicon coated over or mechanically affixed with the harder carbon materials. In additional or alternative embodiments, the silicon can be milled with metal powders to form alloys, which may have a corresponding nanostructure. The carbon components can be combined with the silicon-metal alloys to form multi-component composites.

Also, carbon coatings can be applied over the silicon-based materials to improve electrical conductivity, and the carbon coatings seem to also stabilize the silicon based material with respect to improving cycling and decreasing irreversible capacity loss. Desirable carbon coatings can be formed by pyrolizing organic compositions. The organic compositions can be pyrolyzed at relatively high temperatures, e.g., about 800° C. to about 900° C., to form a hard amorphous coating. In some embodiments, the desired organic compositions can be dissolved in a suitable solvent, such as water and/or volatile organic solvents for combining with the silicon based component. The dispersion can be well mixed with silicon-based composition. After drying the mixture to remove the solvent, the dried mixture with the silicon based material coated with the carbon precursor can be heated in an oxygen free atmosphere to pyrolyze the organic composition, such as organic polymers, some lower molecular solid organic compositions and the like, and to form a carbon coating, such as a hard carbon coating. The carbon coating can lead to surprisingly significant improvement in the capacity of the resulting material. Also, environmentally friendly organic compositions, such as sugars and citric acid, have been found to be desirable precursors for the formation of pyrolytic carbon coatings. Elemental metal coatings, such as silver or copper, can be applied as an alternative to a pyrolytic carbon coating to provide electrical conductivity and to stabilize silicon-based active material. The elemental metal coatings can be applied through solution based reduction of a metal salt.

In some embodiments, the negative electrode active material comprises a composite of a carbon material and a silicon-based material. The silicon material, the carbon material or both can be nanostructured, and the nanostructured components can then be combined to form a composite of the silicon component and the carbon component. For example, the components of the composite can be milled together to form the composite, in which the constituent materials are intimately associated, but generally not alloyed. The nanostructures characteristics are generally expected to manifest themselves in the composite, although characterization of the composites may be less established relative to the characterization of the component materials. Specifically, the composite material may have dimensions, porosity or other high surface area characteristics that are manifestations of the nano-scale of the initial materials. In some embodiments, the negative electrode active material can comprise a silicon-based material coated onto a carbon nanofibers and/or carbon nanoparticles.

Silicon Oxide Carbon (SiO—C) Based Composites

Silicon oxide based compositions have been formed into composite materials with high capacities and very good cycling properties as described in the '155 application referenced above. In particular, oxygen deficient silicon oxides can be formed into composites with electrically conductive materials, such as conductive carbons or metal powders, which surprisingly significantly improve cycling while providing for high values of specific capacity. Furthermore, the milling of the silicon oxides into smaller particles, such as submicron structured materials, can further improve the performance of the materials. The silicon oxide based materials maintain their high capacities and good cycling as negative electrode active materials when placed into lithium ion batteries with high capacity lithium metal oxide positive electrode active materials. The cycling can be further improved with the addition of supplemental lithium into the battery and/or with an adjustment of the balance of the active materials in the respective electrodes. Supplemental lithium can replace at least some of the lithium lost to the irreversible capacity loss due to the negative electrode and can stabilize the positive electrode with respect to cycling. When configured with high capacity lithium rich manganese oxides based positive electrodes, the silicon oxide based electrode can exhibit excellent cycling at reasonable rates. Based on appropriate designs of the batteries, high energy density batteries can be produced, and the batteries are suitable for a range of commercial applications.

As with silicon, oxygen deficient silicon oxide. e.g., silicon oxide, $SiO_x$, $0.1 \leq x \leq 1.9$, can intercalate/alloy with lithium such that the oxygen deficient silicon oxide can perform as an active material in a lithium ion battery. These oxygen deficient silicon oxide materials are generally referred to as silicon oxide based materials and in some embodiments can contain various amounts of silicon, silicon oxide, and silicon dioxide. The oxygen deficient silicon oxide can incorporate a relatively large amount of lithium such that the material can exhibit a large specific capacity. However, silicon oxide is observed generally to have a capacity that fades quickly with battery cycling, as is observed with elemental silicon. The silicon oxides can be made into composite materials to address the cycling fade of the silicon oxide based materials. For example, composites can be formed with electrically conductive components that contribute to the conductivity of the electrode as well as the stabilization of the silicon oxide during cycling.

In general, a range of composites can comprise silicon oxide, carbon components, such as graphitic particles (Gr), inert metal powders (M), elemental silicon (Si), especially nanoparticles, pyrolytic carbon coatings (HC), carbon nano fibers (CNF), carbon nanotubes (CNT), or combinations thereof. Thus, the general compositions of the composites can be represented as $\alpha SiO\text{-}\beta Gr\text{-}\chi HC\text{-}\delta M\text{-}\varepsilon CNF\text{-}\gamma CNT\text{-}\phi Si$, where $\alpha$, $\beta$, $\chi$, $\delta$, $\varepsilon$, $\phi$, and $\gamma$ are relative weights that can be selected such that $\alpha+\beta+\chi+\delta+\varepsilon+\phi+\gamma=1$. Generally $0.35<\alpha<1$, $0\leq\beta<0.6$, $0\leq\chi<0.65$, $0\leq\delta<0.65$, $0\leq\varepsilon<0.65$, $0\leq\phi<0.65$ and $0\leq\gamma<0.65$. In some embodiments, composites with SiO and one or more carbon based components are desirable, which can be represented by a formula $\alpha SiO\text{-}\beta Gr\text{-}\chi HC\text{-}\varepsilon CNF\text{-}\gamma CNT$, where $0.35<\alpha<0.9$, $0\leq\beta<0.6$, $0\leq\chi<0.65$, $0\leq\varepsilon<0.65$, and $0\leq\gamma<0.65$ ($\delta=0$ and $\phi=0$), in further embodiments $0.35<\alpha<0.8$, $0.1\leq\beta<0.6$, $0.0\leq\chi<0.55$, $0\leq\varepsilon<0.55$, and $0\leq y<0.55$ in some embodiments $0.35<\alpha<0.8$, $0\leq\beta<0.45$, $0.0\leq\chi<0.55$, $0.1\leq\varepsilon<0.65$ and $0\leq\gamma<0.6$, and in additional embodiments $0.35<\alpha<0.8$, $0\leq\beta<0.55$, $0.1\leq\chi<0.65$, $0\leq\varepsilon<0.55$ and $0\leq\gamma<0.55$. In additional or alternative embodiments, composites with SiO, inert metal powders and optionally one or more conductive carbon components can be formed that can be represented by the formula $\alpha SiO\text{-}\beta Gr\text{-}\chi HC\text{-}\delta M\text{-}\varepsilon CNF\text{-}\gamma CNT$, where $0.35<\alpha<1$, $0\leq\beta<0.55$, $0\leq\chi<0.55$, $0.1\leq\delta<0.65$, $0\leq\varepsilon<0.55$, and $0\leq\gamma<0.55$. In further additional or alternative embodiments, composites of SiO with elemental silicon and optionally one or more conductive carbon components can be formed that can be represented by the formula $\alpha SiO\text{-}\beta Gr\text{-}\chi HC\text{-}\varepsilon CNF\text{-}\gamma CNT\text{-}\phi Si$, where $0.35<\alpha<1$, $0\leq\beta<0.55$, $0\leq\chi<0.55$, $0\leq\varepsilon<0.55$, $0.1\leq\phi<0.65$, and $0\leq\gamma<0.55$ and in further embodiments $0.35<\alpha<1$, $0\leq\beta<0.45$, $0.1\leq\chi<0.55$, $0\leq\varepsilon<0.45$, $0.1\leq\phi<0.55$, and $0\leq\gamma<0.55$. A person or ordinary skill in the art will recognize that additional ranges within the explicit ranges above are contemplated and are within the present disclosure. As used herein, the reference to composites implies application of significant combining forces, such as from HEMM milling, to intimately associate the materials, in contrast with simple blending, which is not considered to form composites.

The association of conductive carbon with the silicon oxide active material can improve the performance of the silicon oxide material in a lithium ion battery. Composites with electrically conductive materials and silicon oxide active material described herein provide very good cycling performance. A milling process can be used to incorporate electrically conductive diluents to form an intimate composite through the milling process. Graphitic carbon, e.g., nanostructured conductive carbon, carbon nanoparticles, carbon nanotubes and/or carbon nanofibers, can provide a good electrically conductive medium for the formation of composites with silicon oxide. Pyrolytic carbon coatings are also observed to stabilize silicon oxide based materials with respect to battery performance.

Solution based approaches for the synthesis of various Si—$SiO_x$—C-M (M=metal) composites are described in published U.S. patent application 2014/0308585 to Han et al., entitled "Silicon-Based Active Materials for Lithium Ion Batteries and Synthesis With Solution Processing." incorporated herein by reference. Silicon-based carbon composites with graphene sheets are described in published U.S. patent application 2014/0370387 to Anguchamy et al., entitled "Silicon-Silicon Oxide-Carbon Composites For Lithium Battery Electrodes and Methods for Forming the Composites," incorporated herein by reference. Commercial materials that are believed to comprise a $SiO_x$—Si—C or $SiO_x$—Si composite are available from Shin-Etsu of Japan, and are used in the batteries in the Examples.

The capacity of the anode significantly governs the energy density of the battery. The higher the capacity of the anode material the lower is the weight of the anode in the battery. When the negative electrode is made from a silicon based material, the electrode can have a discharge specific capacity at a rate of C/3 from about 800 mAh/g to 2500 mAh/g, in further embodiments from about 900 mAh/g to about 2300 mAh/g and in other embodiments from about 950 mAh/g to about 2200 mAh/g at C/3 discharge from 1.5V to 5 mV against lithium metal. A person of ordinary skill in the art will recognize that additional ranges of discharge specific capacity within the explicit ranges above are contemplated and are within the present disclosure.

Negative Electrode Active Material Blends

In some embodiments, it can be desirable to combine the silicon based active material with a significant amount of graphitic carbon active material. It has been found that a combination of the two negative electrode active materials can stabilize the cycling a desirable degree, such as for consumer electronics applications, which only a modest decrease in the capacity. The combination of active materials is distinct from the formation of composite materials in that the combination is at most a physical blend without the application of milling forces that would be expected to form an intimate single material. Thus, the two active materials in the combination function as independent active materials in the resulting negative electrodes. Also, the graphitic carbon active materials are generally independent of conductive carbon for the negative electrode, which generally comprises nanoscale carbon powders as noted herein.

To achieve desired cycling stabilization with modest decrease in capacity, the combined negative electrode active material generally comprises from about 5 wt % a to about 70 wt % graphitic carbon, in further embodiments from about 10 wt % to about 60 wt %, in additional embodiments from about 12 wt % to about 55 wt % and in other embodiments from about 15 wt % to about 45 wt % graphitic carbon relative to the total active material, with the remaining portion of the active material being a silicon based active material or a combination thereof. A person of ordinary skill in the art will recognize that additional ranges of active material compositions within the explicit ranges above are contemplated and are within the present disclosure. As noted above, suitable silicon based active materials can comprise a carbon component. It is not generally believed that this carbon component of the composite with silicon is not active in electrochemistry and generally not graphitic. In any case, such carbon components of a silicon based composite are nevertheless distinguishable through the particulate nature of added graphitic carbon intended to contribute to stabilized cycling as demonstrated in the examples below. The other features of the negative electrode and ranges of electrode parameters described herein apply equally to electrodes with the combination of silicon based active materials and graphitic carbon active materials.

Electrodes

The active material loading in the binder can be large. In some embodiments, the positive electrode comprises from about 85 to about 99% of positive electrode active material, in other embodiments from about 90 to about 98% of the positive electrode active material, and in further embodiments from about 95 to about 98% of the positive electrode active material. In some embodiments, the negative electrode has from about 50 to about 95% of negative electrode active material, in other embodiments from about 65 to about 92% of the negative electrode active material, and in further embodiments from about 75 to about 88% of the negative electrode active material. A person of ordinary skill in the art will recognize that additional ranges of particles loadings within the explicit ranges about are contemplated and are within the present disclosure.

In some embodiments, the positive electrode has from about 0.75 to about 10% polymeric binder, in other embodiments from about 0.8 to about 7.5% polymeric binder, and in further embodiments from about 0.9 to about 5% polymeric binder. In some embodiments, the negative electrode has from about 2 to about 30% polymeric binder, in other embodiments about 5 to 25% polymeric binder, and in further embodiments from about 8 to 20% polymeric binder. A person of ordinary skill in the art will recognize that additional ranges of polymer loadings within the explicit ranges above are contemplated and are within the present disclosure.

The positive electrode composition, and in some embodiments the negative electrode composition, generally can also comprise an electrically conductive additive distinct from the electroactive composition. In some embodiments, to achieve improved performance a conductive additive can have a conductivity of at least about 40 S/cm, in some embodiments at least about 50 S/cm, and in further embodiments at least about 60 S/cm. A person of ordinary skill in the art will recognize that additional ranges of conductivity within the explicit ranges above are contemplated and are within the present disclosure. Electrical conductivity, which is the inverse of resistivity, is reported by distributors, and the conductivity is generally measured using specific techniques developed by the distributors. For example, measurements of carbon black electrical resistance is performed between two copper electrodes with Super P™ carbon blacks, see Timcal Graphite & Carbon. A Synopsis of Analytical Procedures, 2008, www.timcal.com. Suitable supplemental electrically conductive additives include, for example, graphite, graphene, carbon fibers, carbon black, metal powders, such as silver powders, metal fibers, such as stainless steel fibers, and the like, and combinations thereof. Carbon nanotubes have been found to be a desirable conductive additive that can improve cycling performance for either a positive electrode or a negative electrode. In particular, for high loading levels of active materials in the electrodes, e.g., at least about 20 mg/cm$^2$, carbon nanotubes provided surprising improvement in the rate capabilities of the resulting electrodes relative to electrodes formed with other electrically conductive additives even though the electrical conductivities of the materials were similar.

In some embodiments, the positive electrode can have 0.4 weight percent to about 12 weight percent conductive additive, in further embodiments from about 0.45 weight percent to about 7 weight percent, and in other embodiments from about 0.5 weight percent to about 5 weight percent conductive additive. Similarly, the negative electrode can have 1 weight percent to about 20 weight percent conductive additive, in further embodiments from about 1.5 weight percent to about 15 weight percent, and in other embodiments from about 2 weight percent to about 10 weight percent conductive additive. In some embodiments, the conductive additive used in the negative electrode can comprise carbon nanotubes, carbon nanofibers or combinations thereof, although other combinations of conductive carbon conductive additives can be used. The conductive additive used in the positive electrode can also be a combination of electrically conductive additives. Specifically, in some embodiments, the conductive additive used in the positive electrode is a combination of carbon nanotubes with optionally an additional conductive additive including, for example, carbon fibers, carbon nanofibers, nanostructured carbon, graphene, carbon blacks, KS6, Super-P, or a combination thereof. A person of ordinary skill in the art will recognize that additional ranges of amounts of electrically conductive additive within the explicit ranges above are contemplated and are within the present disclosure.

The positive electrode and negative electrode used in the batteries described herein can have high loading levels along with reasonably high electrode density. For a particular loading level, the density is inversely correlated with thickness so that an electrode with a greater density is thinner than an electrode with a lower density. Loading is equal to the density times the thickness. In some embodiments, the negative electrode of the battery has a loading level of negative electrode active material that is at least about 1.5 mg/cm$^2$, in other embodiments from about 2 mg/cm$^2$ to about 8 mg/cm, in additional embodiments from about 2.5 mg/cm$^2$ to about 6 mg/cm$^2$, and in other embodiments from about 3 mg/cm$^2$ to about 4.5 mg/cm$^2$. In some embodiments, the negative electrode of the battery has a density in some embodiment from about 0.5 g/cc (cc=cubic centimeters (cm$^3$)) to about 2 g/cc, in other embodiment from about 0.6 g/cc to about 1.5 g/cc, and in additional embodiments from about 0.7 g/cc to about 1.3 g/cc. A person of ordinary skill in the art will recognize that additional ranges of active material loading level and electrode densities within the explicit ranges above are contemplated and are within the present disclosure.

In some embodiments, the positive electrode of the battery has a loading level of positive electrode active material that is from about 10 to about 40 mg/cm$^2$, in other embodiments from about 12 to about 37.5 mg/cm$^2$, in additional embodiments from about 13 to about 35 mg/cm$^2$, and in other embodiments from 20 to about 32.5 mg/cm$^2$ In some embodiments, the positive electrode of the battery has an active material density in some embodiment from about 2.5 g/cc to about 4.6 g/cc, in other embodiment from about 3.0 g/cc to 4.4 g/cc, and in additional embodiment from about 3.25 g/cc to about 4.3 g/cc. A person of ordinary skill in the art will recognize that additional ranges of active material loading level and electrode densities within the explicit ranges above are contemplated and are within the present disclosure.

In some embodiments, when the positive electrode or negative electrode uses a high loading level, the density of the electrode can be reduced to provide good cycling stability of the electrode. The density of the electrodes is a function, within reasonable ranges, of the press pressures. Generally, the density of the electrodes cannot be arbitrarily increased without sacrificing performance with respect to loading levels while achieving desired cycling performance and capacity at higher discharge rates.

Each electrode generally is associated with an electrically conductive current collector to facilitate the flow of electrons between the electrode and an exterior circuit. A current collector can comprise a metal structure, such as a metal foil or a metal grid. In some embodiments, a current collector can be formed from nickel, aluminum, stainless steel, copper or the like. An electrode material can be cast as a thin film onto a current collector. In some embodiments, an electrode can be loaded onto each surface of a current collector to improve battery performance. The electrode material with the current collector can then be dried, for example in an oven, to remove solvent from the electrode. In some embodiments, a dried electrode material in contact with a current collector foil or other structure can be subjected to a pressure from about 2 to about 10 kg/cm$^2$ (kilograms per square centimeter). The current collector used in the positive electrode can have a thickness from about 5 microns to about 30 microns, in other embodiments from about 10 microns to about 25 microns, and in further embodiments from about 14 microns to about 20 microns. In one embodiment, the positive electrode uses an aluminum foil current collector. The current collector used in the negative electrode can have a thickness from about 2 microns to about 20 microns, in other embodiments from about 4 microns to about 14 microns, and in further embodiments from about 6 microns to about 10 microns. In one embodiment, the negative electrode uses copper foil as current collector. A person of ordinary skill in the art will recognize that additional ranges of current collector within the explicit ranges above are contemplated and are within the present disclosure.

For electrode stacks, the areas of the electrodes can be selected reasonably based on the volume and design constraints for the particular application. Use for some consumer electronics devices or for vehicle use may suggest particular battery designs, while in other embodiments conventional battery shapes and sizes can be used. The desirable active materials described herein can be effectively used for a wide range of battery designs.

In some embodiments, the lengths and widths of a generally prismatic shaped battery can be independently from about 5 mm to 500 mm, in further embodiments from about 10 mm to about 400 mm and in additional embodiments from about 15 to about 350 mm. Thicknesses of the batteries can be from about 1 mm to about 30 mm, in further embodiments from 1.5 mm to about 25 mm and in additional embodiments from about 2 mm to about 20 mm. The volumes of the battery can range from 500 mm$^3$ to about 500.000 mm$^3$, in further embodiments from about 750 mm$^3$ to about 250.000 mm$^3$ and in other embodiments from about 1000 mm$^3$ to about 200,000 mm$^3$. For a wound cell, the two electrodes and separator are placed together and then wound, generally along a mandrel or the like using an appropriate apparatus. To obtain the corresponding volume, the length is generally substantially greater than the width. The widths can generally be from about 10 mm to about 200 mm, in further embodiments from about 12.5 mm to about 150 mm, and in further embodiments from about 15 mm to about 100 mm. The ratio of the length, corresponding to the wound dimension, to the width can be from about 3 to about 25 and in further embodiments from about 4 to about 20. Following winding, a spirally wound electrode can be prismatic, cylindrical or other convenient shape. Cylindrical batteries generally can have diameters from about 5 mm to about 75 mm, in further embodiments from about 7 mm to about 40 mm and in additional embodiments from about 8 mm to about 30 mm. A prismatic wound electrode can have overall dimensions as an electrode stack described above. For specific embodiments, coin cells can be suitable also using the electrodes described herein. A person of ordinary skill in the art would recognize that additional ranges of dimensional parameters within the explicit ranges above are contemplated and are within the present disclosure.

General Battery Features

The separator is located between the positive electrode and the negative electrode. The separator is electrically insulating while providing for at least selected ion conduction between the two electrodes. A variety of materials can be used as separators. Some commercial separator materials can be formed from polymers, such as polyethylene and/or polypropylene that are porous sheets that provide for ionic conduction. Commercial polymer separators include, for example, the Celgard® line of separator material from Hoechst Celanese. Charlotte, N.C. Suitable separator materials include, for example, 12 micron to 40 micron thick trilayer polypropylene-polyethylene-polypropylene sheets, such as Celgard® M824, which has a thickness of 12 microns. Also, ceramic-polymer composite materials have been developed for separator applications. These composite separators can be stable at higher temperatures, and the composite materials can significantly reduce the tire risk. Polymer-ceramic composites for lithium ion battery separators are sold under the trademark Separion® by Evonik Industries, Germany. An advanced generation separator is available from Teijin, Ltd., Japan under the Tradename LIELSORT®. Various commercial separators are used in the batteries for the Examples.

The electrolyte provides for ion transport between the anode and cathode of the battery during the charge and discharge processes. We refer to solutions comprising solvated ions as electrolytes, and ionic compositions that dissolve to form solvated ions in appropriate liquids are referred to as electrolyte salts. Electrolytes for lithium ion batteries can comprise one or more selected lithium salts. Appropriate lithium salts generally have inert anions. Suitable lithium salts include, for example, lithium hexafluorophosphate, lithium hexafluoroarsenate, lithium bis(trifluoromethyl sulfonyl imide), lithium trifluoromethane sulfonate, lithium tris(trifluoromethyl sulfonyl) methide, lithium tetrafluoroborate, lithium perchlorate, lithium tetrachloroaluminate, lithium chloride, lithium difluoro oxalato borate, and combinations thereof. In some embodiments, the electrolyte comprises a 1 M concentration of the lithium salts, although greater or lesser concentrations can be used.

For lithium ion batteries of interest, a non-aqueous liquid is generally used to dissolve the lithium salt(s). The solvent generally does not dissolve the electroactive materials. Appropriate solvents include, for example, propylene carbonate, dimethyl carbonate, diethyl carbonate, 2-methyl tetrahydrofuran, dioxolane, tetrahydrofuran, methyl ethyl carbonate, γ-butyrolactone, dimethyl sulfoxide, acetonitrile, formamide, dimethyl formamide, triglyme (tri(ethylene glycol) dimethyl ether), diglyme (diethylene glycol dimethyl ether), DME (glyme or 1,2-dimethyloxyethane or ethylene glycol dimethyl ether), nitromethane and mixtures thereof. Particularly useful solvents for high voltage lithium-ion batteries are described further in published U.S. patent applications 2011/0136019 to Amiruddin et al. entitled: "Lithium ion battery with high voltage electrolytes and additives", and in published U.S. patent application serial number 2015/0037690 to Delavi et al., entitled "Electrolytes for Stable Cycling of High Capacity Lithium Based Batteries," both of which are incorporated herein by reference.

Electrolyte with fluorinated additives has shown to further improve the battery performance for batteries with silicon based negative electrode active material. The fluorinated additives can include, for example, fluoroethylene carbonate, fluorinated vinyl carbonate, monochloro ethylene carbonate, monobromo ethylene carbonate, 4-(2,2,3,3-tetrafluoropropoxymethyl)-[1,3]dioxolan-2-one, 4-(2,3,3,3-tetrafluoro-2-trifluoro methyl-propyl)-[1,3]dioxolan-2-one, 4-trifluoromethyl-1,3-dioxolan-2-one, bis(2,2,3,3-tetrafluoro-propyl) carbonate, bis(2,2,3,3,3-pentafluoro-propyl) carbonate, or mixtures thereof. In some embodiments, the electrolyte can comprise from about 1 weight percent to about 35 weight percent halogenated carbonate, in further embodiments from about 3 weight percent to about 30 weight percent and in other embodiments from about 5 weight percent to about 20 weight percent halogenated carbonate in the electrolyte as a fraction of the solvent plus electrolyte salt, as a fraction of the total electrolyte weight. A person of ordinary skill in the art will recognize that additional ranges of halogenated carbonate concentrations within the explicit ranges above are contemplated and are within the present disclosure.

As described further in the Examples below, the incorporation of halogenated carbonate into the electrolyte has been observed to significantly improve the specific capacity and the cycling properties of batteries. Also, electrolytes with fluoroethylene carbonate have been found to have excellent low temperature performance as described in published U.S. patent application 2013/0157147 to Li et al. (the '147 application), entitled "Low Temperature Electrolyte for High Capacity Lithium Based Batteries." incorporated herein by reference. In some Examples, the electrolyte is formulated using a commercial consumer electronic electrolyte comprising ethylene carbonate, diethylcarbonate, and additives with added fluorethylene carbonate, and as demonstrated below excellent cycling results are obtained. The fluoroethylene carbonate component has been found to provide desirable stabilization for silicon based electrodes relative to electrolytes that provide suitable commercial performance for consumer electronics batteries with graphitic anodes.

The battery described herein can be assembled into various commercial battery designs such as prismatic shaped batteries, wound cylindrical batteries, coin cell batteries, or other reasonable battery shapes. The batteries can comprise a single pair of electrodes or a plurality of pairs of electrodes assembled in parallel and/or series electrical connection(s). While the materials described herein can be used in batteries for primary, or single charge use, the resulting batteries generally have desirable cycling properties for secondary battery use over multiple cycling of the batteries.

In some embodiments, the positive electrode and negative electrode can be stacked with the separator between them, and the resulting stacked structure can be rolled into a cylindrical or prismatic configuration to form the battery structure. Appropriate electrically conductive tabs can be welded or the like to the current collectors, and the resulting jellyroll structure can be placed into a metal canister or polymer package, with the negative tab and positive tab welded to appropriate external contacts. Electrolyte is added to the canister, and the canister is scaled to complete the battery. Some presently used rechargeable commercial batteries include, for example, the cylindrical 18650 batteries (18 mm in diameter and 65 mm long) and 26700 batteries (26 mm in diameter and 70 mm long), although other battery sizes can be used, as well as prismatic cells and foil pouch batteries of selected sizes.

Pouch cell batteries can be particularly desirable for various applications, including certain consumer electronics applications, due to stacking convenience and relatively low container weight. A pouch battery design for vehicle batteries incorporating a high capacity cathode active material is described in detail in U.S. Pat. No. 8,187,752 to Buckley et al, entitled "High Energy Lithium ion Secondary Batteries" and published U.S. patent application 2012/0028105 to Kumar et al. (the '105 application), entitled "Battery Packs for Vehicles and High Capacity Pouch Secondary Batteries for Incorporation into Compact Battery Packs," both incorporated herein by reference. Other desirable silicon based consumer electronics batteries are described in published U.S. patent application 2015/0050535A1 to Amiruddin et al., entitled "Lithium Ion Batteries with High Capacity Anode Active Material and Good Cycling for Consumer Electronics," incorporated herein by reference. While the pouch battery designs are particularly convenient for use in specific battery pack designs, the pouch batteries can be used effectively in other contexts as well with high capacity in a convenient format. Desirable results are presented in the examples with a prismatic shaped pouch battery with wound electrodes. In one embodiment, the pouch cell batteries described herein uses a ceramic type of separator to improve cycling stability and safety of the battery.

Figure 1C:
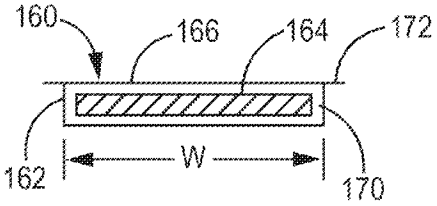
FIG. 1(C) is a bottom plan view of the pouch cell of FIG. 1(B).
Figure 1A:
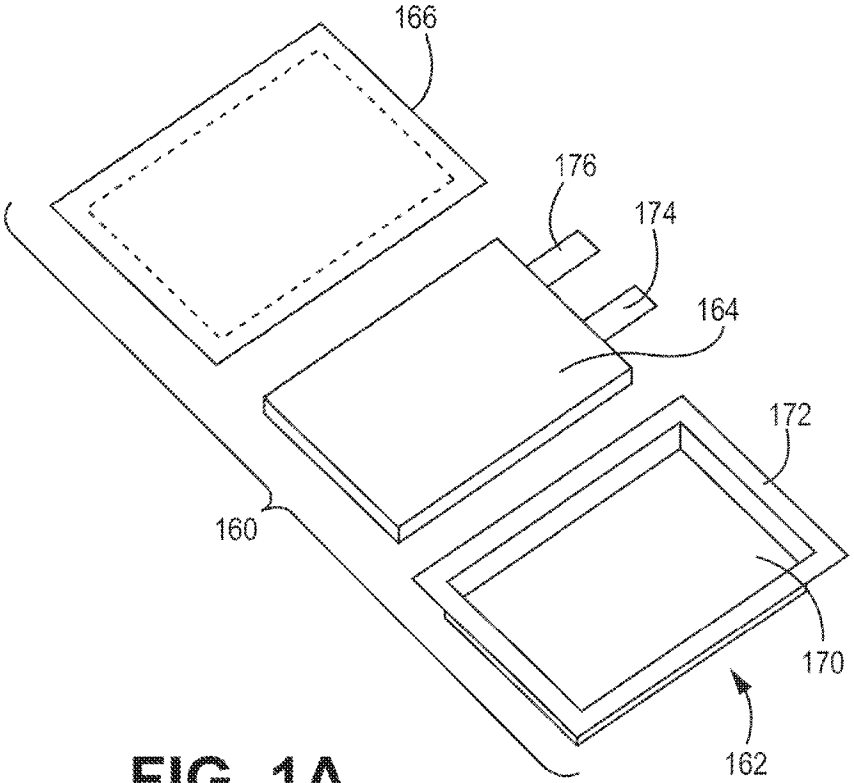
FIG. 1(A) is an expanded view of a pouch cell with a core separated from two portions of the pouch case.

A representative embodiment of a pouch battery is shown in FIGS. 1(a) to 1(d). In this embodiment, pouch battery 160 comprises pouch enclosure 162, battery core 164 and pouch cover 166. A battery core is discussed further below. Pouch enclosure 162 comprises a cavity 170 and edge 172 surrounding the cavity. Cavity 170 has dimensions such that battery core 164 can lit within cavity 170. Pouch cover 166 can be sealed around edge 172 to seal battery core 164 within the sealed battery, as shown in FIGS. 1(b) and 1(c). Terminal tabs 174, 176 extend outward from the sealed pouch for electrical contact with battery core 164. FIG. 1(c) is a schematic diagram of a cross section of the battery of FIG. 1(b) viewed along the A-A line. Many additional embodiments of pouch batteries are possible with different configurations of the edges and seals.

Figure 1D:
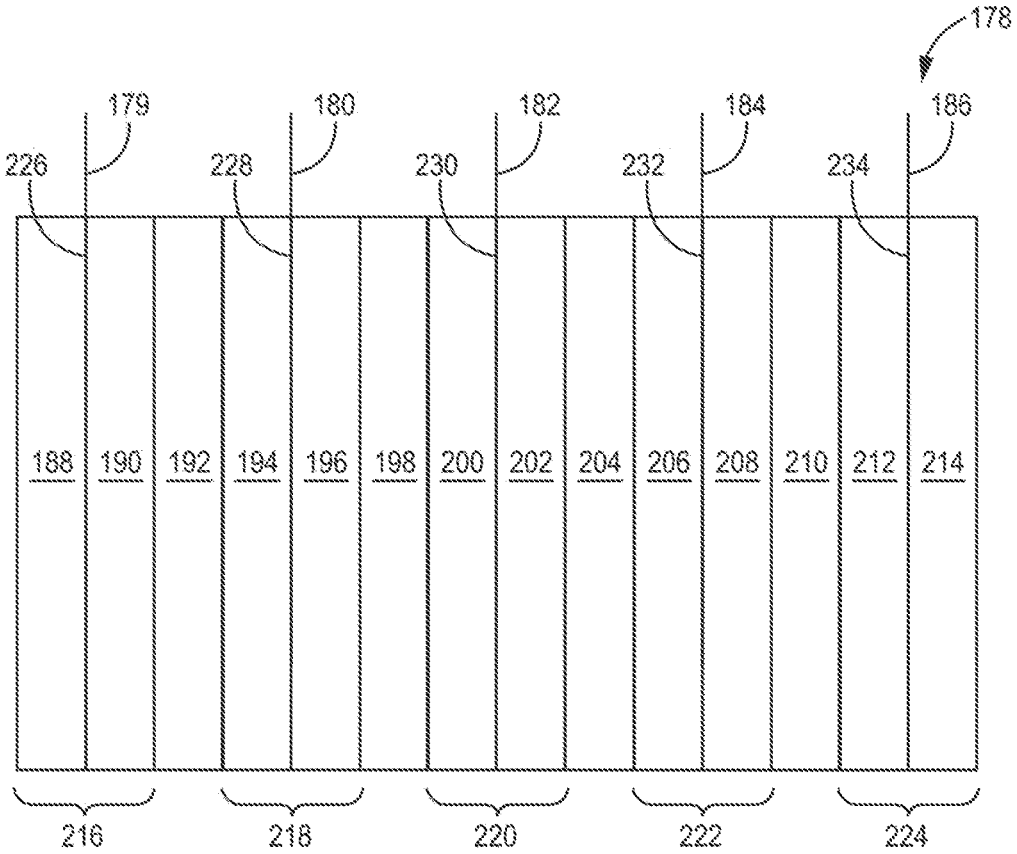
FIG. 1(D) is depiction of an embodiment of a cell core comprising an electrode stack.

FIG. 1(d) shows an embodiment of a battery core 164 that generally comprise an electrode stack. In this embodiment, electrode stack 178 comprises negative electrode structures 216, 220, 224, positive electrode structures 218, 222, and separators 192, 198, 204, 210 disposed between the adjacent positive and negative electrodes. Negative electrode structures 216, 220, 224 comprise negative electrodes 188, 190, negative electrodes 200, 202 and negative electrodes 212, 214, respectively, disposed on either side of current collectors 226, 230, 234. Positive electrode structures 218, 222 comprise positive electrodes 194, 196 and positive electrodes 206, 208, respectively, disposed on opposite sides of current collectors 228, 232, respectively. Tabs 179, 180, 182, 184, 186 are connected to current collectors 226, 228, 230, 232, 234, respectively, to facilitate the connection of the individual electrodes in series or in parallel. For vehicle applications, tabs are generally connected in parallel, so that tabs 179, 182, 186 would be electrically connected to an electrical contact accessible outside the container, and tabs 180, 184 would be electrically connected to an electrical contact as an opposite pole accessible outside the container.

Electrode stacks can have an extra negative electrode such that both outer electrodes adjacent the container are negative electrodes. Generally, a battery with stacked electrodes of the dimensions described herein have from 1 to 25 negative (or positive) electrode elements (current collector coated on one or both sides with active material), in other embodiments 2 to 22 negative (or positive) electrode elements, and in further embodiments from 3 to 20 negative (or positive) electrode elements with corresponding numbers of positive electrode elements being generally one less than the negative electrode elements. A person of ordinary skill in the an will recognize that additional ranges of electrode numbers within the explicit ranges above are contemplated and are within the present disclosure. As noted above, wound electrodes can be correspondingly used for either a cylindrical battery or a roughly prismatic shaped battery. Designs for prismatic shaped batteries with wound electrodes are described further, for example, in the '221 patent cited above. A particular design of either a stacked set of electrodes or a wound cell can be influenced by the target dimensions and the target capacity of the battery.

Supplemental Lithium and Electrode Balance

The improved high energy battery designs described herein may or may not include supplemental lithium, and this section is directed to approaches for the incorporation of supplemental lithium for appropriate embodiments as well as to describe the balance of negative electrode and positive electrode capacity balance. In general, the inclusion of supplemental lithium is desirable for batteries with silicon-based negative electrode active materials since the material exhibit relatively high irreversible capacity loss during the initial charge of the battery. Various approaches can be used for the introduction of supplemental lithium into the battery, although following corresponding initial reactions and/or charging, the negative electrode becomes associated with excess lithium for cycling from the supplemental lithium. In general, the negative electrode capacity can be set to be somewhat greater than the sum of the positive electrode capacity and the supplemental lithium capacity to avoid lithium metal plating during battery charging.

With respect to the negative electrode in batteries having supplemental lithium, the structure and/or composition of the negative electrode can change relative to its initial structure and composition following the first cycle as well as following additional cycling. Depending on the approach for the introduction of the supplemental lithium, the positive electrode may initially comprise a source of supplemental lithium and/or a sacrificial electrode can be introduced comprising supplemental lithium. Additionally or alternatively, supplemental lithium can be associated with the negative electrode. In some embodiments, the supplemental lithium can be introduced into the negative electrode using electrochemical methods in contrast with purely chemical or mechanical methods. Electrochemical methods, chemical methods or mechanical methods, such as milling, may lead to effectively irreversible formation of lithium silicate, which could work as a buffer layer when the anode expands in lithiation. With respect to initial structure of the negative electrode, in some embodiments, the negative electrode has no changes due to the supplemental lithium. In particular, if the supplemental lithium is initially located in the positive electrode or a separate electrode, the negative electrode can be an unaltered form with no lithium present until the battery is charged or at least until the circuit is closed between the negative electrode and the electrode with the supplemental lithium in the presence of electrolyte and a separator. For example, the positive electrode or supplemental electrode can comprise elemental lithium, lithium alloy and/or other sacrificial lithium source.

If sacrificial lithium is included in the positive electrode, the lithium from the sacrificial lithium source is loaded into the negative electrode during the charge reaction. The voltage during the charging based on the sacrificial lithium source may be significantly different than the voltage when the charging is performed based on the positive electrode active material. For example, elemental lithium in the positive electrode can charge the negative electrode active material without application of an external voltage since oxidation of the elemental lithium drives the reaction. For some sacrificial lithium source materials, an external voltage is applied to oxidize the sacrificial lithium source in the positive electrode and drive lithium into the negative electrode active material. The charging generally can be performed using a constant current, a stepwise constant voltage charge or other convenient charging scheme. However, at the end of the charging process, the battery should be charged to a desired voltage.

In further embodiments, at least a portion of the supplemental lithium is initially associated with the negative electrode. For example, the supplemental lithium can be in the form of elemental lithium, a lithium alloy or other lithium source that is more electronegative than the negative electrode active material. After the negative electrode is in contact with electrolyte, a reaction can take place, and the supplemental lithium is transferred to the negative electrode active material. During this process, the solid electrolyte interface (SEI) layer may also be formed. Thus, the supplemental lithium is loaded into the negative electrode active material with at least a portion consumed in formation of the SEI layer. The supplemental lithium placed into the negative electrode should be more electronegative than the active material in the negative electrode since there is no way of reacting the supplemental lithium source with the active material in the same electrode through the application of a voltage.

In some embodiments, supplemental lithium associated with the negative electrode can be incorporated as a powder within the negative electrode. Specifically, the negative electrode can comprise an active negative electrode composition and a supplemental lithium source within a polymer binder matrix, and any electrically conductive powder if present. In additional or alternative embodiments, the supplemental lithium is placed along the surface of the electrode. For example, the negative electrode can comprise an active layer with an active negative electrode composition and a supplemental lithium source layer on the surface of active layer. The supplemental lithium source layer can comprise a foil sheet of lithium or lithium alloy, supplemental lithium powder within a polymer hinder and/or particles of supplemental lithium source material embedded on the surface of the active layer. In an alternative configuration, a supplemental lithium source layer is between the active layer and current collector. Also, in some embodiments, the negative electrode can comprise supplemental lithium source layers on both surfaces of the active layer.

In additional embodiments, at least a portion of the supplemental lithium can be supplied to the negative electrode active material prior to assembly of the battery. In other words, the negative electrode can comprise partially lithium-loaded silicon based active material, in which the partially loaded active material has a selected degree of loading of lithium through intercalation/alloying or the like. For example, for the preloading of the negative electrode active material, the negative electrode active material can be contacted with electrolyte and a lithium source, such as elemental lithium, lithium alloy or other sacrificial lithium source that is more electronegative than the negative electrode active material. Since the electrochemical prelithiation of the negative electrode may induce initial irreversible changes to the negative electrode, the prelithiated negative electrode may not have any active lithium if the prelithiation is designed to just compensate for the first cycle irreversible capacity loss, which presumably also results in SEI formation.

An arrangement to perform such a preloading of lithium can comprise an electrode with silicon-based active material formed on a current collector, which are placed in vessel containing electrolyte and a sheet of lithium source material contacting the electrode. The sheet of lithium source material can comprise lithium foil, lithium alloy foil or a lithium source material in a polymer binder optionally along with an electrically conductive powder, which is in direct contact with the negative electrode to be preloaded with lithium such that electrons can flow between the materials to maintain electrical neutrality while the respective reactions take place. In the ensuing reaction, lithium is loaded into the silicon based active material through intercalation, alloying or the like. In alternative or additional embodiments, the negative electrode active material can be mixed in the electrolyte and the lithium source material for incorporation of the supplemental lithium prior to formation into an electrode with a polymer binder so that the respective materials can react in the electrolyte spontaneously.

In some embodiments, the lithium source within an electrode can be assembled into a cell with the electrode to be preloaded with lithium. A separator can be placed between the respective electrodes. Current can be allowed to flow between the electrodes. Depending on the composition of the lithium source it may or may not be necessary to apply a voltage to drive the lithium deposition within the silicon-based active material. An apparatus to perform this lithiation process can comprise a container holding electrolyte and a cell, which comprises an electrode, to be used as a negative electrode in an ultimate battery, a current collector, a separator and a sacrificial electrode that comprises the lithium source, where the separator is between the sacrificial electrode and the electrode with the silicon-based active material. A convenient sacrificial electrode can comprise lithium foil, lithium powder embedded in a polymer or lithium alloys, although any electrode with extractable lithium can be used. The container for the lithiation cell can comprise a conventional battery housing, a beaker, or any other convenient structure. This configuration provides the advantage of being able to measure the current flow to meter the degree of lithiation of the negative electrode. Furthermore, the negative electrode can be cycled once or more than once in which the negative electrode active material is loaded close to full loading with lithium. In this way, an SEI layer can be formed with a desired degree of control during the preloading with lithium of the negative electrode active material. Then, the negative electrode is fully formed during the preparation of the negative electrode with a selected preloading with lithium.

In general, the lithium source can comprise, for example, elemental lithium, a lithium alloy or a lithium composition, such as a lithium metal oxide, that can release lithium from the composition. Elemental lithium can be in the form of a thin film, such as formed by evaporation, sputtering or ablation, a lithium or lithium alloy foil and/or a powder. Elemental lithium, especially in powder form, can be coated to stabilize the lithium for handling purposes, and commercial lithium powders, such as powders from FMC Corporation, are sold with proprietary coatings for stability. The coatings generally do not alter the performance of the lithium powders for electrochemical applications. Lithium alloys include, for example, lithium silicon alloys and the like. Lithium composition with intercalated lithium can be used in some embodiments, and suitable compositions include, for example, lithium titanium oxide, lithium tin oxide, lithium cobalt oxide, lithium manganese oxide, and the like.

In general, for embodiments in which supplemental lithium is used, the amount of supplemental lithium preloaded or available to load into the active composition can be in an amount of at least about 10% of capacity, in further embodiments from about 15 percent to about 50 percent of capacity, in additional embodiments from about 20 percent to about 48 percent of capacity, and in some embodiments from about 22 percent to about 46 percent of the negative electrode active material capacity. The supplemental lithium can be selected to approximately balance the IRCL of the negative electrode, although other amounts of supplemental lithium can be used as desired. In some embodiment, the supplemental lithium added is in an amount with an oxidation capacity corresponding to from 90% to 170% of the IRCL of the negative electrode, in further embodiments, it is from 100% to 165%, and in other embodiments from 105% to 160%. A person of ordinary skill in the art will recognize that additional ranges of percentage within the explicit ranges above are contemplated and are within the present disclosure.

The positive electrode active material capacity can be estimated from the capacity of the material which can be measured by cycling the material against lithium metal foil. For example, for a given positive electrode, the capacity can be evaluated by determining the insertion and extraction capacities during the first charge/discharge cycle, where the lithium is de-intercalated or extracted from the positive electrode to 4.6V and intercalated or inserted back into the positive electrode to 2V at a rate of C/20. Similarly, for a given negative electrode, such as a silicon based electrode, the insertion and extraction capacities can be evaluated with a battery having a positive electrode comprising the silicon based active material or other ultimate negative electrode material and a lithium foil negative electrode. The capacity is evaluated by determining the insertion and extraction capacities of the battery during the first charge/discharge cycle where lithium is intercalated/alloyed to the silicon based electrode to 5 mV and de-intercalated/de-alloyed to 1.5V at a rate of C/20.

In most commercially available carbon based batteries, approximately 7-10% excess anode is taken over the cathode to prevent lithium plating. One important concern of too much excess anode is that the weight of the cell increases reducing the energy density of the cell. Compared to graphite which has a first cycle IRCL of ~7%, high capacity silicon based anodes can have IRCL ranging from about 10% to about 40%. A major portion of the capacity may become inactive in the cell after the first charge-discharge cycle and can add to significant dead weight to the battery.

For the materials described herein, the drop in capacity with cycling of the negative electrode is generally greater than for the positive electrode, so that the avoidance of lithium metal deposition with cycling suggests a greater excess capacity of the negative electrode to further stabilize cycling. Roughly, if the negative electrode capacity fades about twice as fast as the positive electrode capacity, it would be desirable to include at least 10% additional negative electrode capacity to account for cycling. In the robust battery design, at least about 10% additional negative electrode can be desired at various discharge conditions. In general, the balance can be selected such that the initial negative electrode charge capacity at a rate of C/20 from an open circuit voltage to 1.5V against lithium is about 110% to about 170%, in further embodiment from about 112.5% to about 160% and in additional embodiments from about 115% to about 150% relative to the initial positive electrode charge capacity at a rate of C/20 from an open circuit voltage to 4.6V. A person of ordinary skill in the art will recognize that additional ranges of balance within the explicit ranges above are contemplated and are within the present disclosure.

Battery Performance and Characteristics

The battery performance is a complex function of the nature of the active materials, the battery design including the electrode design and the operation of the battery including, for example, charge and discharge rates and voltage window. The ability to increase the charge voltage with the composite coated positive electrode active material can correspondingly increase the cyclable capacity and energy output. The matching of the positive electrode with a graphitic carbon based negative electrode provides for good cycling stability since graphitic electrodes can be stable for many thousands of charge/discharge cycles. On the other hand, the use of a high capacity silicon-based negative electrode active material provides for higher specific capacity that can be used to improve the energy density and volumetric energy density of the resulting batteries, presently at some expense of cycling stability.

The first cycle of the battery can be referred to as the formation cycle in reference to irreversible changes that generally take place in this cycle. The formation cycle generally can be performed under controlled conditions at relatively slow charge rates and possibly discharge rates. It has been found under some conditions it is desirable to use multiple step formation cycles as described in U.S. Pat. No. 8,765,306 to Amiruddin et al., entitled "High Voltage Battery Formation Protocols and Control of Charging and Discharging for Desirable Long Term Cycling Performance," incorporated herein by reference. Similarly, a multistep charging process has been proposed for each charge step to increase battery lifetimes, as described in published U.S. patent application 2011/0037439 to Bhardwaj et al., entitled "Increasing Energy Density in Rechargeable Lithium Battery Cells." incorporated herein by reference. Performance values are at room temperature, 22° C.-25° C., unless indicated otherwise.

The capacity of the anode significantly influences the energy density of the battery. The higher the capacity of the anode material the lower is the weight of the anode in the battery. When the negative electrode is made from a silicon based material, the electrode can have a discharge specific discharge capacity after formation at a rate of C/3 from about 800 mAh/g to 2500 mAh/g, in further embodiments from about 900 mAh/g to about 2300 mAh/g and in other embodiments from about 950 mAh/g to about 2200 mAh/g at C/3 discharge from 1.5V to 5 mV against lithium metal. A person of ordinary skill in the an will recognize that additional ranges of discharge specific capacity within the explicit ranges above are contemplated and are within the present disclosure. These values are many times higher than the specific capacity of conventional graphitic carbon based materials.

The composite coated positive electrode active materials can exhibit a specific discharge capacity against lithium of at least about 200 mAh/g, in further embodiments at least about 205 mAh/g and in other embodiments at least about 210 mAh/g discharged from 4.6V to 3V at a rate of C/10. The materials exhibit good rate capacity, and the discharge specific capacity at C/3 are essentially over the same capacity ranges as at C/10. The composite compositions exhibit an average voltage of at least about 3.95V, in further embodiments at least about 4.00V and in other embodiments at least about 4.02 when discharged from 4.6V to 3V at a discharge rate of C/10. In consideration of a smaller voltage range, the composite coated active materials can exhibit a specific discharge capacity against lithium of at least about 170 mAh/g, in further embodiments at least about 175 mAh/g and in other embodiments at least about 185 mAh/g discharged from 4.52V to 3V at a rate of C/10 or C/3. The average voltage for the voltage window from 4.52V to 3V generally decreases by less than 0.08V except for materials with a greater amount of LMNCO coating. A person of ordinary skill in the art will recognize that additional ranges of discharge specific capacity and average voltage within the explicit ranges are contemplated and are within the present disclosure.

The cycling stability can be considered separately for the graphitic carbon based negative electrode batteries and the silicon-based negative electrode batteries. For the graphitic carbon-based negative electrode batteries, the batteries can be cycled at least about 300 cycles, in further embodiments at least about 350 cycles and in additional embodiments at least about 375 cycles without a drop of more than 20% of the 5th cycle discharge capacity cycles between 4.47V and 3V at a discharge rate of C/3. For silicon-based negative electrode batteries, the batteries can be cycled at least about 100 cycles, in further embodiments at least about 150 cycles and in additional embodiments at least about 175 cycles without a drop of more than 20% of the 5th cycle discharge capacity cycles between 4.47V and 2.5V at a discharge rate of C/10 or between 4.4V and 2.5V at a discharge rate of C/3.

The size of the batteries generally affects the total capacity and energy output of the battery. The designs described herein are based on obtaining desirably high volumetric energy density while providing desirable cycling of the battery based on a silicon based active material. The batteries can exhibit a room temperature energy density at discharge of at least about 275 Wh/kg, in further embodiments at least about 300 Wh/kg and in additional embodiments from about 320 Wh/kg to about 370 Wh/kg when cycled from 4.47V to 2.5V at C/10 rate, i.e. approximately discharging the battery in 10 hours. The batteries can have a room temperature volumetric energy density at discharge of at least about 750 Wh/l (Watt hours per liter), in further embodiments at least about 775 Wh/l, and in other embodiments from about 780 Wh/l to about 860 Wh/l when cycled from 4.47V to 2.5V at C/10 rate. A person of ordinary skill in the art will recognize that additional ranges of energy density and volumetric energy density within the explicit ranges above are contemplated and are within the present disclosure.

EXAMPLES

Example 1—Composite Material Synthesis

This example describes the synthesis of the stabilized composite coated lithium cobalt oxide particles and the characterization of the composite coated materials.

Commercial lithium cobalt oxide was used as starting material in the synthesis. In a first set of samples, approximately 20 wt % lithium manganese nickel cobalt oxide was coated onto the lithium cobalt oxide core with varying amounts of lithium. Five different values of lithium and manganese enrichment were used corresponding to approximate formulas $Li_{1.0}Ni_{0.33}Co_{0.33}Ni_{0.33}O_2$ (S1), $Li_{1.08}Ni_{0.253}Co_{0.253}Mn_{0.414}O_2$ (S2), $Li_{1.11}Ni_{0.222}Co_{0.222}Mn_{0.444}O_2$ (S3). $Li_{1.16}Ni_{0.173}Co_{0.174}Mn_{0.493}O_2$ (S4), and $Li_{1.2}Ni_{0.133}Co_{0.0134}Mn_{0.533}O_2$ (S5). As the amount of lithium is increased, the relative amount of transition metal is correspondingly decreased. The lithium manganese nickel cobalt oxide (LMNCO) coating was applied by a carbonate co-precipitation process. In brief, the lithium cobalt oxide powder was mixed with deionized water, and the metal salts were dissolved into the dispersion followed by the carbonate precipitation process. Following the precipitation process, the materials are filtered, dried, mixed with $Li_2CO_3$, and subjected to a two-step heating process with a sieving step between the heating steps to prevent agglomeration. The details of the carbonate processing into the complex oxide are found in more detail in U.S. Pat. No. 8,465,873 B2 to Lopez et al. entitled "Positive Electrode Materials for High Discharge Capacity Lithium Ion Batteries", incorporated herein by reference.

An aluminum fluoride stabilization coating was applied over the lithium metal oxide coated lithium cobalt oxide. To form this coating, a powder of the metal oxide described in the previous paragraph was dispersed in water and aluminum salt was dissolved. Ammonium fluoride is added gradually to deposit the aluminum fluoride onto the particles. The dispersion was stirred for a period of time to complete the coating process. The particles were then filtered from the dispersion, and the collected powder was heated to complete the coating formation. Formation of the aluminum fluoride coating is described further in published U.S. patent application 2011/0111298A1 (the '298 application) to Lopez et al., entitled "Coated Positive Electrode Materials For Lithium Ion Batteries." incorporated herein by reference.

Another set of samples was prepared with composite coatings over lithium cobalt oxide ($LiCoO_2$) having 20 wt % (CRC-A), 10 wt % (CRC-B) or 5 wt % (CRC-C) of lithium rich and manganese rich coating LMNCO compositions deposited onto a commercial lithium cobalt oxide powder, in which the lithium rich and manganese rich composition amounts are relative to the weight of the active material. CRC-A is similar in composition with sample S2 described above. The active coating material had a moderate amount of lithium enrichment corresponding to a value of b ($Li_{1+b}M_{1-b}O_2$) from about 0.07 to 0.11 and approximately a manganese content of 35 mole percent to 45 mole percent relative to the total transition metal content. The composite material was formed using a carbonate co-precipitation process as summarized above. The material with an active coating material was further coated with 0.5 wt % of aluminum fluoride inert stabilization coating, which was formed by precipitation followed by an anneal step as described above.

Figure 2A:
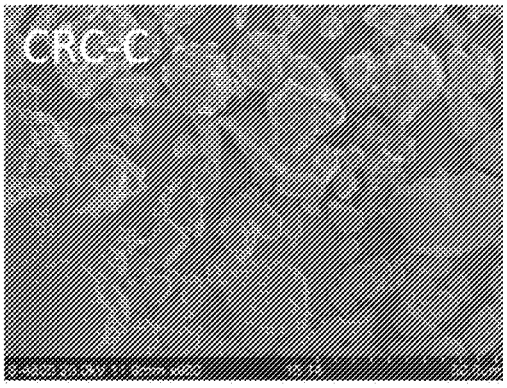
FIG. 2 is a set of photographs of scanning electron micrographs of three different materials synthesized as described in the Examples at two different magnifications with (A) and (B) being CRC-C, (C) and (D) being CRC-B and (E) and (F) being CRC-A.
Figure 2B:
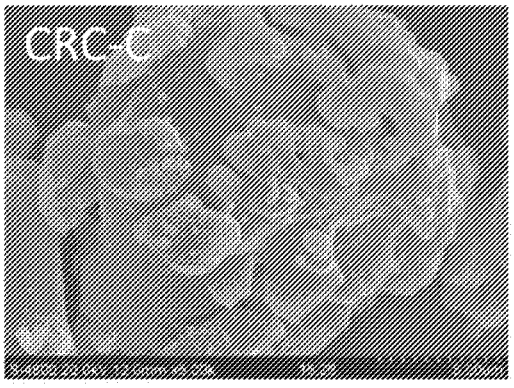
Figure 2C:
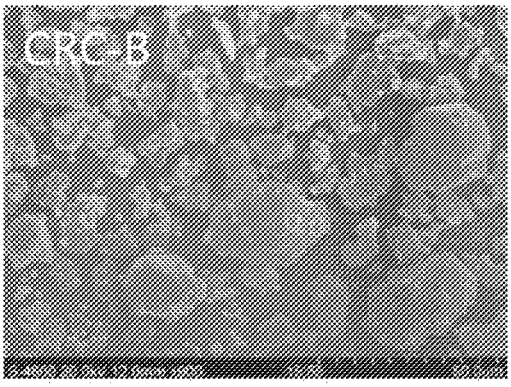
Figure 2D:
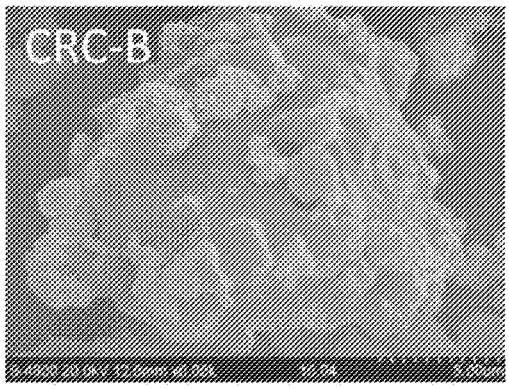
Figure 2E:
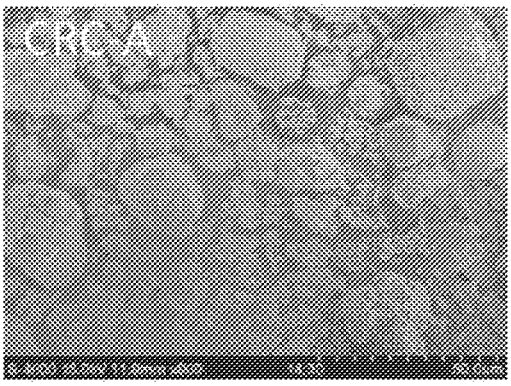
Figure 2F:
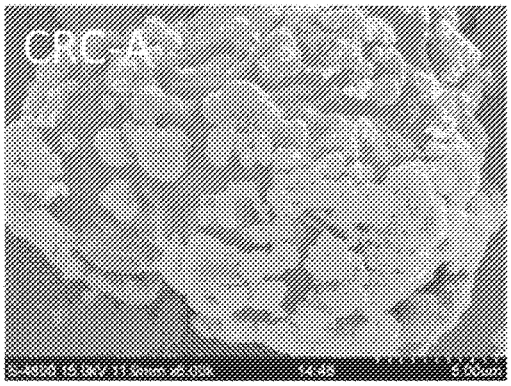
Figure 3:
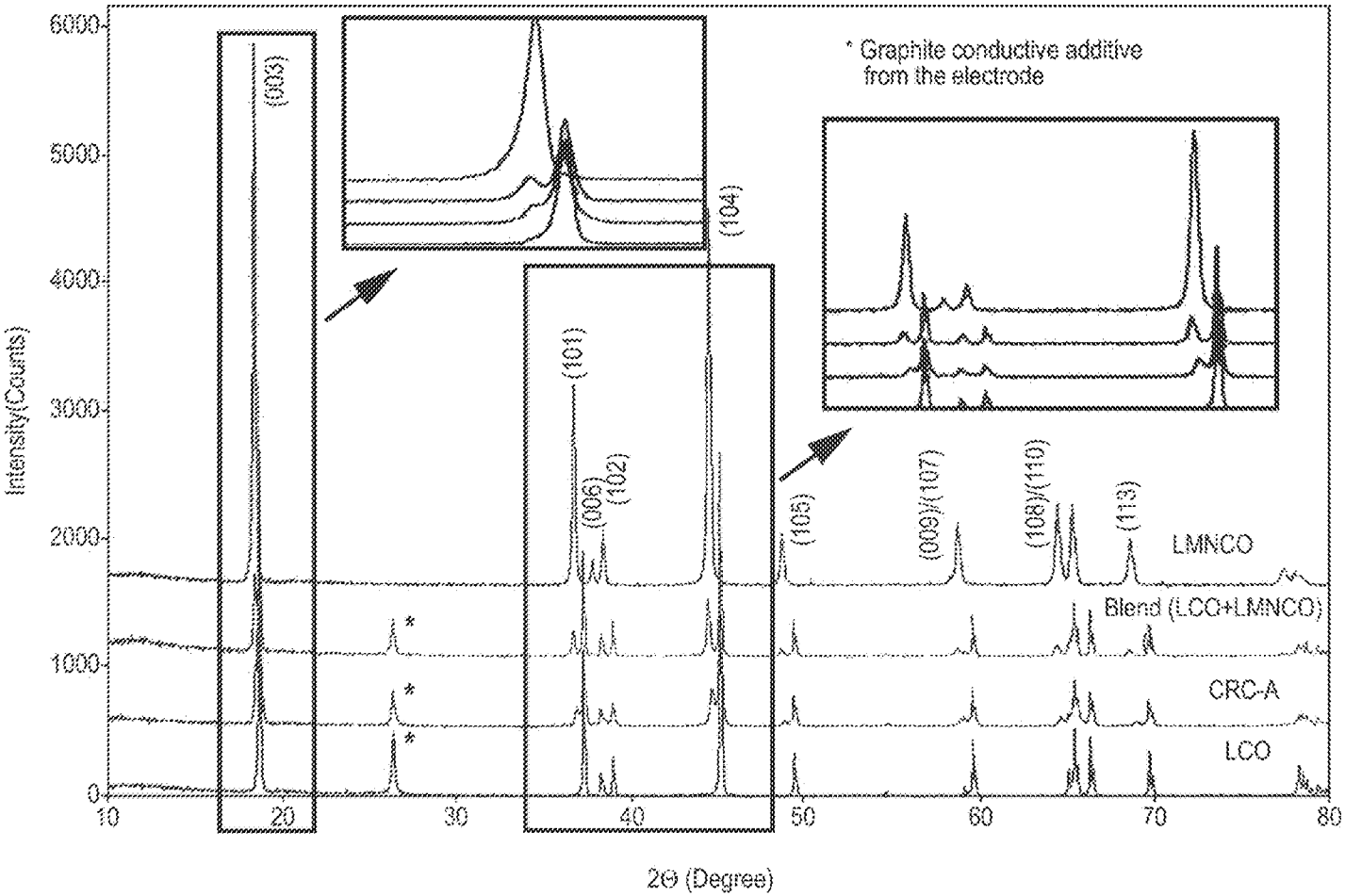
FIG. 3 is an X-ray diffractogram of composite coated materials CRC-A with comparisons to reference materials.

SEM micrographs were taken of the three materials. These are shown in FIGS. 2A-2F showing two different magnifications for each sample CRC-A (FIGS. 2A, 2B). CRC-B (FIGS. 2C, 2D) and CRC-C (FIGS. 2E, 2F). The x-ray diffractogram of the CRC-A material is shown in FIG. 3. The diffraction pattern is dominated by the lithium cobalt oxide component, but small peaks throughout the spectrum suggest contributions of other phases.

Example 2—Coin Cell Performance, Lithium Foil Negative Electrodes

This Example demonstrates the performance of coin cells using a lithium foil counter electrode to explore the performance limits of the active compositions synthesized as described in Example 1.

The active materials with a composite stabilization coating as described in Example 1 were incorporated into a cathode for the coin cell. The coin cell batteries tested in the Examples were produced following a procedure outlined here. For the formation of the positive electrode, the lithium metal oxide (LMO) powders were mixed thoroughly with acetylene black (Super P™ from Timcal, Ltd, Switzerland) and graphite (KS6™ from Timcal, Ltd) to form a homogeneous powder mixture. Separately, polyvinylidene fluoride PVDF (KF1300™ from Kureha Corp., Japan) was mixed with N-methyl-pyrrolidone NMP (Sigma-Aldrich, USA) and stirred overnight to form a PVDF-NMP solution. The homogeneous powder mixture was then added to the PVDF-NMP solution and mixed for about 2 hours to form a homogeneous slurry. The slurry was applied onto an aluminum foil current collector to form a thin wet film.

A positive electrode material was formed by drying the aluminum foil current collector with the thin wet film in vacuum oven at 110° C. for about two hours to remove NMP. The positive electrode material was pressed between rollers of a sheet mill to obtain a positive electrode with desired thickness. The mixture comprised at least about 75 weight percent active metal oxide, at least about 3 weight percent acetylene black, at least about 1 weight percent graphite, and at least about 2 weight percent polymer binder.

The positive electrode was placed inside an argon filled glove box for the fabrication of the coin cell batteries. For the coin cells, lithium foil (FMC Lithium) having thickness of 125-150 micron was used as a negative electrode. The electrolyte was selected to be stable at high voltages, and appropriate electrolytes are described in co-pending U.S. patent application Ser. No. 12/630,992 to Amiruddin et al., entitled "Lithium Ion Battery With High Voltage Electrolytes and Additives." incorporated herein by reference. A trilayer (polypropylene/polyethylene/polypropylene) microporous separator (2320 from Celgard, LLC, NC, USA) soaked with electrolyte was placed between the positive electrode and the negative electrode. A few additional drops of electrolyte were added between the electrodes. The electrodes were then sealed inside a 2032 coin cell hardware (Hohsen Corp., Japan) using a crimping process to form a coin cell battery. The resulting coin cell batteries were tested with a Maccor cycle tester to obtain charge-discharge curve and cycling stability over a number of cycles.

A first set of coin cells was formed with the CRC-A, CRC-B and CRC-C samples described in Example 1 as well as some materials for comparison with only one of the coatings. Table 1 and Table 2 describe the specific capacity and average voltage, respectively, at various discharge rates of coin cells from this first set of samples. Following usual convention, a discharge rate of C/n corresponds with an approximate full discharge over n hours. It can be seen from Table 2 that the average voltage of the CRC materials with a high charge voltage is relatively high. It is useful that the cathode exhibits a relatively high average voltage, which can enable a high average cell voltage even with a Si-based anode as there can be a 300~500 mV difference in the negative electrode potential and corresponding cell potential when compared to graphite/lithium anode and corresponding batteries. As demonstrated in large format batteries, the CRC cathode can also have active content>97% and electrode density>3.9 g/cc thus enabling high volumetric energy cell, as described in the following examples.

TABLE 1

| Sample | HCMR Wt % | Voltage Window | C/10 CC (mAh/g) | C/10 DC (mAh/g) | IRCL (mAh/g) | C/10 DC (mAh/g) | C/5 DC (mAh/g) | C/3 DC (mAh/g) |
|---|---|---|---|---|---|---|---|---|
| CRC-A | 20% | 4.60-3 V | 233 | 218 | 15 | 214 | 212 | 210 |
| | | 4.52-3 V | 205 | 190 | 15 | 190 | 188 | 187 |
| CRC-B | 10% | 4.60-3 V | 230 | 218 | 11 | 218 | 217 | 215 |
| | | 4.52-3 V | 202 | 191 | 11 | 191 | 190 | 189 |
| CRC-C | 5% | 4.60-3 V | 232 | 224 | 8 | 223 | 221 | 218 |
| | | 4.52-3 V | 204 | 195 | 9 | 195 | 194 | 194 |

TABLE 2

| Sample | Ratio | Voltage Window | 1st C/10 (V) | 2nd C/10 (V) | C/5 (V) | C/3 (V) |
|---|---|---|---|---|---|---|
| CRC-A | 20% | 4.60-3 V | 4.020 | 4.054 | 4.029 | 4.003 |
| | | 4.52-3 V | 3.990 | 4.001 | 3.976 | 3.950 |
| CRC-B | 10% | 4.60-3 V | 4.019 | 4.059 | 4.028 | 4.002 |
| | | 4.52-3 V | 3.997 | 4.009 | 3.984 | 3.961 |
| CRC-C | 5% | 4.60-3 V | 4.050 | 4.078 | 4.045 | 4.008 |
| | | 4.52-3 V | 4.014 | 4.026 | 4.005 | 3.983 |

Figure 4A:
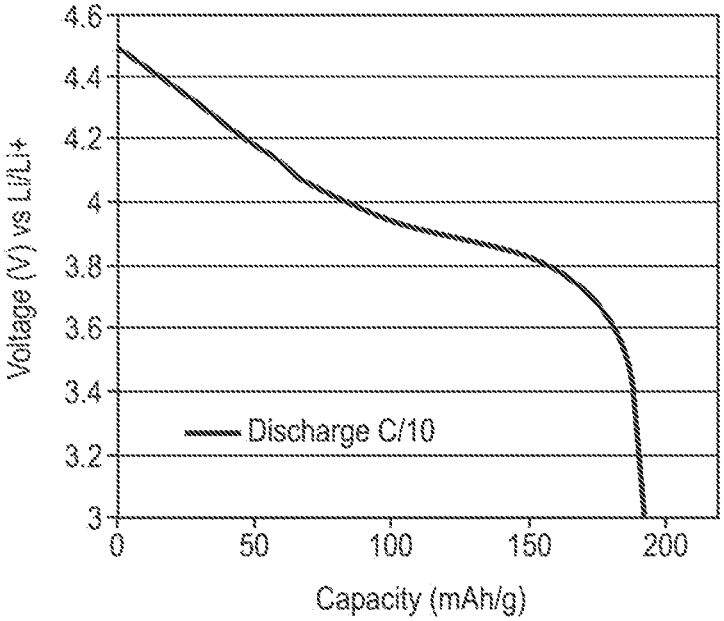
FIG. 4A is a plot of voltage as a function of capacity from 4.52V to 3.0V at a discharge rate of C/10 for the CRC-B material in a coin cell with a lithium foil negative electrode.
Figure 4B:
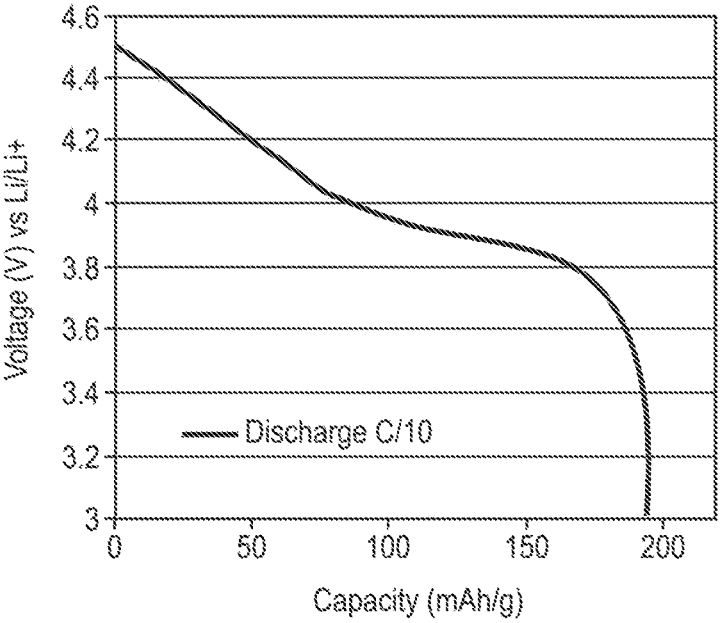
FIG. 4B is a plot of voltage as a function of capacity from 4.52V to 3.0V at a discharge rate of C/10 for the CRC-C material in a coin cell with a lithium foil negative electrode.
Figure 5A:
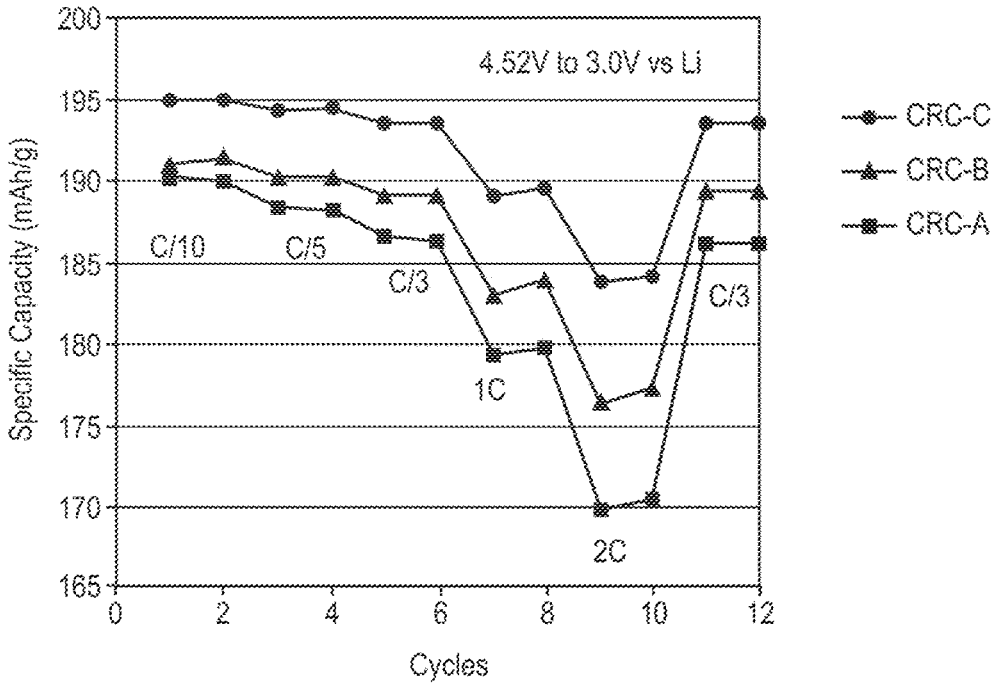
FIG. 5A is a plot of specific capacity as a function of charge/discharge cycles between 4.52V and 3.0V for three composite coated lithium cobalt oxide materials (CRC-A, CRC-B and CRC-C) in a coin cell with a lithium foil negative electrode with cycling at a discharge rate of C/10 for cycles 1 and 2, C/5 for cycles 3 and 4, C/3 for cycles 5 and 6, 1C for cycles 7 and 8, 2C for cycles 9 and 10 and C/3 for cycles 11 and 12.
Figure 5B:
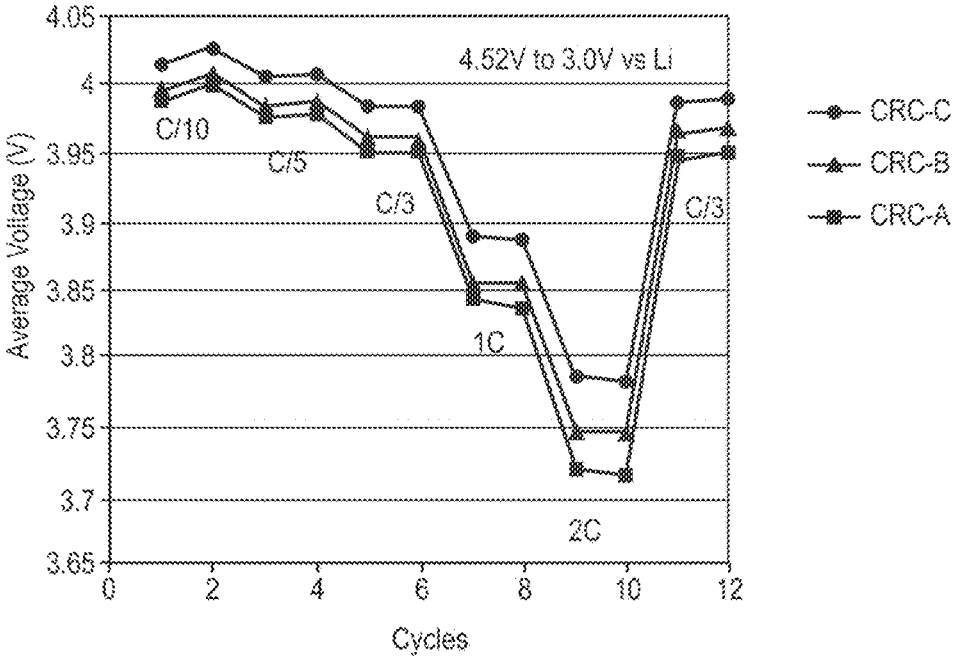
FIG. 5B is a plot of average voltage as a function of charge/discharge cycles between 4.52V and 3.0V for three composite coated lithium cobalt oxide materials (CRC-A, CRC-B and CRC-C) in a coin cell with a lithium foil negative electrode with cycling at a discharge rate of C/10 for cycles 1 and 2, C/5 for cycles 3 and 4, C/3 for cycles 5 and 6, 1C for cycles 7 and 8, 2C for cycles 9 and 10 and C/3 for cycles 11 and 12.

FIG. 4 shows the discharge curve of CRC-B (FIG. 4A) and CRC-C cathode (FIG. 4B) between 4.52V and 3.0V. The curves show a roughly linear drop in voltage from 4.52V to about 3.7V, although there is a little flattening between 4V and 3.8V. FIGS. SA and SB are plots of specific capacity (A) and average voltage (B) at different discharge rates (C/10, C/5, C/3, 1C and 2C) showing the rate capability of CRC composite cathode materials. The CRC-A, CRC-B and CRC-C materials exhibit reasonable high rate performance.

Figure 6B:
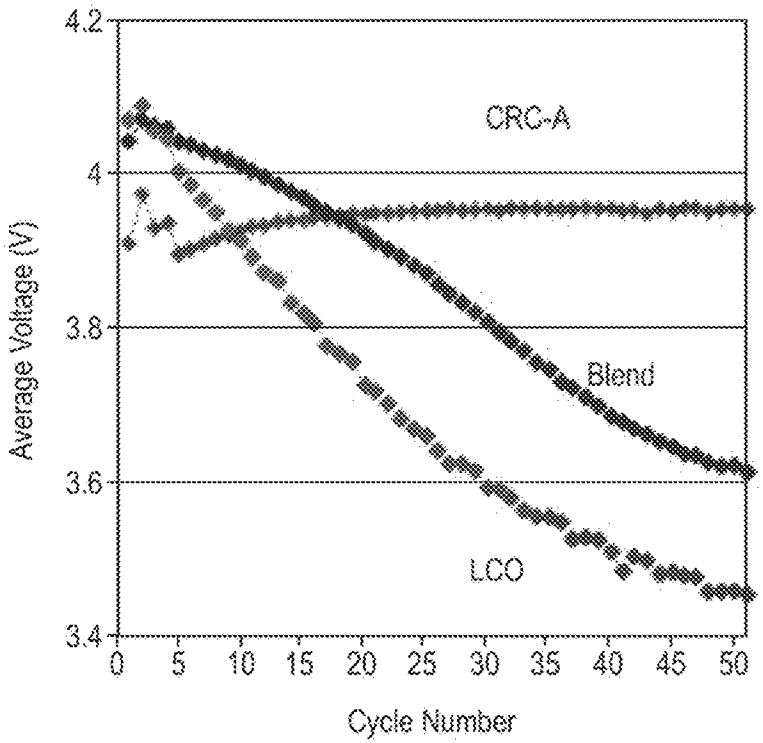
FIG. 6B is a plot of average voltage as a function of charge/discharge cycles between 4.6V and 3.0V for a composite coated lithium cobalt oxide materials (CRC-A) and for comparison commercial lithium cobalt oxide and a physical blend of lithium cobalt oxide in a coin cell with a lithium foil negative electrode with the material of the coating simply mixed with the lithium cobalt oxide with cycling at a discharge rate of C/10 for cycles 1 and 2, C/5 for cycles 3 and 4, C/3 for cycles 5 to 54.
Figure 6A:
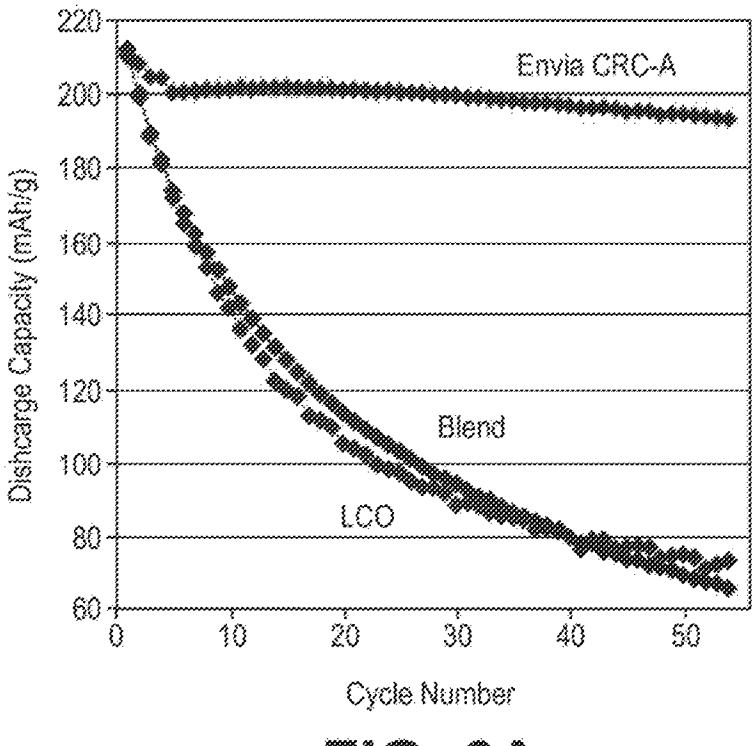
FIG. 6A is a plot of specific capacity as a function of charge/discharge cycles between 4.6V and 3.0V for a composite coated lithium cobalt oxide materials (CRC-A) and for comparison commercial lithium cobalt oxide and a physical blend of lithium cobalt oxide with the material of the coating simply mixed with the lithium cobalt oxide in a coin cell with a lithium foil negative electrode with cycling at a discharge rate of C/10 for cycles 1 and 2, C/5 for cycles 3 and 4, C/3 for cycles 5 to 54.

For comparison, coin cells were similarly constructed with just the lithium cobalt oxide starting material or with a physical blend of the lithium cobalt oxide powder with a powder of the LMNCO in particles rather than as a coating. The LMNCO particles in the physical blend had a $AlF_3$ coating. The physical blend has a composition corresponding to the CRC-A material. i.e., the lithium manganese nickel cobalt oxide is mixed with the lithium cobalt oxide rather than coated onto it. FIGS. 6A (discharge capacity) and 6B (average voltage) demonstrates high voltage cycling stability of CRC-A cathode in coin cell with a lithium foil counter electrode compared with lithium cobalt oxide or the physical blend of active materials. The cells were cycled between 4.6V and 3.0V at a rate of C/10 for cycles 1 and 2, C/5 for cycles 3 and 4 and at C/3 for cycle 5 and beyond. As can be seen from FIGS. 6A and 6B, cathodes with CRC-A active material have shown very stable cycling performance at high voltages ~4.6V relative to the corresponding lithium cobalt oxide or the physical blend, which have steep fade over 50 cycles. The structural changes associated with $LiCoO_2$ when lithium>0.5 moles is being removed from the $LiCoO_2$ matrix has been much reduced leading to the improved structural as well as the cycling stability. The presence of LMNCO active material along with $LiCoO_2$ as a second component in a simple blend has not shown a benefit as observed in a composite coated CRC material.

Figure 7:
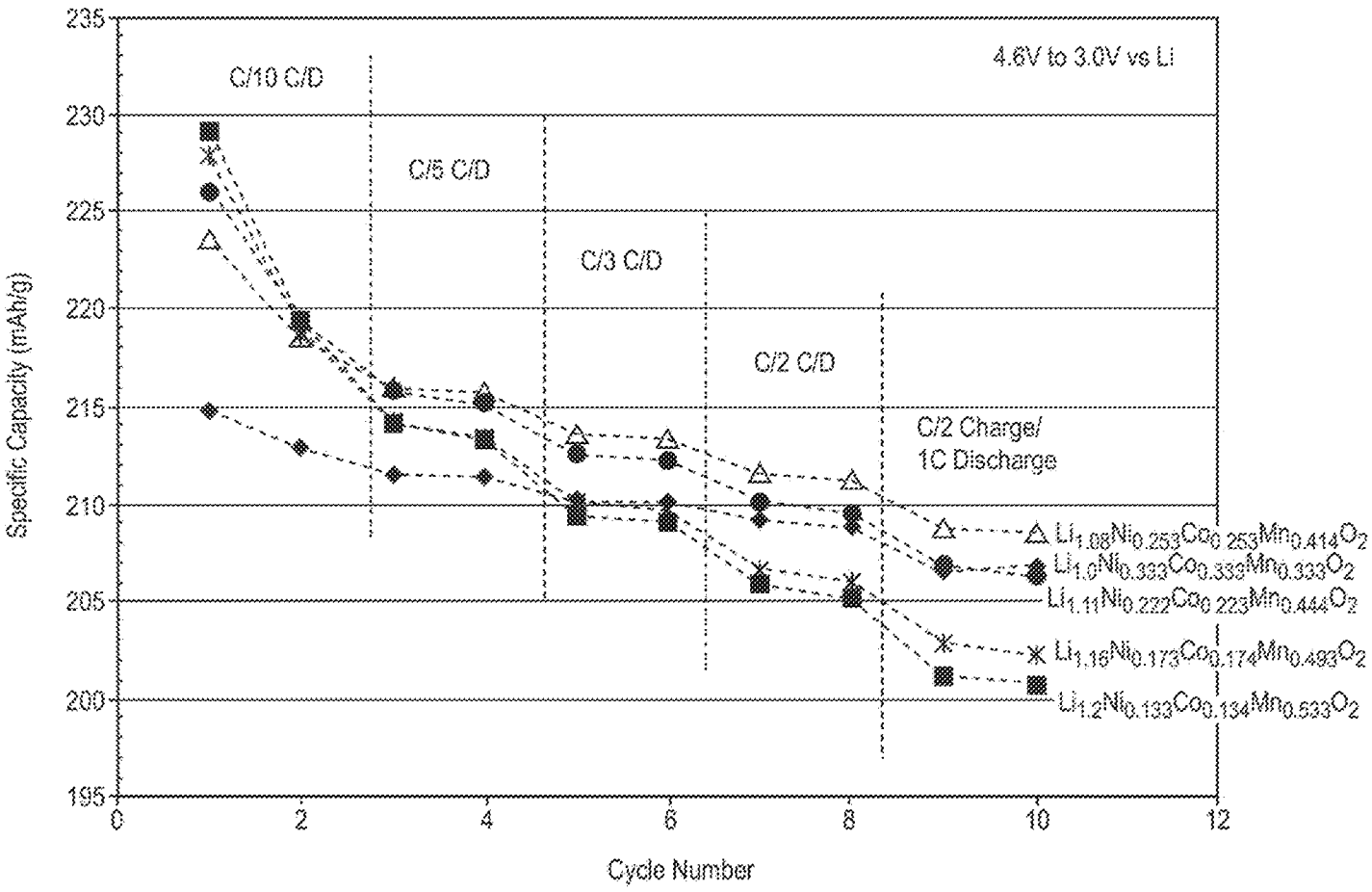
FIG. 7 is a plot of specific discharge capacity as a function of cycle number cycled between 4.6V and 3.0V for live composite coated lithium cobalt oxide materials with varying amounts of lithium and manganese enrichment evaluated in coin cells with a lithium foil negative electrode in which the first two cycles used a C/10 rate for charge and discharge, cycles 3 and 4 use a C/5 rate for charge and discharge, cycles 5 and 6 used a C/3 rate for charge and discharge, cycles 7 and 8 uses a C/2 rate for charge and discharge, and cycles 9 and 10 used a C/2 rate of charge and a 1C rate for discharge.
Figure 8:
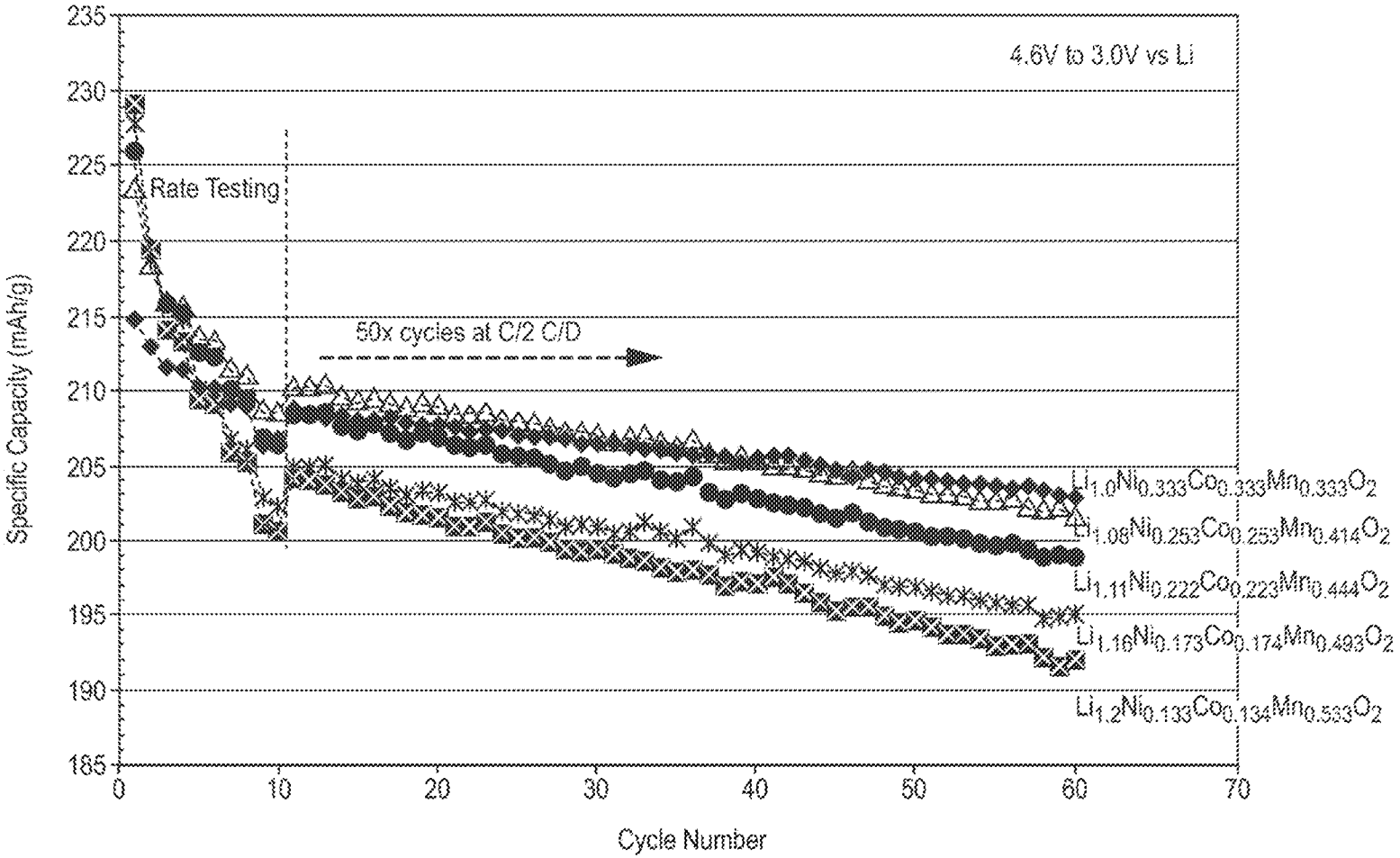
FIG. 8 is a plot of specific discharge capacity as a function of cycle number for the cells used for the plots in FIG. 7 with cycling extended to 60 cycles with cycling from 11 to 60 being at a charge and discharge rate of C/2.
Figure 9A:
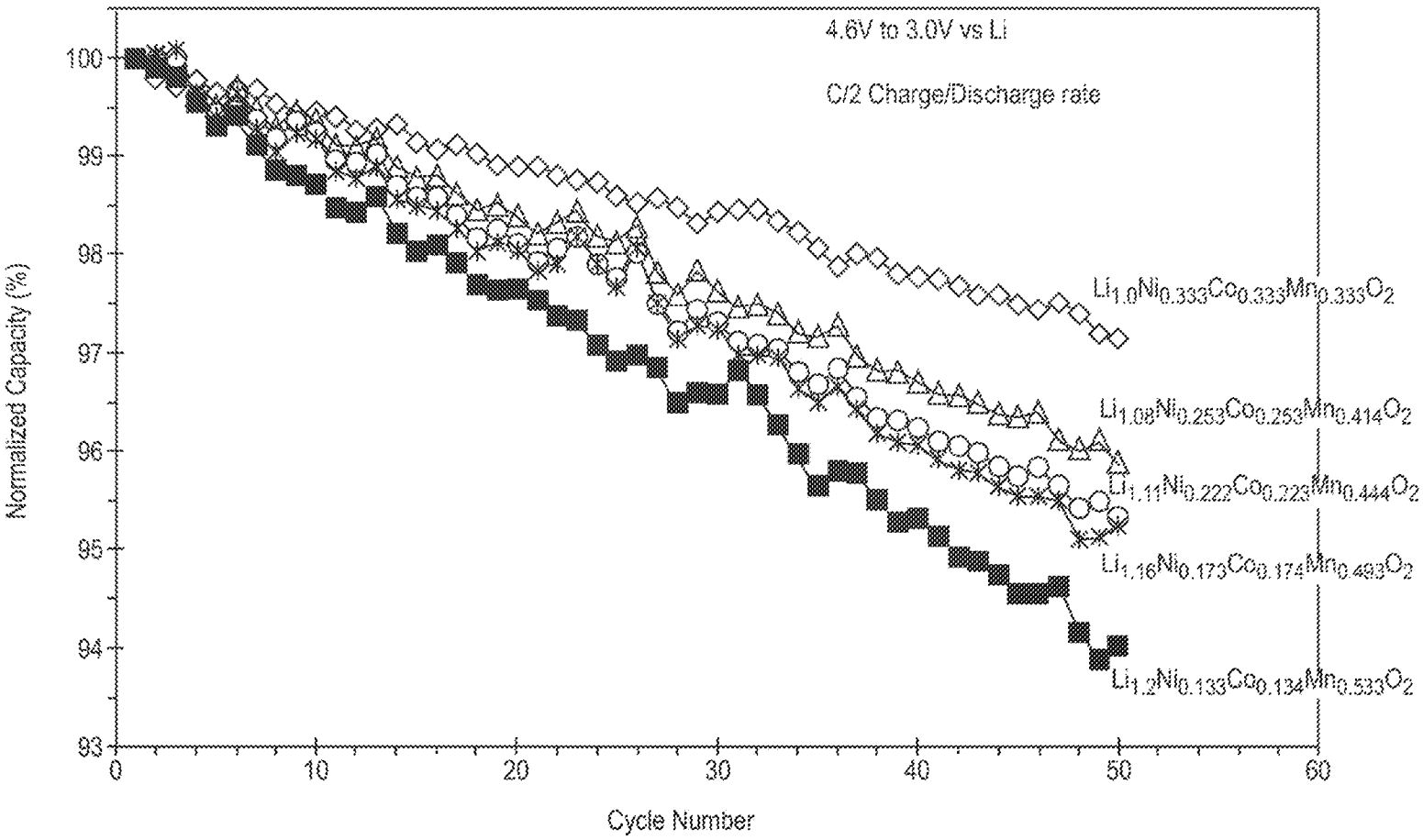
FIG. 9A is a plot of normalized discharge capacity as a function of cycle number for the cells of FIG. 7.
Figure 9B:
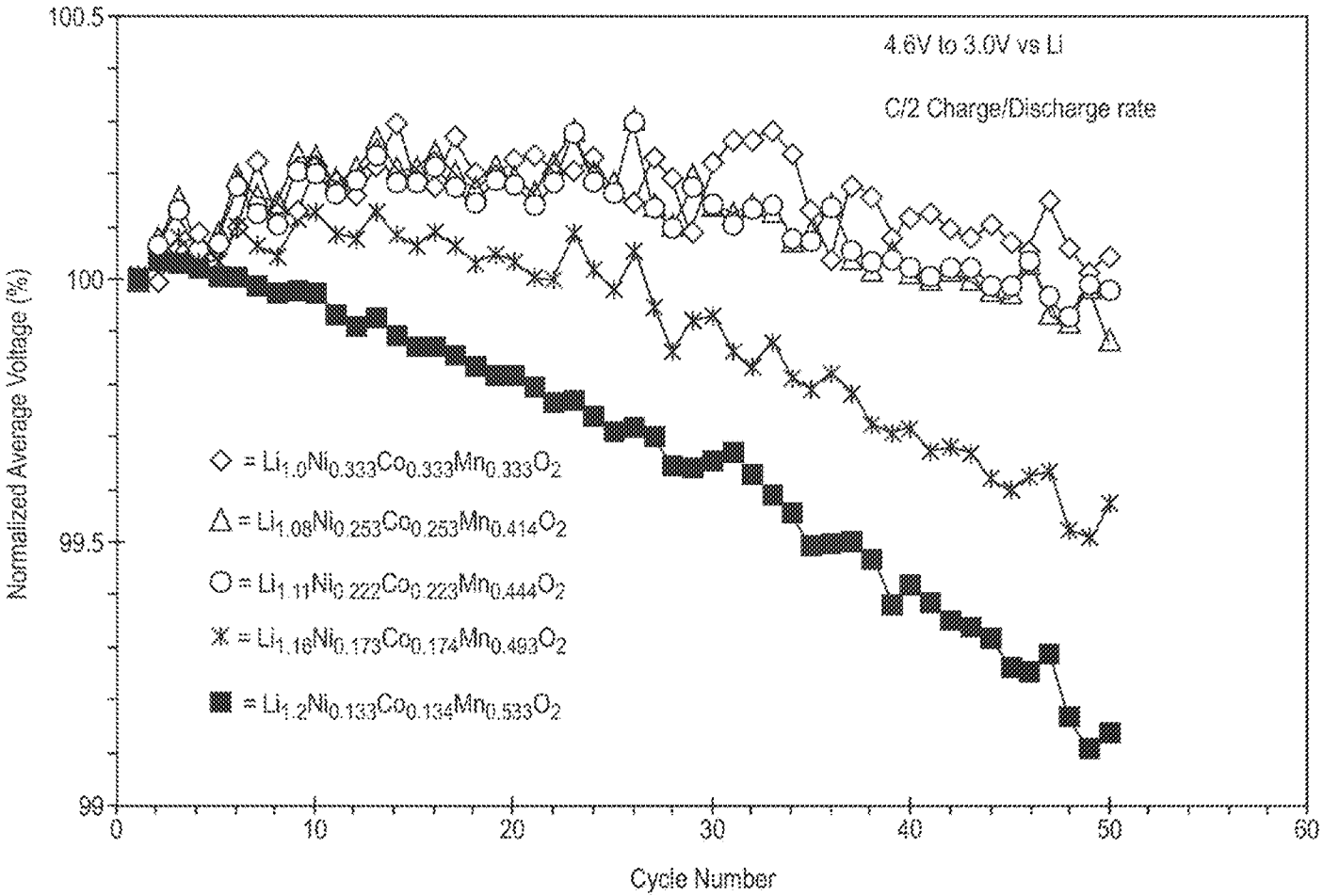
FIG. 9B is a plot of normalized average voltage as a function of cycle number for the cells of FIG. 7.

Another set of coin cells were formed with samples S1 to S5 positive electrode active material from Example 1. These cells were cycled between 4.6V and 3.0V for two cycles at charge/discharge rates of C/10, 2 cycles with charge/discharge rates of C/S, 2 cycles at charge/discharge rates of C/3, 2 cycles of charge/discharge rates of C/2 and 2 cycles with C/2 charge and 1C discharge, followed by 50 cycles of C/2 charge/discharge. A plot of the first 10 cycles exploring the rate capability is shown in FIG. 7. Discharge specific capacity plotted over the whole range of cycling is shown in FIG. 8. The normalized specific capacity and average voltage over the 50 C/2 cycles is plotted in FIGS. 9A (specific capacity) and 9B (average voltage). These plots show similar stabilization of the cycling based on these particular composite coatings over the lithium cobalt oxide core. Greater amounts of lithium enrichment of the LMNCO coating material has been found to diminish cycling performance generally, but a low amount of lithium enrichment provides some cycling stabilization. Also, lithium enrichment increases low discharge rate capacity, but the higher rate discharge capacity decreases with increasing amounts of lithium enrichment. The initial specific capacity did not significantly increase with lithium enrichment.

Figure 10:
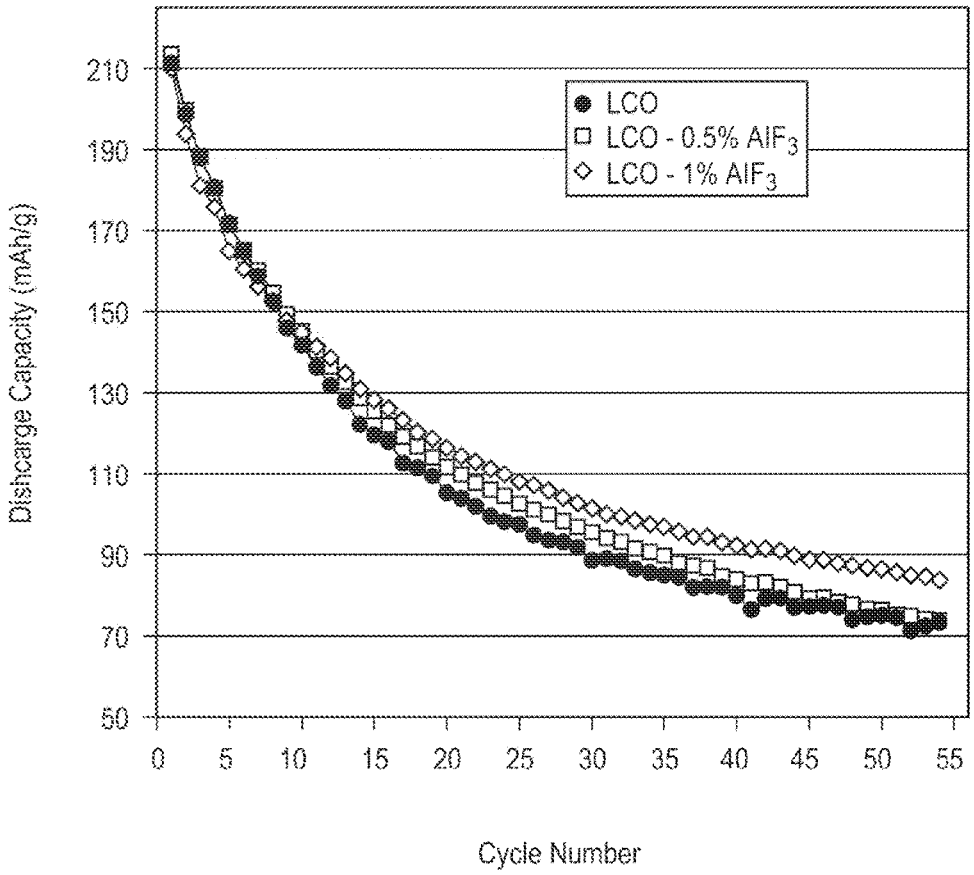
FIG. 10 is a plot of discharge specific capacity as a function of cycle number for a coin cell using a lithium foil negative electrode for cycling between 4.6V and 3.0V at a C/3 rate after the first four cycles, with a C. It) rate for the first two cycles and C/5 rate for the 3rd and 4th cycles for batteries using commercial lithium cobalt oxide, or with either 0.5 wt % or 1.0 wt % aluminum fluoride stabilization coating.

For comparison, FIG. 10 provides a plot of discharge specific capacity for a discharge from 4.6V to 3V as a function of charge-discharge cycle for lithium cobalt oxide (LCO) as the active material or LCO with an aluminum fluoride nanocoating (0.5 wt % or 1 wt %). The aluminum fluoride nanocoating without the LMNCO coating provided little cycling stabilization relative to the LCO alone, and the LCO itself exhibited poor cycling stability over this voltage range. Similarly, the cycling stability was examined for coin cells with positive electrodes having LCO coated only with several variations of LMNCO coatings as described in Example 1 but without the aluminum fluoride nanocoating. The cycling stability for cycling between 4.6V and 3.0V is shown in FIG. 11. Corresponding normalized specific capacity and average voltage plots are presented as a function of cycle number in FIGS. 12A and 12B. While the LMNCO coatings stabilized the LCO cycling somewhat better than AlF nanocoatings alone, the cycling performance was still poor. Thus, these cycling results demonstrate the synergistic improvement achievable with the sequentially layered coating of LMNCO and inert nanocoatings.

Example 3—Cell Performance with Graphitic or Silicon Based Anodes, Coin Cell

The example demonstrates the cycling performance of the active materials synthesized in Example 1 in lithium ion coin cell batteries with either a graphite based negative electrode or a silicon oxide based negative electrode active material.

To test cycling with a graphite based negative electrode, the graphitic carbon based negative electrodes comprised at least about 75 weight percent graphite and at least about 1 weight percent acetylene black with the remaining portion of the negative electrode being polymer binder. The acetylene black was initially mixed with NMP solvent to form a uniform dispersion. The graphite and polymer were added to the dispersion to form a slurry. The slurry was applied as a thin-film to a copper foil current collector. A negative electrode was formed by drying the copper foil current collector with the thin wet film in vacuum oven at 110° C. for about two hours to remove NMP. The negative electrode material was pressed between rollers of a sheet mill to obtain a negative electrode with desired thickness. An electrolyte was selected to be stable at high voltages, and appropriate electrolytes are described in U.S. Pat. No. 8,993,177 B2 to Amiruddin et al., entitled "Lithium Ion Battery With High Voltage Electrolytes and Additives," incorporated herein by reference. For the batteries in this example, the batteries were cycled for the first two cycles as follows: 1) a C/20 charge to the charge voltage (4.47V or 4.5V), 2) a constant voltage charge until the current drops to C/50, 3) a discharge at C/20 to 2.0V, 4) a constant charge at C/10 to the charge voltage (4.47V or 4.5V), 5) a constant voltage charge until the current drops to C/50, and 6) discharge to 2.0V at C/10. Following the first two cycles, the cycling followed for each cycle a constant current charge at C/3 to the charge voltage, followed by a constant voltage charge until the current reached C/50, and followed by a discharge at a C/3 rate until 3V.

Three coin cells were formed that differed with respect to the positive electrode active material. A first coin cell comprised the lithium cobalt oxide with a composite coating of Example 1 (CRC-A), a second coin cell was formed with the lithium cobalt oxide directly as the positive electrode active material, and a third coin cell was formed with a physical blend of lithium cobalt oxide and 20 wt % lithium manganese nickel cobalt oxide. The physical blend had a comparable overall composition except that the lithium and manganese rich composition is formed as particles rather than as a coating on LCO, and the two different composition particles are blended for incorporation into the cathode.

Figure 13B:
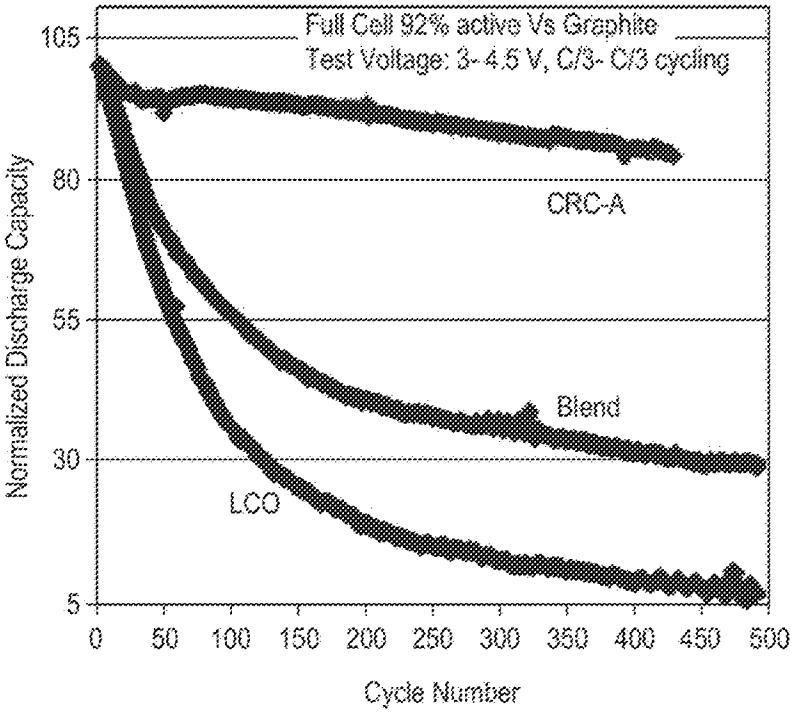
FIG. 13B is a plot of normalized capacity as a function of cycle number corresponding to FIG. 13A.
Figure 13A:
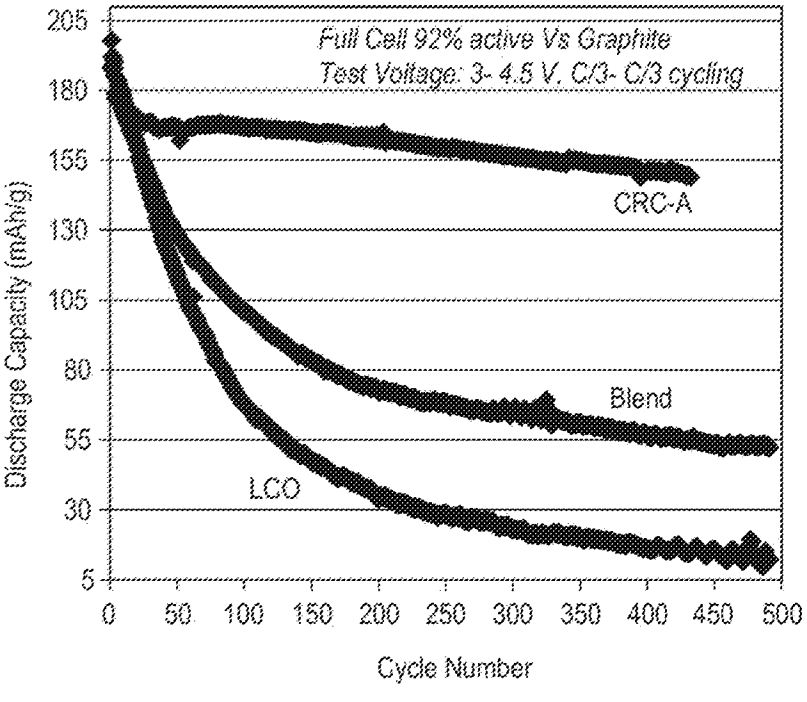
FIG. 13A is a plot of specific capacity evaluated using positive electrode active material weight as a function of cycle number for batteries using CRC-A. or commercial lithium cobalt oxide or a physical blend of lithium cobalt oxide and particles of the coating material of CRC-A with a graphite negative electrode active material in which cycling after the first 4 cycles through more than 400 cycles is performed with a discharge rate of C/3.
Figure 14:
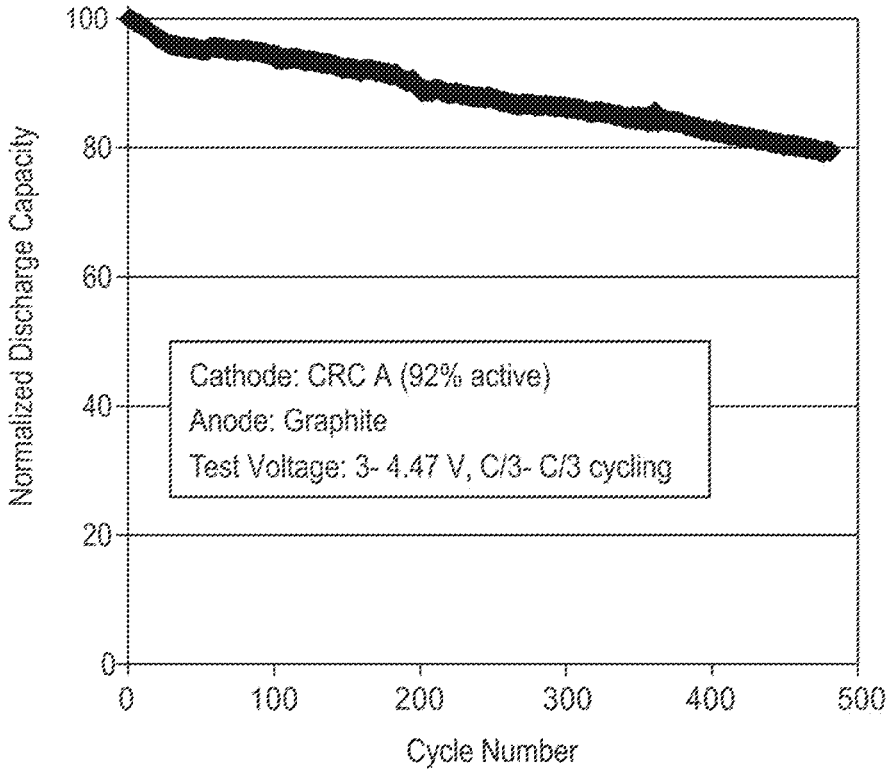
FIG. 14 is a plot of normalized discharge capacity as a function of cycle number with charging/discharging from 3.0V to 4.47V for a coin cell with CRC-A active material in the positive electrode and graphite active material in the negative electrode in which cycling after the first 4 cycles through about 480 cycles is performed with a discharge rate of C/3.

The high voltage cycling performance that was evaluated with the coin cells having a graphitic anode charged and discharged between 4.5V and 3.0V as shown in FIG. 13A, FIG. 13B (normalized capacities) and FIG. 14. Referring to FIGS. 13A and 13B, coin cells with the CRC-A active material exhibited much better cycling-ability relative to LCO and blends of LCO+LMNCO composition. As shown in the normalized capacity plot of FIG. 14, the composite active materials can achieve roughly 450 cycles with a 20% capacity loss. Over a slightly smaller voltage window, the cycling to 450 cycles is even flatter with a 92% active content in the cathode, as shown in FIG. 14.

Figure 15:
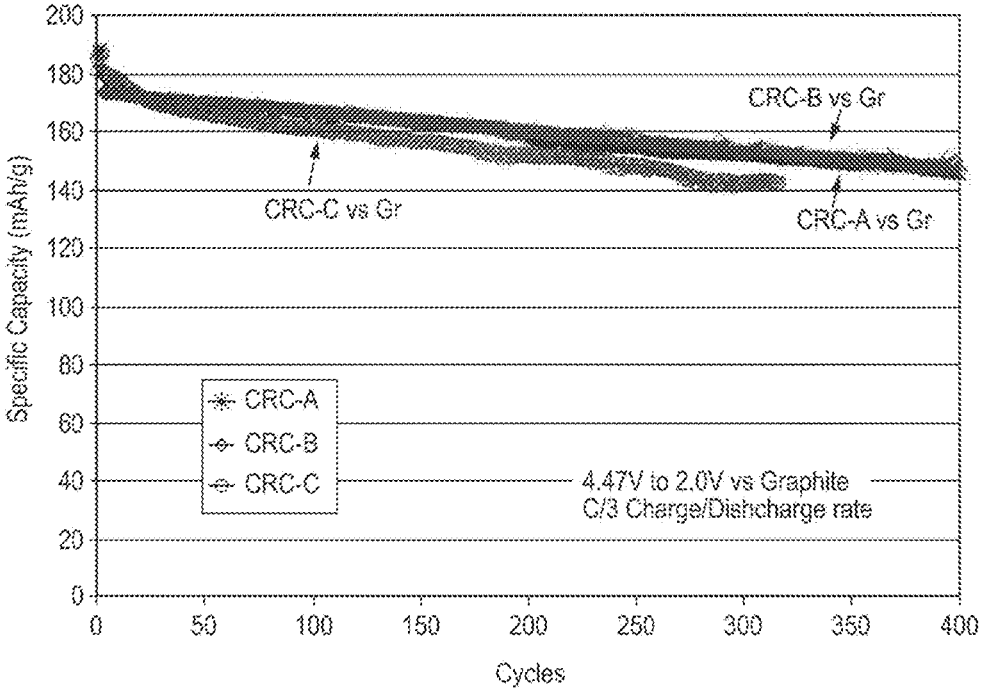
FIG. 15 is a plot of specific capacity relative to the positive electrode active material weight as a function of charge/discharge cycle with cycling between 4.47V and 3.0V for coin cells with one of three composite coated lithium cobalt oxide positive electrode active materials with a graphitic carbon negative electrode active material cycled for 1 cycle at charge/discharge rates of C/20 a second cycle charge/discharge rates of C/10 and charge/discharge rates of C/3 for cycles 3 onward.
Figure 16:
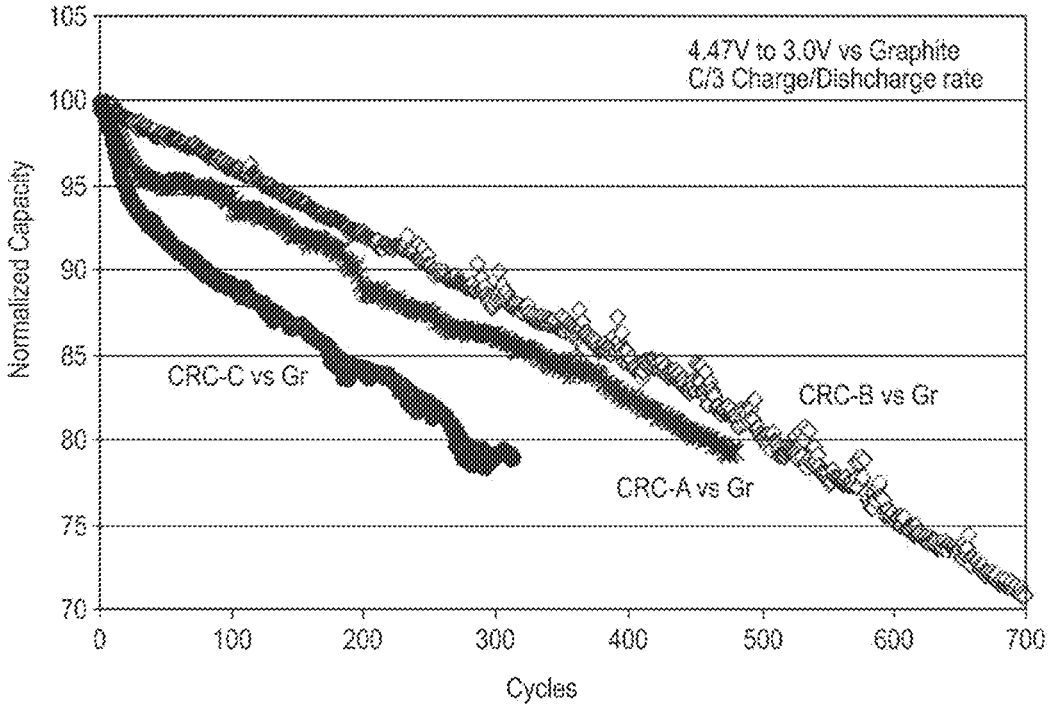
FIG. 16 is a plot of normalized capacity as a function of cycle number for the cells and cycling described with respect to FIG. 15.
Figure 17:
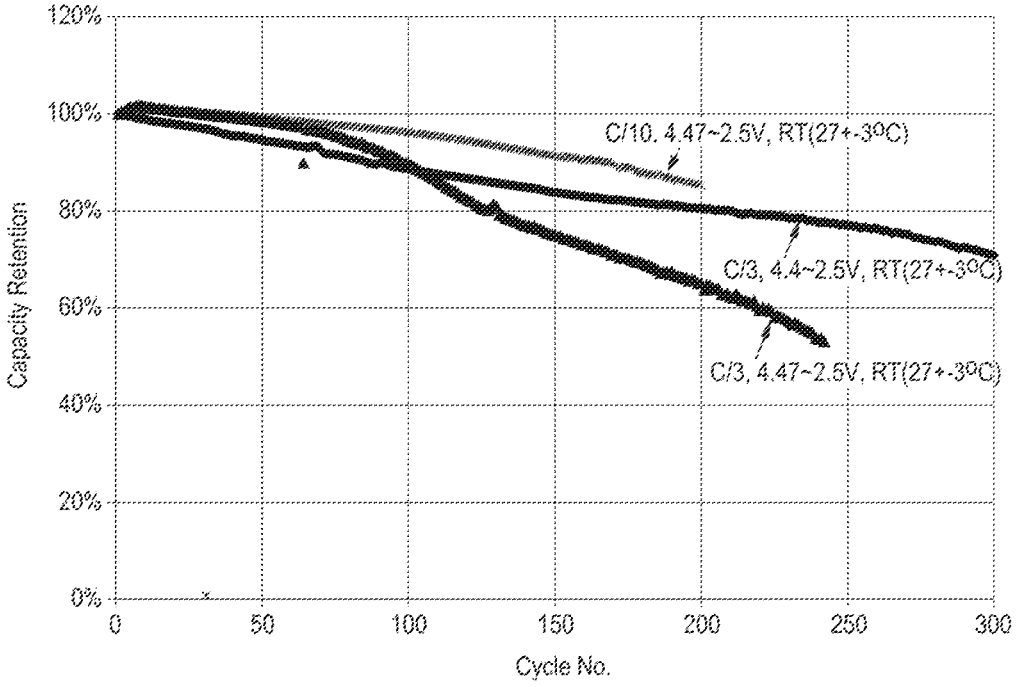
FIG. 17 is a plot of normalized capacity us a function of cycle number for three cells formed with CRC-B material as the active composition for the positive electrode with one cell cycled at a charge/discharge rate of C/10 from 4.47V to 2.5V, a second cell cycled at a charge/discharge rate of (C/3 from 4.4V to 2.5V and a third cell charge/discharged at a rate of C/3 from 4.47V to 2.5V.

Another set of coin cells with graphitic anodes were formed with CRC-A, CRC-B and CRC-C positive electrode active materials. These cells were formed with very high active material loadings in the positive electrode of 97.7 wt %, which resulted in worse cycling relative to FIGS. 13 and 14, which had 92% active material loading. These batteries were cycled from 4.47V to 3V, and the results are plotted in FIG. 15 with specific capacity of the positive electrode plotted as a function of cycle number. The cells were cycled at C/20 for the first cycle, C/10 for the second cycle and C/3 after the second cycle. The corresponding normalized capacity is plotted in FIG. 16. In general, CRC-B exhibited slightly better performance than CRC-A, and CRC-C exhibited worse cycling performance even though it started with a higher specific capacity. Three batteries with CRC-B (97.7% active content) and silicon oxide composite anode were cycled under different conditions at room temperature (27±3° C.): 4.47V–2.5V at C/10, 4.47V–2.5V at C/3 and 4.4V–2.5V at C/3, although the first two cycles were performed at a low rate C/20 (cycle 1) and C/10 (cycle 2). The cycling performance is plotted in FIG. 17 with normalized capacity plotted as a function of cycle number. At the higher voltage cycling (4.47V charge voltage), the increased discharge rate of C/3 resulted in a significant drop in cycling stability, and only about 125 cycles were reached before the capacity decreased to 80% of the initial capacity. At the lower charge voltage of 4.4V, the cell cycled to 200 cycles before the capacity dropped to 80% of the initial value.

To form the negative electrode with the silicon based active material, a powder of silicon oxide/silicon/carbon composite material (Shin-Etsu) was mixed thoroughly with an electrically conductive carbon additive, such as a blend of acetylene black (Super P® from Timcal, Ltd., Switzerland) with either graphite or carbon nanotubes or carbon nanofibers, to form a homogeneous powder mixture. Separately, polyimide binder was mixed with N-methyl-pyrrolidone ("NMP") (Sigma-Aldrich) and stirred overnight to form a polyimide-NMP solution. The homogenous powder mixture was then added to the polyimide-NMP solution and mixed for about 2 hours to form homogeneous slurry. The slurry was applied onto a copper foil current collector to form a thin, wet film and the laminated current collector was dried in a vacuum oven to remove NMP and to cure the polymer. The laminated current collector was then pressed between rollers of a sheet mill to obtain a desired lamination thickness. The dried laminate contained at least 75 wt % porous silicon based active material and at least 2 wt % polyimide binder. The negative electrodes were electrochemically prelithiated with sufficient lithium to compensate for the loss of lithium due to the anode irreversible capacity loss. The anode formulation is essentially as described in the '482 application noted above, which includes supplemental lithium.

Figure 18:
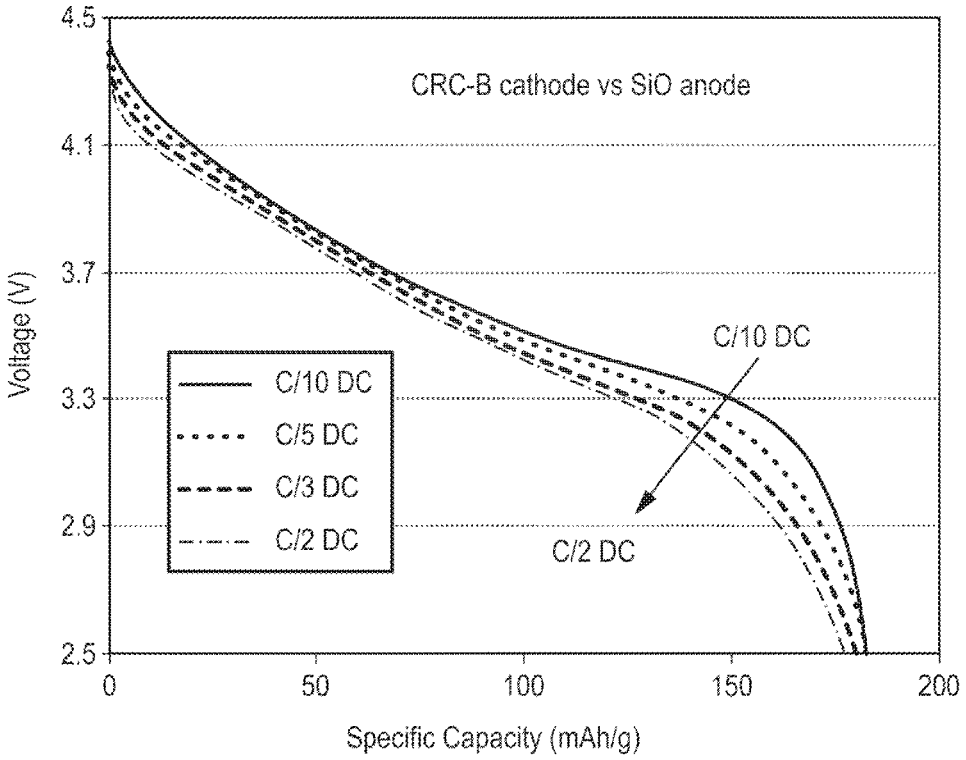
FIG. 18 is a plot of voltage as a function of specific capacity based on the weight of the positive electrode active material for a coin cell using CRC-B as the positive electrode active material and a commercial silicon oxide composite as the negative electrode active material from 4.47V to 2.5V and for four discharge rates: C/10, C/5, C/3, and C/2.

SiO based negative electrode was assembled with the CRC-B active material of Example 1 separated with a polymer separator and placed into a coin cell with electrolyte. The cathode has an active material content of 97.7 wt %, a loading of 21.53 milligrams/cm$^2$, and a density of 4.1 g/cm$^3$. The cell exhibited a charge specific capacity for the positive electrode of 192 mAh/g at a charge rate of C/10. FIG. 18 shows discharge curves at 4 discharge rates (C/10, C/5, C/3 and C/2) from 4.47V to 2.5V for a cell formed with CRC-B active material in the cathode and a SiO-based high capacity anode active material. The discharge specific capacities were normalized by the weight of the cathode active materials, so that the specific capacities refer to the positive electrode (cathode) specific capacities. The cell exhibited good discharge capacities at all of the rates (182 mAh/g at C/10, 182 mAh/g at C/5, 180 mAh/g at C/3 and 177 mAh/g at C/2).

Example 4—Pouch Cell Having Composite Coating Stabilized Positive Electrode and SiO Based Negative Electrode This example demonstrates reasonable cycling of a pouch cell having a very high volumetric energy density.

Figure 19:
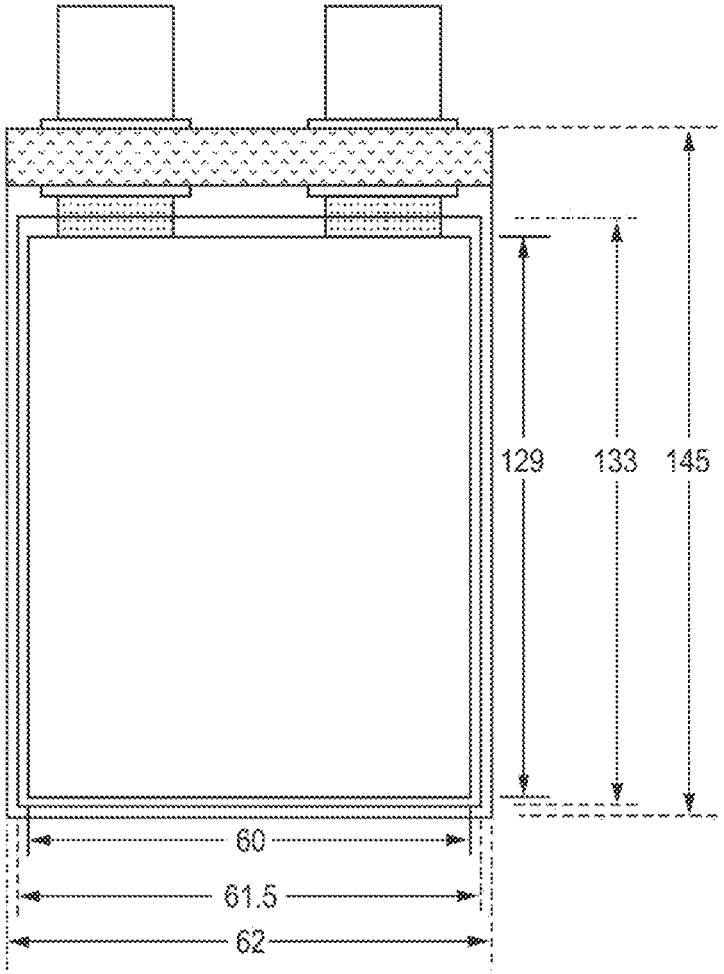
FIG. 19 is a top plan view of a schematic diagram of a pouch cell used in Example 4.
Figure 20:
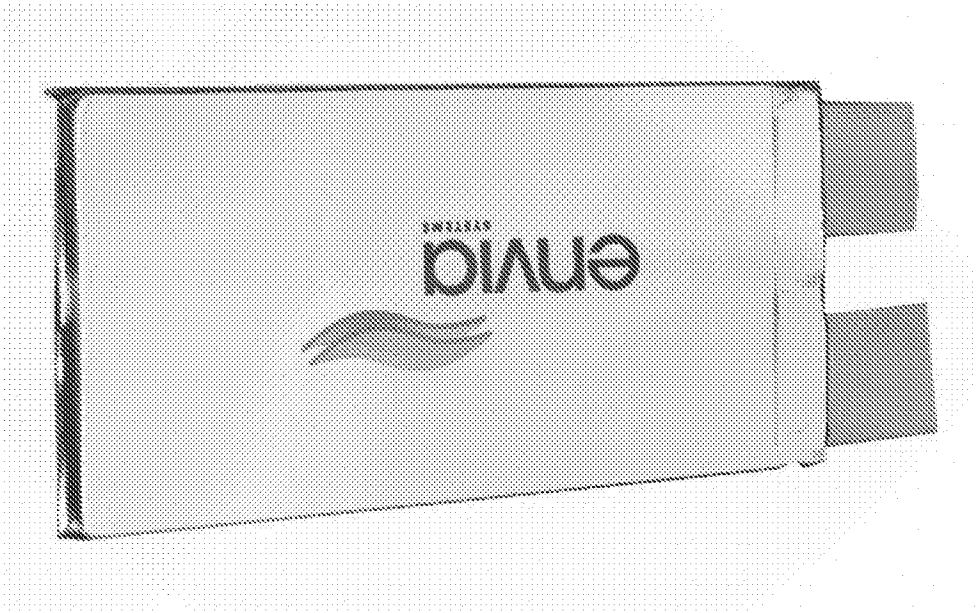
FIG. 20 is a photograph of a representative pouch cell of Example 4.

The batteries in this example were prismatic shaped pouch cells with approximate dimensions of 62 mm×145 mm×5 mm (thick), as shown in FIG. 19. A photograph is shown in FIG. 20. The electrodes (10-25 cathode layers and 11-26 anode layers) were formed as described in Example 3, and a polymer separator was pleated with electrode plated placed within the separator folds. Supplemental lithium was provided by applying lithium powder (SLMP®, FMC Corp.) to the negative electrode surface prior to assembly to roughly compensate for the IRCL of the silicon based negative electrode active material. The battery was designed to have a rough total capacity of roughly 10 Ah at a discharge rate of C/10, although the particular capacity varies with the choice of active materials.

Figure 21:
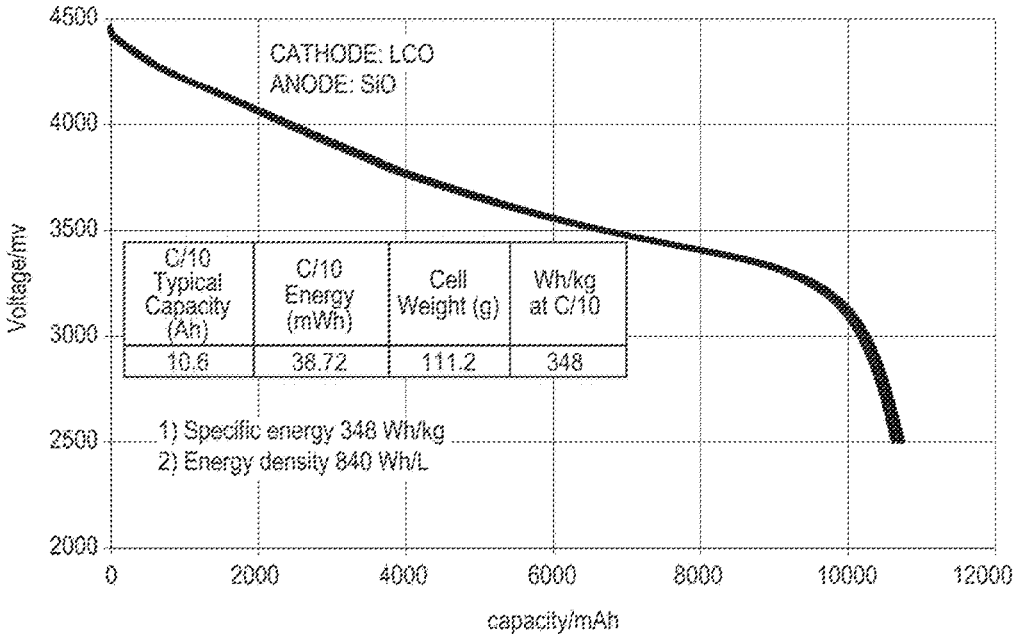
FIG. 21 is a plot of voltage as a function of total capacity for a pouch cell using lithium cobalt oxide as the positive electrode active material and a silicon oxide composite negative electrode active material for a discharge at a rate of C/10 from 4.47V to 2.5V, in which results are repeated with several batteries to demonstrate repeatability of the results.
Figure 22:
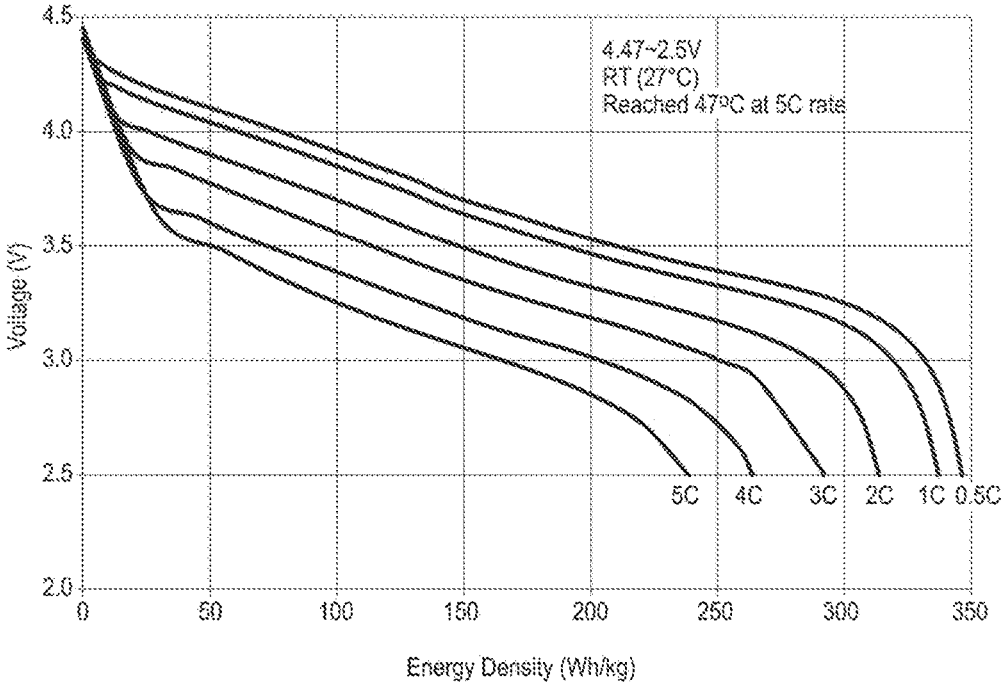
FIG. 22 is a plot of voltage as a function of energy density for the cells described in the context of FIG. 21 with results presented for 6 different discharge rates.

A set of batteries were formed with just lithium cobalt oxide from L&F Materials as the positive electrode active material and the commercial silicon based negative electrode active material. These batteries were tested at room temperature (25° C.±3° C.) with a protocol for the first three cycles as follows: 1) charge at C/20 rate to 4.47V, 2) continue charging at constant voltage until current drops to C/50, 3) rest 10 minutes, 4) discharge at C/20 to 2.0V, 5) charge at C/10 to 4.47V, 6) continue charging at constant voltage until current drops to C/50, 7) rest 10 minutes, 8) discharge at C/10 to 2.5V, 9) charge at a C/6 rate to 4.47V, 10 charge at constant voltage until the current dropped to C/50, 11) rest 10 minutes, and 12 discharge at C/10 to 2.5V. After the three formation steps, the batteries were cycles as noted in the context of the particular figures. The resulting discharge curves (voltage as a function of total capacity) are shown in FIG. 21. At the C/10 discharge rate, the battery has a total capacity of 10.6 Ah, energy output of 38.72 Wh, and an energy density of 348 Wh/kg based on a battery weight of 111 g, and the set of batteries exhibited good reproducibility. The volumetric energy density was very high at 840 Wh/L. After completing the first cycle formation process described above, the batteries were tested for their rate dependent discharge capacity. The energy density is plotted in FIG. 22 for 6 discharge rates (0.5C, 1C, 2C, 3C, 4C, and 5C) from 4.47V to 2.5V.

Figure 23:
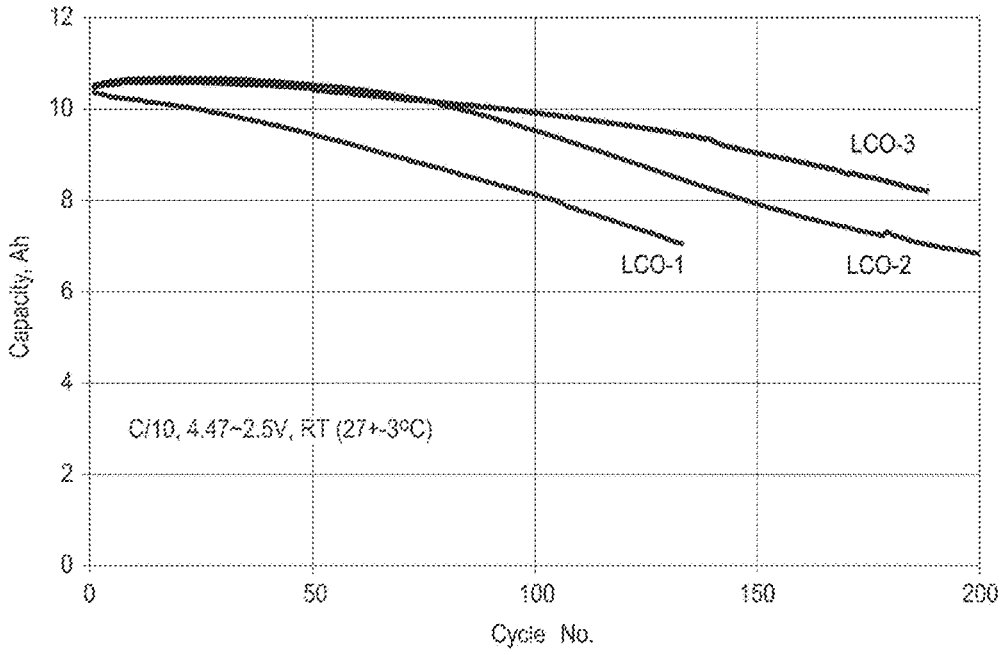
FIG. 23 is a plot of capacity as a function of cycle number for three cells described in the context of FIG. 21 using three different commercial lithium cobalt oxide powders for the positive electrodes.

Pouch batteries were formed with the silicon based negative electrode and three different commercial forms of lithium cobalt oxide. LCO-1 (Shanghai Shanshan Science & Technology Co. Ltd., China). LCO-2 (L&F Materials Co., Ltd., Republic of Korea), LCO-3 (L&F Material Co., Ltd.—Republic of Korea). The commercial lithium cobalt oxides are doped and possibly coated in proprietary ways known to the suppliers. Initial work in Example 2 involved LCO from Shanghai Shanshan sold with a rating of 4.35V, and subsequent work used LCO from L&F that was sold with a rating of 4.4V. Regardless of the source of LCO, the composite coatings were found to improve higher voltage cycling significantly. The batteries were cycled for up to 200 cycles between 4.47V and 2.5V at a discharge rate of C/10 at room temperature. FIG. 23 shows the capacity of three batteries as a function of cycle number. The cycling results are reasonable with the batteries for LCO-2 and LCO-3 showing modest capacity loss at 100 cycles and LCO-3 losing less than 20% capacity at 150 cycles. Nevertheless, the cycling results are still significantly worse than the coin cell results with CRC-B and the silicon based anode in FIG. 18 for discharge at a rate of C/10.

Figure 24:
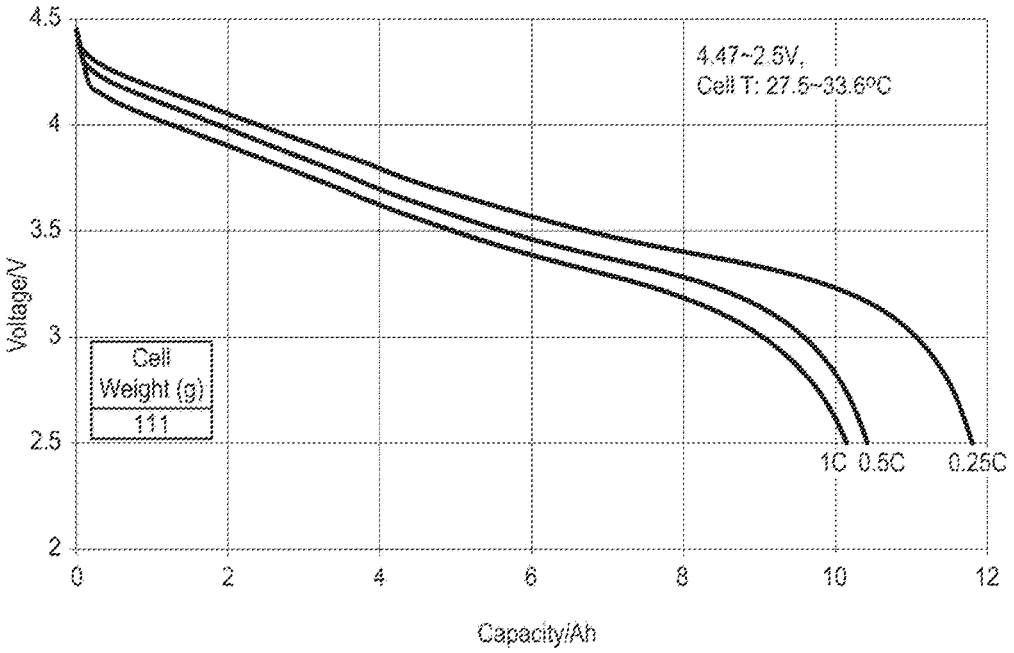
FIG. 24 is a set of plots of voltage as a function of total capacity for pouch cells formed with composite coated lithium cobalt oxide material (CRC-B) and composite silicon oxide based negative electrode active material discharged from 4.47V to 2.5V at three different rates.
Figure 25:
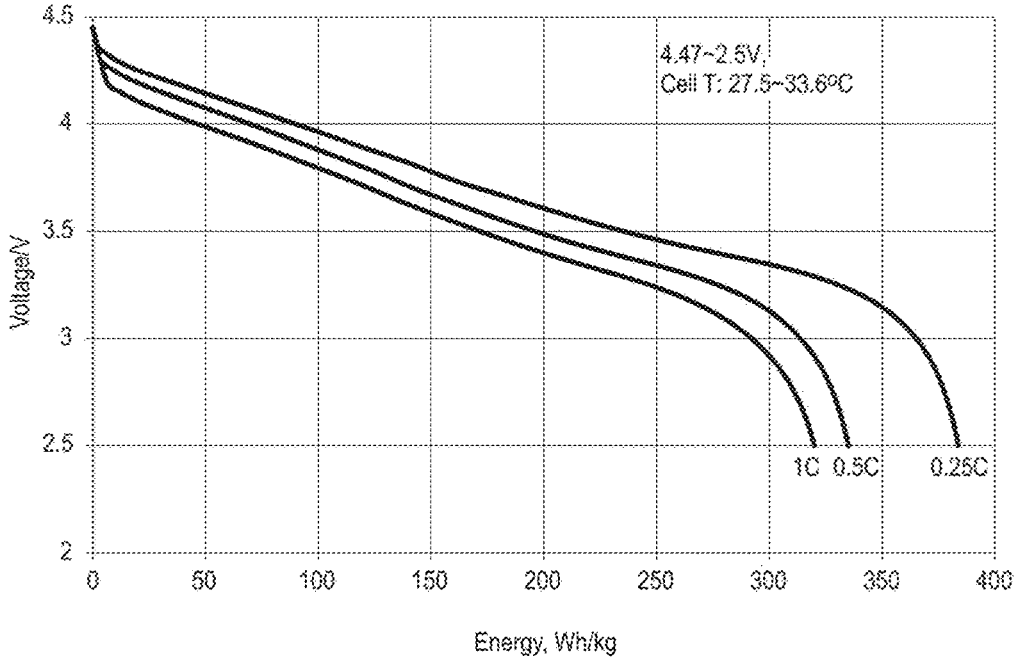
FIG. 25 is a plot of voltage as a function of discharge energy for the cells of FIG. 24 similarly discharged.
Figure 26:
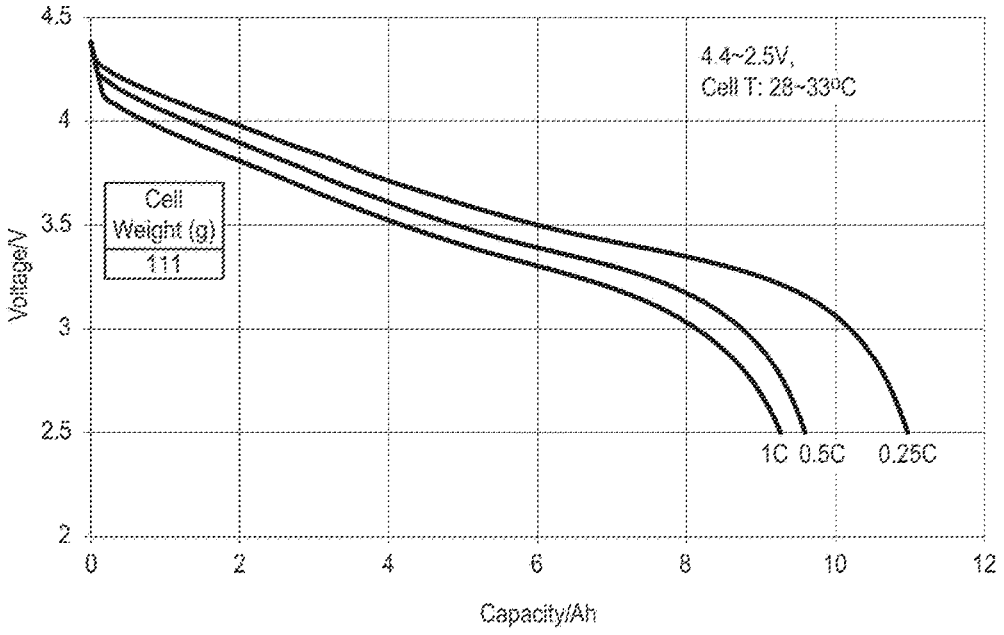
FIG. 26 is a set of plots of voltage as a function of total capacity for pouch cells formed with composite coated lithium cobalt oxide material (CRC-B) discharged from 4.4V to 2.5V at three different rates.
Figure 27:
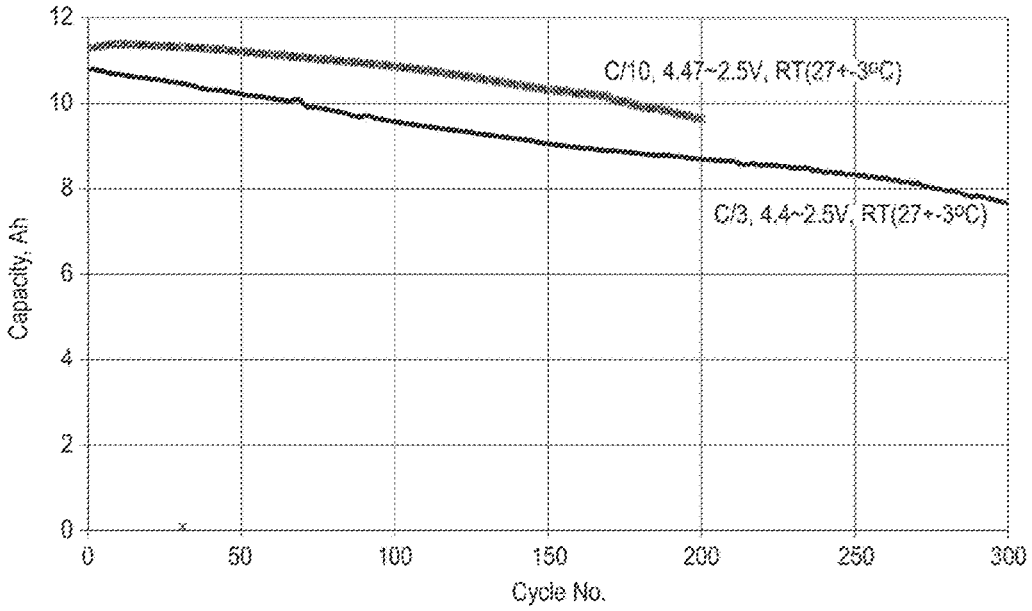
FIG. 27 is a set of plots of total capacity as a function of cycle number for two pouch cells formed with composite coated lithium cobalt oxide material (CRC-B) and composite silicon oxide based negative electrode active material with one cell cycled from 4.47V to 2.5V at a rate of C/10 and the other cell cycled from 4.4V to 2.5V at a rate of C/3.

Another set of pouch cells with roughly 10 Ah capacity were formed with a positive electrode active material CRC-B from Example 1. The batteries were subjected to a first cycle formation step as described in the previous paragraph. Then, batteries were discharged from 4.47V to 2.5V at three different rates (0.25C, 0.5C and 1C) at a temperature that ranged between 27.5° and 33.6° C. The battery exhibited at a discharge rate of C/10 a volumetric energy density of roughly 940 Wh/L and a specific energy of roughly 388 Wh/kg. The plots of the voltage versus capacity are in FIG. 24, and FIG. 25 shows a plot of voltage versus energy for the same batteries at the three discharge rates. For comparison, another set of batteries were discharged at the same three rates over a voltage range of 4.4V to 2.5V. The plot of voltage as a function of capacity is shown in FIG. 26 for the three discharge rates over the smaller voltage window. The capacity over the smaller voltage range was reduced roughly 6-9% relative to the capacity over the range from 4.47V to 2.5V. Batteries were also cycled over the two voltage windows (4.47V to 2.5V and 4.4V to 2.5V) at room temperature (27° C.±3° C.) for 200 or 300 cycles. As with the graphitic carbon negative electrodes, the higher discharge rate results in a somewhat reduced cycling capacity that can be compensated for through a reduction of the charge voltage. The results in FIG. 27 are roughly corresponding with the results in FIG. 17 for graphitic based negative electrodes in a coin cell format.

Example 5—Solid State LMNCO Coating and Cells from these Materials

This example demonstrates alternative processing approach to form the initially coated lithium cobalt oxide and provides corresponding electrochemical data.

The composition of CRC-A of example 1 was produced using a solid state approach for the formation of the initial coating of the lithium cobalt oxide. A manganese nickel cobalt carbonate was formed using co-precipitation without the presence of lithium cobalt oxide. The carbonate precursor composition was then dried with heat at roughly 110° C. to form a powder of the precursor composition. The dried precursor composition was then blended with lithium cobalt oxide and lithium carbonate using a mechanical mixer to form a good blend of the powders. The blended powders were then heated using a two step process as described in Example 1. An aluminum fluoride coating was then applied using a deposition with subsequent heating as described in Example 1.

The CRC-A solid state was tested in coin cells with a lithium foil counter electrode, as described in Example 2.

Figure 28:
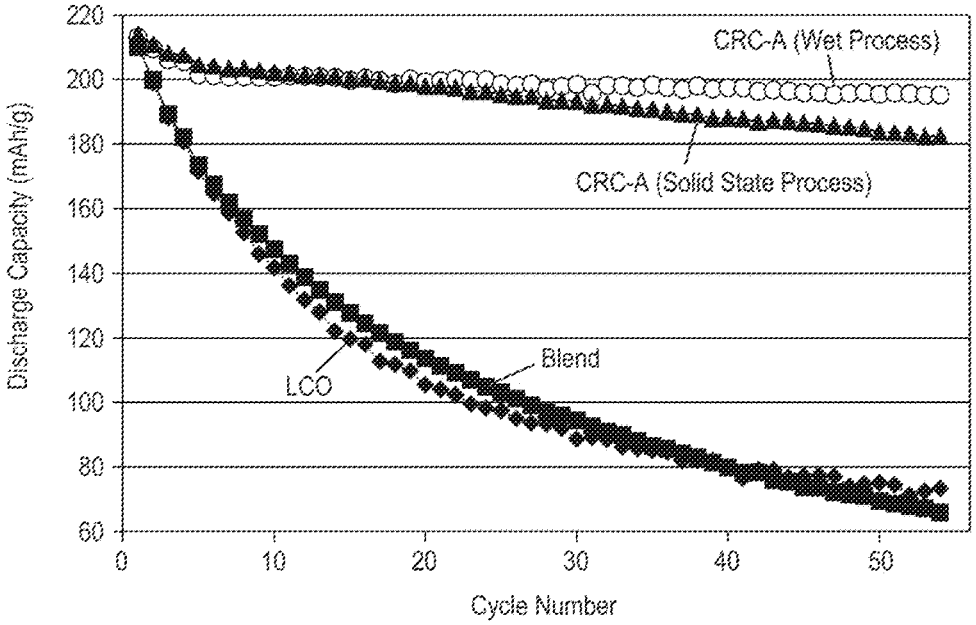
FIG. 28 is a set of plots of specific discharge capacity relative to the weight of the positive electrode active material as a function of cycle number for four cells using a lithium foil negative electrode and a positive electrode active material that is either commercial lithium cobalt oxide, a physical blend of lithium cobalt oxide and particles with the same composition as the composite coating, CRC-A formed through co-precipitation of an LMNCO coating as part of a composite coating or CRC-A formed with a solid state reaction to form an LMNCO coating as part of a composite coating, cycled from 4.6V to 3.0V at a C/3 rate.
Figure 29:
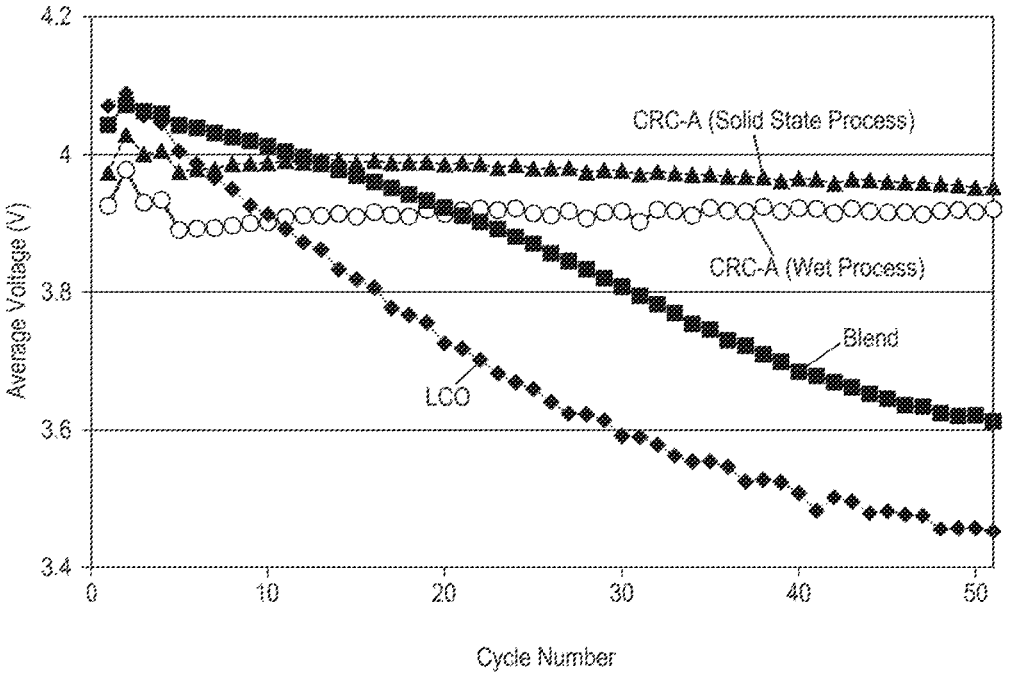
FIG. 29 is a plot of average voltage as a function of cycle number for the cell cycling described in the context of FIG. 28.

The coin cells were then cycled as described in Example 2. FIGS. 28 and 29 show the specific discharge capacity and average voltage as a function of cycle with cycling at C/3 from 4.5V to 3V from the 5th cycle on. In FIGS. 28 and 29, comparable results are shown for the cells produced with materials formed as described in Example 1 along with lithium cobalt oxide alone and a physical blend of materials. The materials formed with the solid state process to form the initial coating had worse cycling properties relative to the materials formed as described in Example 1 but had a higher average voltage.

The embodiments above are intended to be illustrative and not limiting. Additional embodiments are within the claims. In addition, although the present invention has been described with reference to particular embodiments, those skilled in the art will recognize that changes can be made in form and detail without departing from the spirit and scope of the invention. Any incorporation by reference of documents above is limited such that no subject matter is incorporated that is contrary to the explicit disclosure herein.

What is claimed is:

1. A particulate material comprising a core of lithium cobalt oxide, a partial coating with domains of a lithium manganese nickel cobalt oxide, and a distinct inert stabilization nanocoating, and having from about 2 weight percent to about 19 weight percent lithium manganese nickel cobalt oxide evaluated according to weight of added metal during coating formation.

2. The particulate material of claim 1 wherein the material comprises from about 1 weight percent to about 35 weight percent lithium manganese nickel cobalt oxide approximately represented by the formula $Li_{1+b}Ni_{\alpha}Mn_{\beta}Co_{\gamma}A_{\delta}O_{2-z}F_z$, b ranges from −0.15 to about 0.3, α ranges from about 0.1 to about 0.4, β ranges from about 0.2 to about 0.65, γ ranges from about 0 to about 0.46, δ ranges from about 0 to about 0.15, and z ranges from 0 to about 0.2, and where A is Na, K, Mg, Sr, Ba, Cd, Zn, Al, Ga, B, Zr, Ti, Ca, Ce, Y, Nb, Cr, Fe, V, W, Si, Li or combinations thereof, and from about 0.05 weight percent to about 8 weight percent inert stabilization coating.

3. The particulate material of claim 2 wherein where $\alpha+\beta+\gamma+\delta\sim1-b$, α ranges from about 0.1 to about 0.3, β range from about 0.3 to about 0.65, γ ranges from about 0.05 to about 0.4, z=0 and δ=0.

4. The particulate material of claim 2 wherein b ranges from 0.01 to 0.1.

5. The particulate material of claim 1 having from about 3 weight percent to about 15 weight percent lithium manganese nickel cobalt oxide.

6. The particulate material of claim 1 having an average particle size from about 5 microns to about 30 microns.

7. The particulate material of claim 1 comprising from about 0.05 weight percent to about 8 weight percent inert stabilization coating.

8. The particulate material of claim 1 comprising from about 0.2 weight percent to about 2 weight percent inert stabilization coating.

9. The particulate material of claim 1 wherein the inert stabilization coating comprises from 1 to 6 atomic deposited layers.

10. The particulate material of claim 1 wherein the inert stabilization coating comprises a metal halide.

11. The particulate material of claim 1 wherein the inert stabilization coating comprises aluminum halide.

12. The particulate material of claim 1 wherein the inert stabilization coating comprises an inert metal oxide.

13. The particulate material of claim 1 wherein the inert stabilization coating comprises aluminum zinc oxide.

14. The particulate material of claim 1 having a specific discharge capacity against lithium of at least about 170 mAh/g discharged from 4.52V to 3V at a rate of C/3.

15. A cell comprising:

a cathode comprising an active material comprising the particulate material of claim 1, wherein the cathode tested against a lithium foil electrode exhibits a discharge specific capacity of at least about 185 mAh/g at a rate of C/3 cycled between 4.52V and 3V;

an anode comprising a lithium intercalation/alloying compound; and a nonaqueous electrolyte comprising lithium ion, the cell cycling between about 4.47V and 2.5V with a discharge specific capacity at the 100th cycle at a rate of C/3 that is at least about 85% of the 5th cycle discharge capacity.

16. The cell of claim 15 wherein the anode comprises graphite.

17. The cell of claim 16 having a discharge specific capacity at the 250th cycle at a rate of C/3 that is at least about 80% of the 5th cycle discharge capacity.

18. The cell of claim 15 wherein the anode comprises silicon oxide.

19. The cell of claim 18 having a discharge capacity at the 150th cycle that is at least about 80% of the 5th cycle discharge capacity when cycled from the 5th cycle to the 150th cycle at a discharge rate of C/3 from 4.4V to 2.5.

20. The cell of claim 18 having a specific energy of at least about 335 Wh/kg and an energy density of at least about 840 Wh/L.

21. The cell of claim 15 wherein the articulate material has from about 0.05 weight percent to about 8 weight percent inert stabilization coating.

22. The cell of claim 21 wherein the lithium manganese nickel cobalt oxide is approximately described by the formula $Li_{1+b}Ni_{\alpha}Mn_{\beta}Co_{\gamma}A_{\delta}O_{2-z}F_z$, where b ranges from −0.15 to about 03, α ranges from about 0.1 to about 0.4, β ranges from about 0.2 to about 0.65, γ ranges from about 0 to about 0.46, δ ranges from about 0 to about 0.15, and z ranges from 0 to about 0.2, and where A is Na, K, Mg, Sr, Ba, Cd, Zn, Al, Ga, B, Zr, Ti, Ca, Ce, Y, Nb, Cr, Fe, V, W, Si, Li or combinations thereof.

23. A cell comprising:

a cathode comprising an active material comprising the particulate material of claim 1;

an anode comprising silicon oxide; and a nonaqueous electrolyte comprising lithium ion, the cell having a specific energy of at least about 275 Wh/kg and an energy density of at least about 750 Wh/L wherein the cathode and anode are wound together separated by a separator or the cell comprises a plurality of the cathodes and a plurality of the anodes in an electrode stack.

24. The cell of claim 23 having a discharge capacity at the 150th cycle that is at least about 80% of the 5th cycle discharge capacity when cycled from the 5th cycle to the 150th cycle at a discharge rate of C/3 from 4.4V to 2.5.

25. A method for forming a particulate composite coated material, the method comprising:

annealing a combination of a manganese nickel cobalt precursor, a lithium source and lithium cobalt oxide powder to form a lithium manganese nickel cobalt oxide coated lithium cobalt oxide particles wherein the manganese nickel cobalt precursor is a coating on the lithium cobalt oxide formed by co-precipitating the manganese nickel cobalt precursor in a dispersion of lithium cobalt oxide and wherein the annealing is performed with a first heating step to a temperature from about 300° C. to about 700° C. to form a metal oxide composition and a second heating step to a temperature from about 750° C. to about 1200° C.; and coating the lithium manganese nickel cobalt oxide coated lithium cobalt oxide particles with an inert inorganic stabilization nanocoating to form composite coated stabilized lithium cobalt oxide particles, wherein the particulate composite coated material has from about 2 weight percent to about 19 weight percent lithium manganese nickel cobalt oxide.

26. The method of claim 25 wherein the manganese nickel cobalt precursor compound comprises a hydroxide or a carbonate.

27. The method of claim 25 wherein the manganese nickel cobalt precursor compound comprises a hydroxide or a carbonate, and the annealing is performed in a single heating step from about 700° C. to about 1200° C. for from about 6 hours to about 48 hours.

28. The method of claim 25 wherein the material comprises from about 1 weight percent to about 35 weight percent lithium manganese nickel cobalt oxide approximately represented by the formula $Li_{1+b}Ni_{\alpha}Mn_{\beta}Co_{\gamma}A_{\delta}O_{2-z}F_{z}$, where b ranges from −0.15 to about 0.3, α ranges from about 0.1 to about 0.4, β ranges from about 0.2 to about 0.65, γ ranges from about 0 to about 0.46, δ ranges from about 0 to about 0.15, and z ranges from 0 to about 0.2, and where A is Na, K, Mg, Sr, Ba, Cd, Zn, Al G, B, Zr, Ti, Ca, Ce, Y, Nb, Cr, Fe, V, W, Si, Li or combinations thereof, and from about 0.05 weight percent to about 8 weight percent inert stabilization coating.

*29. A lithium ion cell comprising:*

*an anode comprising a lithium intercalation or allying active composition;*

*a cathode comprising an active composition comprising a particulate material of lithium cobalt oxide, polymer binder, and an electrically conductive particles, the cathode having a specific capacity cycled against lithium foil electrode of at least 170 mAh/g discharged from 4.52V to 3V at a rate of C/3; and*

*a non-aqueous electrolyte comprising lithium ions,*

*where in the lithium ion cell can be cycled for at least 300 cycles between 4.47V and 3V at a discharge rate of C/3 without a drop of more than 20% of the capacity from the 5th cycle capacity.*

*30. The lithium ion cell of claim 29 wherein the anode comprises a silicon based active material.*

*31. The lithium ion cell of claim 30 wherein the anode comprises silicon oxide.*

*32. The lithium ion cell of claim 30 wherein the anode comprises a silicon oxide/silicon/carbon composite.*

*33. The lithium ion cell of claim 30 wherein the anode comprises from 5 wt % to 55 wt % graphite.*

*34. The lithium ion cell of claim 29 wherein the anode comprises graphite.*

*35. The lithium ion cell of claim 29 wherein the positive electrode having a specific capacity cycled against lithium metal of at least 185 mAh/g discharged from 4.52V to 3V at a rate of C/3.*

*36. The lithium ion cell of claim 29 wherein the lithium cobalt oxide is doped.*

*37. The lithium ion cell of claim 29 wherein the lithium cobalt oxide is coated.*

*38. The lithium ion cell of claim 29 having a specific energy of at least about 320 Wh/kg.*

*39. The lithium ion cell of claim 29 having an energy density of at least about 780 Wh/L.*

*40. The lithium ion cell of claim 29 wherein the electrolyte comprises fluoroethylene carbonate.*

*41. The lithium ion cell of claim 29 where in the lithium ion cell can be cycled for at least 375 cycles between 4.47V and 3V at a discharge rate of C/3 without a drop of more than 20% of the capacity from the 5th cycle capacity.*

* * * * *